US009098455B2

(12) United States Patent
Atluri et al.

(10) Patent No.: US 9,098,455 B2
(45) Date of Patent: Aug. 4, 2015

(54) SYSTEMS AND METHODS OF EVENT DRIVEN RECOVERY MANAGEMENT

(71) Applicant: INMAGE SYSTEMS, INC., Redmond, WA (US)

(72) Inventors: Rajeev Atluri, Corona, CA (US); Anup S. Tirumala, San Jose, CA (US)

(73) Assignee: Inmage Systems, Inc., Santa Clara, CA (US)

( * ) Notice: Subject to any disclaimer, the term of this patent is extended or adjusted under 35 U.S.C. 154(b) by 0 days.

(21) Appl. No.: 14/496,293

(22) Filed: Sep. 25, 2014

(65) Prior Publication Data

US 2015/0074458 A1 Mar. 12, 2015

Related U.S. Application Data

(63) Continuation of application No. 12/508,633, filed on Jul. 24, 2009, now Pat. No. 8,949,395, which is a continuation-in-part of application No. 10/859,368, filed on Jun. 1, 2004, now Pat. No. 7,698,401, and a (Continued)

(51) Int. Cl.
*G06F 15/173* (2006.01)
*G06F 11/14* (2006.01)
(Continued)

(52) U.S. Cl.
CPC ........ *G06F 11/1461* (2013.01); *G06F 11/1451* (2013.01); *G06F 11/1453* (2013.01); *G06F 11/1456* (2013.01); *G06F 11/1464* (2013.01); *G06F 11/1469* (2013.01); *G06F 11/1471* (2013.01); *H04L 67/1095* (2013.01); *H04L 67/1097* (2013.01); *H04L 69/40* (2013.01); *G06F 11/1446* (2013.01); *G06F 11/1474* (2013.01); *G06F 2201/80* (2013.01); *G06F 2201/84* (2013.01)

(58) Field of Classification Search
USPC ................ 709/202, 217, 223, 226, 229, 248
See application file for complete search history.

(56) References Cited

U.S. PATENT DOCUMENTS

| 5,193,162 A | 3/1993 | Bordsen et al. |
| 5,193,181 A | 3/1993 | Barlow et al. |
| 5,313,612 A | 5/1994 | Satoh et al. |

(Continued)

FOREIGN PATENT DOCUMENTS

WO WO 2004021677 A1 3/2004

OTHER PUBLICATIONS

Neel, D., "Symantec Says It'll Put Data on Road to Recovery—New LiveState Line Promises Complete System Restoration", Computer Reseller News, Oct. 4, 2004, 12 pages.

(Continued)

*Primary Examiner* — Liangche A Wang
(74) *Attorney, Agent, or Firm* — Ben Tabor; Stein Dolan; Micky Minhas

(57) ABSTRACT

Systems and methods of event driven recovery management are disclosed. In one embodiment, a method of providing event driven recovery management includes continually copying one or more data blocks that are generated from a computing device, associating at least one event marker with the copies of the one or more data blocks, and allowing access to the copies of the one or more data blocks according to the at least one event marker in order to provide event driven recovery. For purposes of this disclosure, an event marker, a book mark, an application consistency point, and/or a business event are interchangeably used, depending on the context.

18 Claims, 42 Drawing Sheets

Related U.S. Application Data continuation-in-part of application No. 11/229,289, filed on Sep. 16, 2005, now Pat. No. 8,055,745, which is a continuation-in-part of application No. 10/859,368, filed on Jun. 1, 2004, now Pat. No. 7,698,401, said application No. 12/508,633 is a continuation-in-part of application No. 11/438,036, filed on May 19, 2006, now Pat. No. 8,868,858, and a continuation-in-part of application No. 11/438,401, filed on May 22, 2006, now Pat. No. 7,676,502.

(51) Int. Cl.
*H04L 29/08* (2006.01)
*H04L 29/14* (2006.01)

(56) References Cited

U.S. PATENT DOCUMENTS

| | | |
|---|---|---|
| 5,446,871 A | 8/1995 | Sholmer et al. |
| 5,537,533 A | 7/1996 | Staheli et al. |
| 5,568,629 A | 10/1996 | Gentry et al. |
| 5,621,882 A | 4/1997 | Kakuta |
| 5,664,148 A | 9/1997 | Mulla et al. |
| 5,664,189 A | 9/1997 | Wilcox et al. |
| 5,678,042 A | 10/1997 | Pisello et al. |
| 5,758,359 A | 5/1998 | Saxon |
| 5,805,785 A | 9/1998 | Dias et al. |
| 5,813,017 A | 9/1998 | Morris |
| 5,875,479 A | 2/1999 | Blount et al. |
| 5,930,824 A | 7/1999 | Anglin et al. |
| 5,987,506 A | 11/1999 | Carter et al. |
| 6,018,746 A | 1/2000 | Hill et al. |
| 6,047,294 A | 4/2000 | Deshayes et al. |
| 6,061,769 A | 5/2000 | Kapulka et al. |
| 6,061,770 A | 5/2000 | Franklin |
| 6,072,952 A | 6/2000 | Janakiraman |
| 6,175,932 B1 | 1/2001 | Foote et al. |
| 6,247,141 B1 | 6/2001 | Homberg |
| 6,260,120 B1 | 7/2001 | Blumenau et al. |
| 6,269,431 B1 | 7/2001 | Dunham |
| 6,311,288 B1 | 10/2001 | Heeren et al. |
| 6,324,654 B1 | 11/2001 | Wahl et al. |
| 6,327,579 B1 | 12/2001 | Crawford |
| 6,373,988 B1 | 4/2002 | Thorell et al. |
| 6,449,625 B1 | 9/2002 | Wang |
| 6,490,691 B1 | 12/2002 | Kimura et al. |
| 6,606,651 B1 | 8/2003 | Linde |
| 6,647,399 B2 | 11/2003 | Zaremba |
| 6,691,140 B1 | 2/2004 | Bogrett |
| 6,714,980 B1 | 3/2004 | Markson et al. |
| 6,728,848 B2 | 4/2004 | Tamura et al. |
| 6,732,125 B1 | 5/2004 | Autrey et al. |
| 6,742,139 B1 | 5/2004 | Forsman et al. |
| 6,771,843 B1 | 8/2004 | Huber et al. |
| 6,785,786 B1 | 8/2004 | Gold et al. |
| 6,792,517 B1 | 9/2004 | Brunnett et al. |
| 6,792,518 B2 | 9/2004 | Armangau et al. |
| 6,883,073 B2 | 4/2005 | Arakawa et al. |
| 6,915,315 B2 | 7/2005 | Autrey et al. |
| 6,931,531 B1 | 8/2005 | Takahashi |
| 6,938,134 B2 | 8/2005 | Madany |
| 6,950,871 B1 | 9/2005 | Honma et al. |
| 6,978,282 B1 | 12/2005 | Dings et al. |
| 6,981,177 B2 | 12/2005 | Beattie |
| 7,007,043 B2 | 2/2006 | Farmer et al. |
| 7,058,849 B2 * | 6/2006 | Erstad .................... 714/5.11 |
| 7,065,671 B2 | 6/2006 | Nishimura |
| 7,082,446 B1 | 7/2006 | Bottomley |
| 7,093,086 B1 | 8/2006 | van Rietschote |
| 7,096,382 B2 | 8/2006 | Novick |
| 7,099,900 B1 | 8/2006 | Bromley et al. |
| 7,133,884 B1 | 11/2006 | Murley et al. |
| 7,143,307 B1 | 11/2006 | Witte et al. |
| 7,155,586 B1 | 12/2006 | Wagner et al. |
| 7,165,156 B1 | 1/2007 | Cameron et al. |
| 7,171,511 B2 | 1/2007 | Yagawa |
| 7,185,081 B1 | 2/2007 | Liao |
| 7,206,911 B2 * | 4/2007 | Wolfgang et al. ............. 711/162 |
| 7,237,021 B2 * | 6/2007 | Penny et al. .................. 709/223 |
| 7,251,716 B2 | 7/2007 | Nagae et al. |
| 7,251,749 B1 | 7/2007 | Fong et al. |
| 7,254,682 B1 | 8/2007 | Arbon |
| 7,257,595 B2 | 8/2007 | Verma et al. |
| 7,272,666 B2 | 9/2007 | Rowan et al. |
| 7,287,133 B2 | 10/2007 | Rowan et al. |
| 7,296,115 B2 | 11/2007 | Kano |
| 7,296,382 B2 | 11/2007 | Sack |
| 7,373,366 B1 | 5/2008 | Chatterjee et al. |
| 7,406,487 B1 | 7/2008 | Gupta |
| 7,406,488 B2 | 7/2008 | Stager et al. |
| 7,418,547 B2 | 8/2008 | Lam |
| 7,426,618 B2 | 9/2008 | Vu et al. |
| 7,437,603 B2 | 10/2008 | Ebata et al. |
| 7,440,965 B1 | 10/2008 | Pruthi et al. |
| 7,447,939 B1 | 11/2008 | Faulkner et al. |
| 7,536,529 B1 | 5/2009 | Chatterjee et al. |
| 7,552,358 B1 | 6/2009 | Asgar-Deen et al. |
| 7,574,622 B2 | 8/2009 | Soran et al. |
| 7,577,689 B1 | 8/2009 | Masinter et al. |
| 7,610,314 B2 | 10/2009 | Souder et al. |
| 7,613,945 B2 | 11/2009 | Soran et al. |
| 7,676,502 B2 | 3/2010 | Atluri et al. |
| 7,720,817 B2 | 5/2010 | Stager et al. |
| 7,734,909 B1 | 6/2010 | Roush et al. |
| 7,743,178 B2 | 6/2010 | Warren et al. |
| 7,752,166 B2 | 7/2010 | Quinian et al. |
| 7,814,367 B1 | 10/2010 | Squibb et al. |
| 7,822,715 B2 | 10/2010 | Petruzzo |
| 7,827,350 B1 | 11/2010 | Jiang et al. |
| 7,839,865 B2 | 11/2010 | Doherty et al. |
| 7,849,257 B1 | 12/2010 | Kim |
| 7,853,571 B2 | 12/2010 | Ranadae et al. |
| 7,860,832 B2 | 12/2010 | Midgley et al. |
| 7,979,741 B2 | 7/2011 | Amano et al. |
| 8,019,925 B1 | 9/2011 | Vogan et al. |
| 8,028,194 B2 | 9/2011 | Atluri et al. |
| 2001/0029477 A1 | 10/2001 | Freeman et al. |
| 2002/0008795 A1 | 1/2002 | Koyama et al. |
| 2002/0087950 A1 | 7/2002 | Brodeur et al. |
| 2002/0095479 A1 | 7/2002 | Schmidt |
| 2002/0124013 A1 | 9/2002 | Loy et al. |
| 2002/0136162 A1 | 9/2002 | Yoshimura et al. |
| 2002/0198699 A1 | 12/2002 | Greene et al. |
| 2003/0056139 A1 | 3/2003 | Murray et al. |
| 2003/0070042 A1 | 4/2003 | Byrd et al. |
| 2003/0093579 A1 | 5/2003 | Zimmer et al. |
| 2003/0126238 A1 | 7/2003 | Kohno et al. |
| 2003/0135703 A1 | 7/2003 | Martin et al. |
| 2003/0149752 A1 | 8/2003 | Baldwin et al. |
| 2003/0172158 A1 | 9/2003 | Pillai et al. |
| 2003/0212785 A1 | 11/2003 | Hamel et al. |
| 2004/0006723 A1 * | 1/2004 | Erstad ............................. 714/15 |
| 2004/0030954 A1 | 2/2004 | Loaiza et al. |
| 2004/0031030 A1 | 2/2004 | Kidder et al. |
| 2004/0034669 A1 | 2/2004 | Smith et al. |
| 2004/0064639 A1 | 4/2004 | Sicola et al. |
| 2004/0083345 A1 | 4/2004 | Kim et al. |
| 2004/0088301 A1 | 5/2004 | Mahalingam et al. |
| 2004/0093474 A1 | 5/2004 | Lin et al. |
| 2004/0107226 A1 | 6/2004 | Autrey et al. |
| 2004/0117438 A1 | 6/2004 | Considine et al. |
| 2004/0172574 A1 | 9/2004 | Wing et al. |
| 2004/0190459 A1 | 9/2004 | Ueda et al. |
| 2004/0199515 A1 | 10/2004 | Penney et al. |
| 2004/0205312 A1 * | 10/2004 | Zlotnick et al. ............... 711/162 |
| 2004/0205390 A1 | 10/2004 | Kanevsky et al. |
| 2004/0210608 A1 | 10/2004 | Lee et al. |
| 2004/0221125 A1 | 11/2004 | Ananthanarayanan et al. |
| 2004/0250021 A1 | 12/2004 | Honda et al. |
| 2004/0260673 A1 | 12/2004 | Hitz et al. |
| 2004/0260678 A1 | 12/2004 | Verbowski et al. |
| 2005/0005066 A1 | 1/2005 | Nakayama et al. |
| 2005/0010835 A1 | 1/2005 | Childs et al. |

(56) References Cited

U.S. PATENT DOCUMENTS

| | | |
|---|---|---|
| 2005/0015416 A1 | 1/2005 | Yamagami |
| 2005/0021869 A1 | 1/2005 | Aultman et al. |
| 2005/0027749 A1 | 2/2005 | Ohno et al. |
| 2005/0032479 A1 | 2/2005 | Miller et al. |
| 2005/0033930 A1 | 2/2005 | Haruma et al. |
| 2005/0038968 A1 | 2/2005 | Iwamura |
| 2005/0044162 A1 | 2/2005 | Liang et al. |
| 2005/0050110 A1 | 3/2005 | Sawdon et al. |
| 2005/0050386 A1 | 3/2005 | Reinhard et al. |
| 2005/0055603 A1 | 3/2005 | Soran et al. |
| 2005/0066095 A1 | 3/2005 | Mullick et al. |
| 2005/0071379 A1 | 3/2005 | Kekre et al. |
| 2005/0071390 A1 | 3/2005 | Midgley et al. |
| 2005/0076261 A1 | 4/2005 | Rowan et al. |
| 2005/0081089 A1* | 4/2005 | Hayardeny et al. ............... 714/6 |
| 2005/0102547 A1 | 5/2005 | Keeton et al. |
| 2005/0125513 A1 | 6/2005 | Sin-Ling Lam et al. |
| 2005/0125573 A1 | 6/2005 | Klein et al. |
| 2005/0131969 A1 | 6/2005 | Nishigaki |
| 2005/0131990 A1 | 6/2005 | Jewell |
| 2005/0138081 A1 | 6/2005 | Alshab et al. |
| 2005/0138090 A1 | 6/2005 | Augenstein et al. |
| 2005/0138204 A1 | 6/2005 | Iyer et al. |
| 2005/0182953 A1 | 8/2005 | Stager et al. |
| 2005/0188256 A1 | 8/2005 | Stager et al. |
| 2005/0193031 A1 | 9/2005 | Midgley et al. |
| 2005/0195660 A1 | 9/2005 | Kavuri et al. |
| 2005/0198303 A1 | 9/2005 | Knauerhase et al. |
| 2005/0198452 A1 | 9/2005 | Watanabe |
| 2005/0210218 A1 | 9/2005 | Hoogterp |
| 2005/0216527 A1 | 9/2005 | Erlingsoon |
| 2005/0216788 A1 | 9/2005 | Mani-Meitav et al. |
| 2005/0223043 A1 | 10/2005 | Randal et al. |
| 2005/0223181 A1* | 10/2005 | Jeppsen et al. ............... 711/162 |
| 2005/0226059 A1 | 10/2005 | Kavuri et al. |
| 2005/0240792 A1 | 10/2005 | Sicola et al. |
| 2005/0246311 A1 | 11/2005 | Whelan et al. |
| 2005/0251540 A1 | 11/2005 | Sim-Tang |
| 2005/0257085 A1 | 11/2005 | Haustein et al. |
| 2005/0262097 A1 | 11/2005 | Sim-Tang et al. |
| 2005/0262377 A1 | 11/2005 | Sim-Tang |
| 2005/0267916 A1 | 12/2005 | Tone et al. |
| 2005/0267920 A1 | 12/2005 | Helliker et al. |
| 2006/0020572 A1 | 1/2006 | Ishii et al. |
| 2006/0047714 A1 | 3/2006 | Anderson et al. |
| 2006/0047895 A1 | 3/2006 | Rowan et al. |
| 2006/0047997 A1 | 3/2006 | Anderson et al. |
| 2006/0047999 A1 | 3/2006 | Passerini et al. |
| 2006/0053139 A1 | 3/2006 | Marzinski et al. |
| 2006/0053333 A1 | 3/2006 | Uhlmann et al. |
| 2006/0059209 A1 | 3/2006 | Lashley |
| 2006/0064541 A1 | 3/2006 | Kano |
| 2006/0114497 A1 | 6/2006 | Anderson et al. |
| 2006/0133428 A1 | 6/2006 | Guthrie et al. |
| 2006/0149793 A1 | 7/2006 | Kushwah et al. |
| 2006/0149798 A1 | 7/2006 | Yamagami |
| 2006/0155674 A1 | 7/2006 | Traut et al. |
| 2006/0155912 A1 | 7/2006 | Singh et al. |
| 2006/0206536 A1 | 9/2006 | Sawdon et al. |
| 2006/0212481 A1 | 9/2006 | Stacey et al. |
| 2006/0218434 A1 | 9/2006 | Solhjell |
| 2007/0022117 A1 | 1/2007 | Keohane et al. |
| 2007/0033356 A1 | 2/2007 | Erlikhman |
| 2007/0038887 A1 | 2/2007 | Witte et al. |
| 2007/0038998 A1 | 2/2007 | Fries |
| 2007/0055833 A1 | 3/2007 | Vu et al. |
| 2007/0101421 A1 | 5/2007 | Wesinger, Jr. et al. |
| 2007/0129953 A1 | 6/2007 | Cunningham et al. |
| 2007/0168404 A1 | 7/2007 | Nakamura et al. |
| 2007/0174669 A1 | 7/2007 | Ebata et al. |
| 2007/0244938 A1 | 10/2007 | Michael |
| 2007/0299959 A1 | 12/2007 | Penny et al. |
| 2008/0010411 A1 | 1/2008 | Yang et al. |
| 2008/0046710 A1 | 2/2008 | Maddocks et al. |
| 2008/0134163 A1 | 6/2008 | Golde et al. |
| 2008/0147756 A1 | 6/2008 | Stager et al. |
| 2008/0147821 A1 | 6/2008 | Dietrich et al. |
| 2008/0201390 A1 | 8/2008 | Anguelov |
| 2008/0208933 A1 | 8/2008 | Lyon |
| 2008/0250198 A1 | 10/2008 | Purchase et al. |
| 2008/0294843 A1 | 11/2008 | Atluri et al. |
| 2009/0019308 A1 | 1/2009 | Amano |
| 2009/0070627 A1 | 3/2009 | Lohn et al. |
| 2009/0150906 A1 | 6/2009 | Schmidt et al. |
| 2009/0177718 A1 | 7/2009 | Patterson et al. |
| 2009/0228645 A1 | 9/2009 | Kitamura |
| 2009/0300412 A1 | 12/2009 | Soran et al. |
| 2009/0313503 A1 | 12/2009 | Atluri et al. |
| 2010/0169281 A1 | 7/2010 | Atluri et al. |
| 2010/0169282 A1 | 7/2010 | Atluri et al. |
| 2010/0169283 A1 | 7/2010 | Atluri et al. |
| 2010/0169452 A1 | 7/2010 | Atluri et al. |
| 2010/0169466 A1 | 7/2010 | Atluri et al. |
| 2010/0169587 A1 | 7/2010 | Atluri et al. |
| 2010/0169591 A1 | 7/2010 | Atluri et al. |
| 2010/0169592 A1 | 7/2010 | Atluri et al. |
| 2010/0269146 A1 | 10/2010 | Britt |
| 2011/0078119 A1 | 3/2011 | Soran et al. |
| 2011/0184918 A1 | 7/2011 | Atluri et al. |
| 2011/0258385 A1 | 10/2011 | Soran et al. |
| 2012/0124006 A1 | 5/2012 | Zizys et al. |
| 2012/0173673 A1 | 7/2012 | Dietrich et al. |

OTHER PUBLICATIONS

Kador, J., "Open Middleware: The Next Generation in Distributed Computing", MIDRANGE Systems, Nov. 25, 1994, vol. 7, No. 22, p. S12(4).

"Data Protection—Perform Zero Downtime Backups", Available at least as early as Jan. 2009, Available at <<http://stage.hp.resource.com/sbso/bus_protect/data_protect/zero_downtime>>.

"HP Open View Storage Data Protector 5.1 Software", Available at least as early as Jan. 2009, Available at <<http://www.hp.com/products1/storage/pdfs/media/oVDPds2.pdf>>.

"Storagecraft Technology Corporation: Protecting Windows Servers and PCs with Fast and Reliable Online Backup and Bare Metal Recovery Solutions", Available at least as early as Jan. 2009, Available at <<http://www.rmwtug.org/Talks/ShadowStor/ShadowProtectdsheet.pdf>>.

Al-Kateb, et al., "CME: A temporal Relational Model for Efficient Coalescing", IEEE Xplore, Jun. 2005, pp. 83-90.

Gao, et al., "Visibility Culling for Time-Varying Volume Rendering Using Temporal Occlusion Coherence", IEEE Xplore, Oct. 2004, pp. 147-154.

U.S. Appl. No. 11/438,401, May 21, 2008, Office Action.
U.S. Appl. No. 11/438,401, Nov. 26, 2008, Office Action.
U.S. Appl. No. 11/438,401, Aug. 5, 2009, Office Action.
U.S. Appl. No. 11/438,401, Oct. 22, 2009, Notice of Allowance.
U.S. Appl. No. 12/344,335, Apr. 4, 2011, Office Action.
U.S. Appl. No. 12/344,335, Oct. 28, 2011, Office Action.
U.S. Appl. No. 12/344,335, Jul. 12, 2012, Office Action.
U.S. Appl. No. 12/344,335, Jan. 22, 2013, Office Action.
U.S. Appl. No. 12/344,335, Feb. 13, 2014, Office Action.
U.S. Appl. No. 12/344,335, May 14, 2014, Notice of Allowance.
U.S. Appl. No. 12/344,345, Apr. 12, 2011, Office Action.
U.S. Appl. No. 12/344,345, Sep. 29, 2011, Office Action.
U.S. Appl. No. 12/344,345, Mar. 27, 2012, Office Action.
U.S. Appl. No. 12/344,345, Sep. 7, 2012, Office Action.
U.S. Appl. No. 12/344,345, May 2, 2013, Notice of Allowance.
U.S. Appl. No. 12/691,745, Feb. 15, 2012, Office Action.
U.S. Appl. No. 12/691,745, May 23, 2012, Office Action.
U.S. Appl. No. 12/691,745, Jun. 17, 2013, Office Action.
U.S. Appl. No. 12/691,745, Oct. 22, 2013, Office Action.
U.S. Appl. No. 12/691,745, Jan. 27, 2014, Notice of Allowance.
U.S. Appl. No. 12/344,364, Oct. 7, 2011, Office Action.
U.S. Appl. No. 12/344,364, Feb. 24, 2012, Office Action.
U.S. Appl. No. 12/344,364, May 1, 2013, Notice of Allowance.
U.S. Appl. No. 12/508,633, Sep. 21, 2011, Office Action.
U.S. Appl. No. 12/508,633, Jan. 1, 2012, Office Action.
U.S. Appl. No. 12/508,633, Sep. 26, 2013, Office Action.

(56) References Cited

OTHER PUBLICATIONS

U.S. Appl. No. 12/508,633, Jan. 21, 2014, Office Action.
U.S. Appl. No. 12/508,633, Mar. 18, 2014, Office Action.
U.S. Appl. No. 12/508,633, Jul. 9, 2014, Office Action.
U.S. Appl. No. 12/508,633, Sep. 26, 2014, Notice of Allowance.
U.S. Appl. No. 10/859,368, Feb. 19, 2008, Office Action.
U.S. Appl. No. 10/859,368, Oct. 14, 2008, Office Action.
U.S. Appl. No. 10/859,368, Dec. 2, 2009, Notice of Allowance.
U.S. Appl. No. 11/229,289, Feb. 2, 2009, Office Action.
U.S. Appl. No. 11/229,289, Jul. 27, 2009, Office Action.
U.S. Appl. No. 11/229,289, Oct. 15, 2009, Office Action.
U.S. Appl. No. 11/229,289, Jun. 11, 2010, Office Action.
U.S. Appl. No. 11/229,289, Oct. 18, 2010, Office Action.
U.S. Appl. No. 11/229,289, Feb. 3, 2011, Office Action.
U.S. Appl. No. 11/229,289, Jun. 24, 2011, Notice of Allowance.
U.S. Appl. No. 12/344,323, Sep. 15, 2011, Office Action.
U.S. Appl. No. 12/344,323, Feb. 10, 2012, Office Action.
U.S. Appl. No. 12/344,323, Jun. 5, 2013, Office Action.
U.S. Appl. No. 12/344,323, Oct. 11, 2013, Notice of Allowance.
U.S. Appl. No. 12/344,320, Sep. 7, 2010, Office Action.
U.S. Appl. No. 12/344,320, Jan. 13, 2011, Office Action.
U.S. Appl. No. 12/344,320, Apr. 23, 2014, Office Action.
U.S. Appl. No. 12/344,320, Oct. 29, 2014, Office Action.
U.S. Appl. No. 12/344,319, Sep. 21, 2011, Office Action.
U.S. Appl. No. 12/344,319, Feb. 10, 2012, Office Action.
U.S. Appl. No. 12/344,319, Apr. 25, 2013, Office Action.
U.S. Appl. No. 12/344,319, Jul. 31, 2013, Notice of Allowance.
U.S. Appl. No. 12/344,311, Jun. 23, 2011, Office Action.
U.S. Appl. No. 12/344,311, Dec. 7, 2011, Office Action.
U.S. Appl. No. 12/344,311, Mar. 5, 2012, Notice of Allowance.
U.S. Appl. No. 12/344,315, Mar. 14, 2011, Office Action.
U.S. Appl. No. 12/344,315, Jul. 18, 2011, Notice of Allowance.
U.S. Appl. No. 11/438,036, Feb. 15, 2008, Office Action.
U.S. Appl. No. 11/438,036, Oct. 16, 2008, Office Action.
U.S. Appl. No. 11/438,036, Mar. 24, 2009, Office Action.
U.S. Appl. No. 11/438,036, Oct. 19, 2009, Office Action.
U.S. Appl. No. 11/438,036, Aug. 19, 2010, Office Action.
U.S. Appl. No. 11/438,036, Oct. 13, 2011, Office Action.
U.S. Appl. No. 11/438,036, Jan. 30, 2012, Office Action.
U.S. Appl. No. 11/438,036, Jul. 24, 2013, Office Action.
U.S. Appl. No. 11/438,036, Jan. 16, 2014, Office Action.
U.S. Appl. No. 11/438,036, Jul. 28, 2014, Notice of Allowance.
U.S. Appl. No. 12/186,636, Mar. 24, 2011, Notice of Allowance.

* cited by examiner

SYSTEMS AND METHODS OF EVENT DRIVEN RECOVERY MANAGEMENT

CLAIM OF PRIORITY

This application is a continuation of application Ser. No. 12/508,633, filed Jul. 24, 2009, which is a continuation-in-part of each of the following applications which are incorporated by reference in their entireties:
(1) U.S. patent application Ser. No. 10/859,368 titled "SECONDARY DATA STORAGE AND RECOVERY SYSTEM" filed on Jun. 1, 2004;
(2) U.S. patent application Ser. No. 11/229,289 titled "METHODS AND APPARATUS FOR ACCESSING DATA FROM A PRIMARY STORAGE SYSTEM" filed on Sep. 16, 2005, which is a continuation-in-part of U.S. patent application Ser. No. 10/859,368, filed on Jun. 1, 2004;
(3) U.S. patent application Ser. No. 11/438,036 titled "METHOD AND APPARATUS OF CONTINUOUS DATA BACKUP AND ACCESS USING VIRTUAL MACHINES" filed on May 19, 2006; and
(4) U.S. patent application Ser. No. 11/438,401 titled "RECOVERY POINT DATA VIEW SHIFT THROUGH A DIRECTION-AGNOSTIC ROLL ALGORITHM" filed on May 22, 2006.

FIELD OF TECHNOLOGY

The present invention relates generally to data recovery, and more particularly to systems and methods of event driven recovery management.

BACKGROUND

Recovery management may be performed by storing backup data on a schedule and/or by subjective timing standards. Such storage methods may fail to store data that may be useful for later recovery if the data is altered before a copy is stored. The storage of data based on a schedule may also result in additional storage operations performed on a more frequent basis than necessary, which may require additional storage space for less useful data and/or duplicate copies of the same data. Storage of data based on a schedule and/or by subjective standards may also require additional information from users of a system to determine whether desirable information was available at a particular time. Accordingly, the recovery of data may be hindered, and additional time and expense may be required before useful data is recovered. Performing recovery management by storing backup data using a schedule and/or subjective timing standards may therefore result in a failure to store useful data, additional cost and resource expenditure for storing less useful data, and increased time and effort to recover useful data if it was successfully stored.

SUMMARY

Systems and methods of event driven recovery management are disclosed. In one aspect, a method of providing event driven recovery management includes continually copying one or more data blocks that are generated from a computing device, and associating at least one event marker with the copies of the one or more data blocks. The method further includes allowing access to the copies of the one or more data blocks according to the at least one event marker in order to provide event driven recovery. For purposes of this disclosure, an event marker, a book mark, an application consistency point, and/or a business event are interchangeably used, depending on the context.

The event marker may be generated by the computing device. The event marker may be generated by a source other than the computing device. The event marker may be associated with a timestamp associated with the copies of the one or more data blocks. The event marker may be associated with a timestamp distinct from a timestamp associated with the copies of the one or more data blocks. The event marker may be associated with a sequence number associated with the copies of the one or more data blocks. The event marker may be associated with a sequence number distinct from a sequence number associated with the copies of the one or more data blocks.

The method may include storing the copies of the one or more data blocks in a storage medium. The one or more event markers may be associated with the one or more data block copies after the one or more data block copies are stored to the storage medium. The method may include associating a timestamp that coincides with a clock associated with a recovery server that determines where the one or more data block copies are stored in the storage medium. The data blocks may include data of various sizes.

In another aspect, a system of providing event driven recovery management includes a data interceptor configured to continually copy one or more data blocks that are generated, and a first computing device configured to generate the one or more data blocks and to associate at least one event marker with the copies of the one or more data blocks. The system also includes a second computing device configured to allow access to the copies of the one or more data blocks according to the one or more event marker in order to provide event driven recovery.

The event marker may be generated by the first computing device, and the event marker may be generated by a source other than the first computing device. The event marker may be associated with a timestamp associated with the copies of the one or more data blocks. In addition, the event marker may be associated with a timestamp distinct from a timestamp associated with the copies of the one or more data blocks.

The event marker may be associated with a sequence number associated with the copies of the one or more data blocks. The event marker may also be associated with a sequence number distinct from a sequence number associated with the copies of the one or more data blocks.

Furthermore, the system may include a storage medium configured to store the copies of the one or more data blocks. The one or more event markers may be associated with the one or more data block copies after the one or more data block copies are stored to the storage medium. The second computing device may include a recovery server.

The system may also include a clock associated with the recovery server for associating a timestamp with the at least one event marker. The first computing device and the second computing device may include a single computing device, and the data blocks may include data of various sizes.

In yet another aspect, a computer program embodied on a computer readable medium having instructions for providing event driven recovery management includes continually copying one or more data blocks that are generated from a computing device, associating at least one event marker with the copies of the one or more data blocks, and allowing access to the copies of the one or more data blocks according to the at least one event marker in order to provide event driven recovery. The event marker may be generated by the computing device and/or a source other than the computing device.

The event marker may be associated with a timestamp associated with the copies of the one or more data blocks. The event marker may be associated with a timestamp distinct from a timestamp associated with the copies of the one or more data blocks. The event marker may be associated with a sequence number associated with the copies of the one or more data blocks. The event marker may be associated with a sequence number distinct from a sequence number associated with the copies of the one or more data blocks.

The computer program may further include storing the copies of the one or more data blocks in a storage medium. In addition, the one or more event markers may be associated with the one or more data block copies after the one or more data block copies are stored to the storage medium.

The computer program may include associating a timestamp that coincides with a clock associated with a recovery server that determines where the one or more data block copies are stored in the storage medium. The data blocks may include data of various sizes.

In yet another aspect, the method includes generating a recovery snapshot at a predetermined interval to retain an ability to position forward and backward when a delayed roll back algorithm is applied. The method also includes creating a virtual view of the recovery snapshot using an algorithm tied to an original data, a change log data, and a consistency data related to an event.

The method may include redirecting an access request to the original data based on a meta-data information provided in the virtual view. The method may include substantially retaining a timestamp data, a location of a change, and a time offset of the change as compared with the original data. In addition, the method may include utilizing a relational database to process the change log data in a meta-data format, and to process other on-disk data using a binary-tree format.

The virtual view may be specific to a volume object in a kernel that imitates another volume having the original data. The virtual view may be managed by a kernel space that processes an access request through at least one table using a meta-data created in a retention log. The method may also include exporting the virtual view as a virtual volume using at least one of an iSCSI and a fiber channel transport to an external processing device. The change log data may be applied when the virtual view is unfrozen after a user session reaches a level state.

The method may include generating a series of indexes of the virtual view to enable a linking to an event description of the virtual view rather than to an actual data in the original data. The method may also include automatically creating the virtual view in at least one of a scheduled and an event driven manner. Other features will be apparent from the accompanying drawings and the detailed description that follows.

Other features of the present embodiments will be apparent from the accompanying drawings and from the detailed description that follows.

DETAILED DESCRIPTION

The present invention in varying embodiments provides a method and apparatus for enhancing near-term and long-term data storage in a SAN-based architecture. The methods and apparatus of the present invention are described in enabling detail in various embodiments described below.

Figure 1:
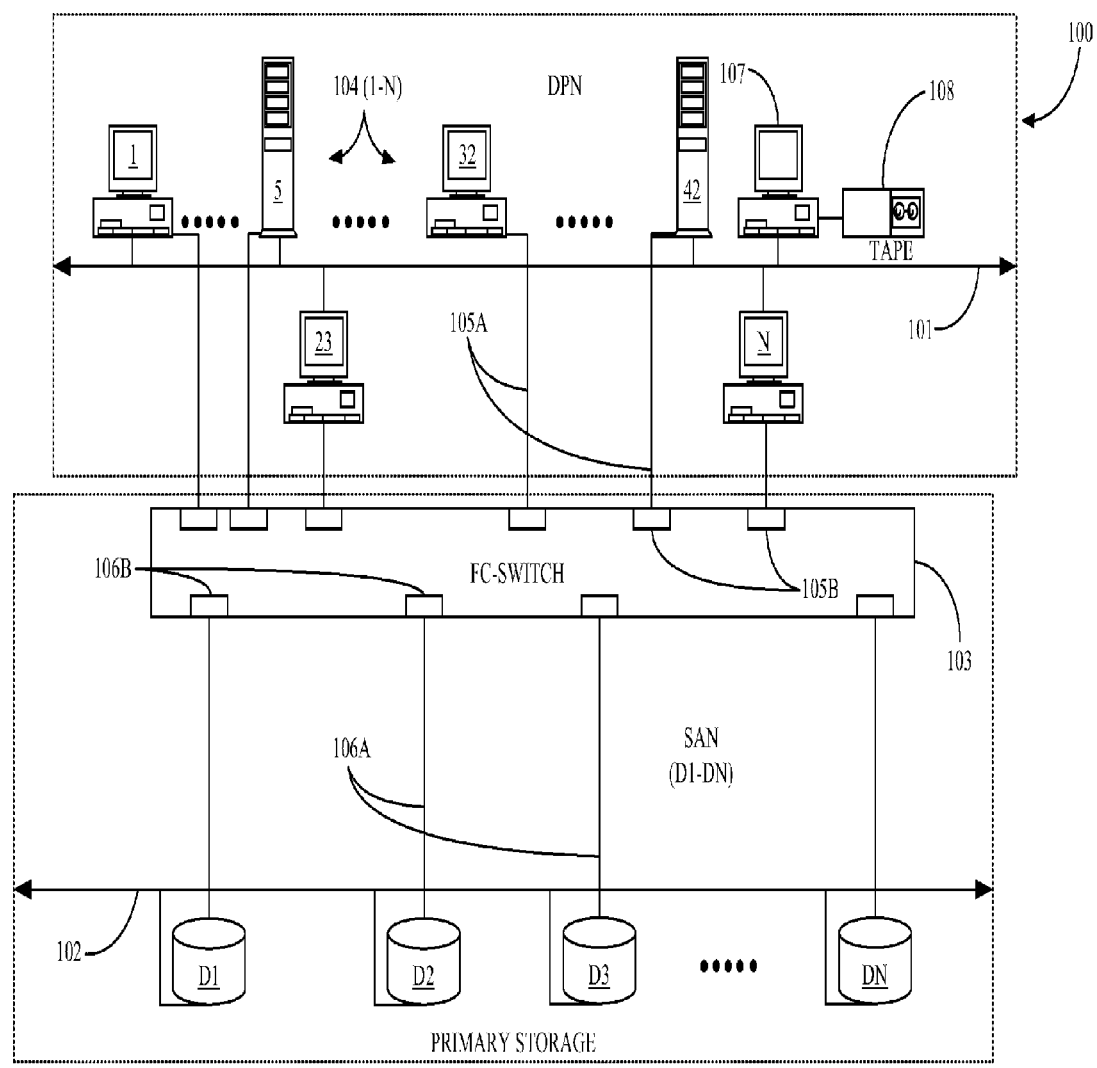
FIG. 1 is an architectural view of a typical SAN-based data storage and recovery network according to prior art.

FIG. 1 is an architectural view of a typical SAN-based data-storage and recovery network according to prior art. A data-packet-network (DPN) 100 is illustrated in this example and is typically configured as a local area network (LAN) supporting a plurality of connected nodes 104 (1-N). DPN 100 may be an IP/Ethernet LAN, an ATM LAN, or another network type such as wide-area-network (WAN) or a metropolitan-area-network (MAN).

For the purpose of this example assume DPN 100 is a LAN network hosted by a particular enterprise. LAN domain 100 is further defined by a network line 101 to which nodes 104 (1-N) are connected for communication. LAN domain 100 may be referred to herein after as LAN 101 when referring to connective architecture. There may be any arbitrary number of nodes 104(1-N) connected to LAN cable 101. Assume for the purposes of this example a robust LAN connecting up to 64 host nodes. Of these, nodes 1, 5, 23, 32, 42, and n are illustrated. A node that subscribes to data back-up services is typically a PC node or a server node. Icons 1, 23, 32, and n represent LAN-connected PCs. Icons 5 and 42 represent LAN connected servers. Servers and PCs 104 (1-N) may or may not have their own direct access storage (DAS) devices, typically hard drives.

A PC node 107 is illustrated in this example and is reserved for archiving back-up data to a tape drive system 108 for long-term storage of data. An administrator familiar with batch-mode data archiving from disk to tape typically operates node 107 for tape backup purposes. Network 100 has connection through a FC switch 103, in this case, a SAN 102 of connected storage devices D1-DN (Disk 1, Disk N). Collectively, D1-DN are referred to herein as primary storage. SAN domain 102 is further defined by SAN network link 109 physically connecting the disks together in daisy-chain architecture. D1-DN may be part of a RAID system of hard disks for example. FC switch 103 may be considered part of the SAN network and is therefore illustrated within the domain of SAN 102.

In some cases an Ethernet switch may replace FC switch 103 if, for example, network 109 is a high-speed Ethernet network. However, for the purpose of description here assume that switch 103 is an FC switch and that network 109 functions according to the FC system model and protocol, which is well known in the art.

Each node 104 (1-N) has a host bus adapter (not shown) to enable communication using FCP protocol layered over FC protocol to FC switch 103 in a dedicated fashion. For example, each connected host that will be backing up data has a separate optical data line 105A in this example connecting that node to a port 105B on switch 103. Some modes may have more that one HBA and may have multiple lines and ports relevant to switch 103. For the purpose of example, assume 64 hosts and therefore 64 separate optical links (Fiber Optic) connecting the hosts to switch 103. In another embodiment however the lines and splitters could be electrical instead of optical.

FC switch 103 has ports 106B and optical links 106A for communication with primary storage media (D1-DN). Fabric in switch 103 routes data generated from certain hosts 104 (1-N) in DPN 100 to certain disks D1-DN for primary data storage purposes as is known in RAID architecture. Data is stored in volumes across D1-DN according to the RAID type that is applied. Volumes may be host segregated or multiple hosts may write to a single volume. D1-DN are logically viewed as one large storage drive. If one host goes down on the network, another host may view and access the volume of data stored for the down host. As is known, under certain RAID types some of the disks store exact copies of data written to primary storage using a technique known as data striping. Such storage designations are configurable.

There will likely be many more ports on the north side of FC switch 103 (facing LAN hosts) than are present on the south side of FC switch 103 (facing primary storage). For example, each host node may have a single HBA (SCSI controller). Each physical storage device connected to SAN network 109 has a target device ID or SCSI ID number, each of which may be further divided by an ID number referred to in the art as a logical unit number (LUN). In some cases a LUN, or device ID number can be further broken down into a sub-device ID or sub logical unit number (SLUN) although this technique is rarely used. In prior art application when a host node, for example node 104 (I), writes to primary storage; the actual write data is transmitted to one of ports 105B over the connected fiber optic line 105A.

From port 105B the data is routed to one of ports 106b and then is transmitted to the appropriate disk, D1, for example. FC transport protocols, including handshake protocols are observed. All data written from host I, for example, to primary storage D1 comprises data that is typically stored in the form of data blocks. Data generated by hosts is typically written to primary storage in a buffered fashion for performance reasons, however most systems support unbuffered writes to primary storage for reliability reasons. At the end of a work period, data and the changes to it that have been stored in primary storage disks D1-DN may be transferred or copied to longer-term tape media provided by tape drive 108. Operating node 107, an administrator copies data from D1-DN and writes the data to tape drive 108.

Each host sends over the data and or its changes for one or more volumes. The data changes have to be computed before they can be sent as they are not tracked continuously, therefore, backup operations are typically performed in batch mode, queuing volumes and or files for one or more hosts, and so on until all hosts 104 (1-N) have been completely backed up to tape media. Each node has a backup window or time it will take to completely preserve all of the data that previously existed and/or the changes that particular node generated in the work period.

Typical time windows may range from 30 minutes for a PC to up two 2 days or more for a robust data server. An administrator must be paid to oversee the backup operations and in the case of large servers backup jobs may be ongoing taking all of the administrator's time. One goal of the present invention is to eliminate the batch mode archiving requirements of data storage and recovery systems. A solution to the manual process can save considerable time and resource.

Figure 2:
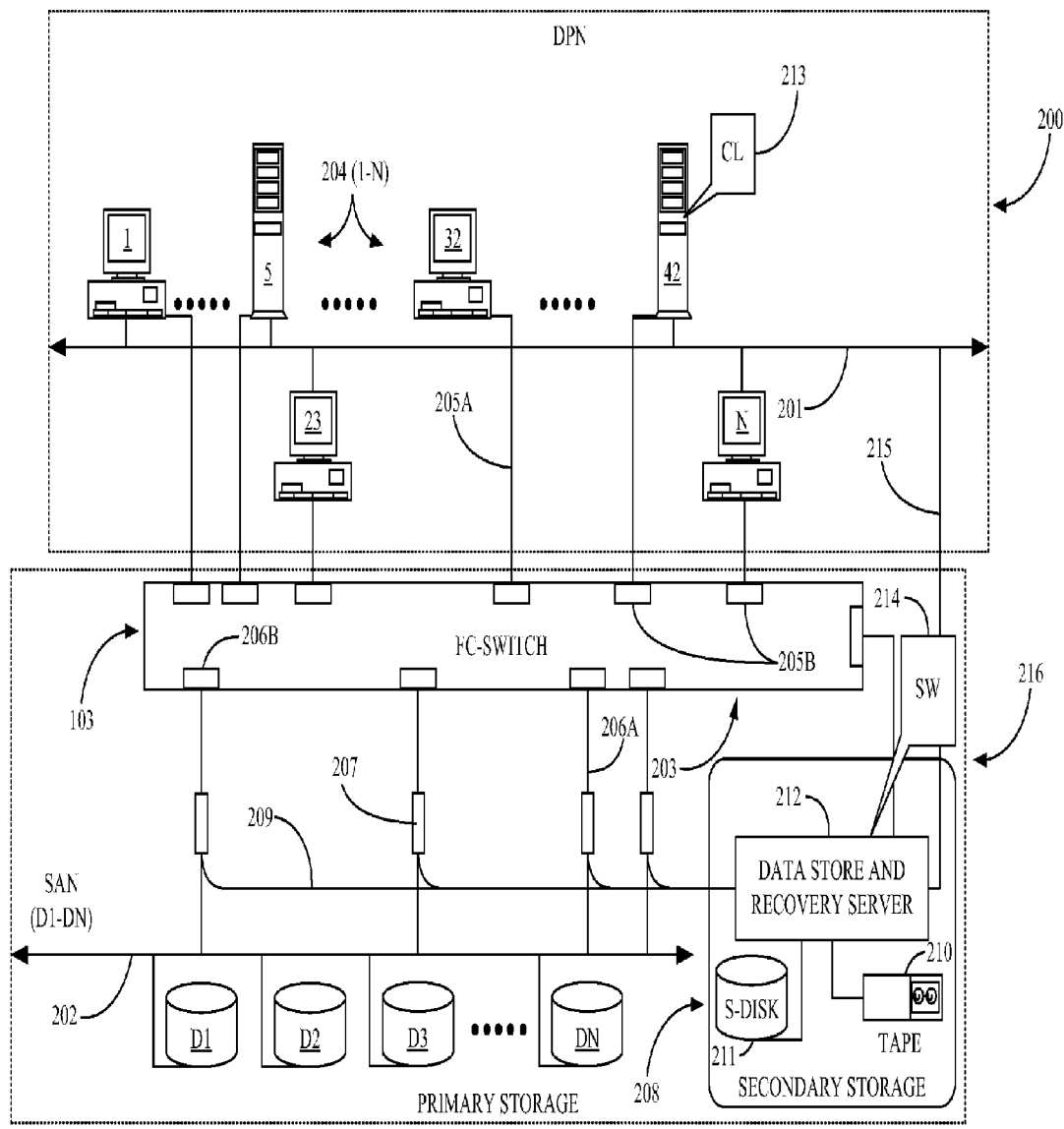
FIG. 2 is an architectural overview of a SAN-based data storage and recovery network according to an embodiment of the present invention.

FIG. 2 is an architectural overview of a SAN-based storage and recovery network according to an embodiment of the present invention. A DPN 200 is illustrated in this embodiment. DPN 200 may be an Ethernet LAN, TCP/IP WAN, or metropolitan area network (MAN), which may be a wireless network. For purpose of discussion assume that DPN 200 is a network similar in design and technology to that of LAN domain 100 described above with references to FIG. 1. An exception to the similarity is that there is no tape drive system or a connected administrator node for controlling tape archiving operations maintained on the north side of the architecture.

LAN domain 200 is further defined in this embodiment by LAN cable 201 providing a physical communication path between nodes 204 (1-N). LAN domain 200 may hereinafter be referred to as LAN 201 when referring to connective architecture. Nodes 204 (1-N) are illustrated as connected to SAN-based FC switch 103 via optical paths 205A and ports 205B mirroring the physical architecture described further above. The SAN network is identified in this example as SAN 216. In this example, nodes I-N each have an instance of client software (CL) 213 defined as a client instance of a secondary data storage and recovery server application described later in this specification. Nodes 204 (1-N) in this example are a mix of PC-based and robust servers that may work in dedicated standalone mode and/or in cooperative fashion to achieve the goals of the enterprise hosting the LAN. For example, server 5 may be an email server and server 42 may be an application server sharing duties with one or more other servers. A common denominator for all of nodes 204 (1-N) is that they all, or nearly all, generate data that has to be backed up for both near term and long-term recovery possibilities in the event of loss of data. Nodes 204 (1-N) may or may not be equipped with direct access storage (DAS) drives.

Nodes 204 (1-N) have dedicated connection paths to SAN FC switch 103 through optical cables 205A and FC ports 205B in a typical architecture. In one embodiment of the present invention high-speed copper wiring may be used in place of fiber optic links. However in a preferred embodiment, the faster technology (fiber) is implemented. The exact number of nodes 204 (1-N) is arbitrary, however up to 64 separate nodes may be assumed in the present example. Therefore, there may be as many as 64 cables 205A and 64 ports 205B on the north side of FC switch 103 in the SAN connection architecture.

Ports 205B on the north side may be assumed to contain all of the functionality and components such as data buffers and the like for enabling any one of nodes 201(1-N) to forge a dedicated connection for the purpose of writing or reading data from storage through FC switch 103. Ports 205B are mapped through the FC fabric to south side ports 206B. Ports 206B are each configured to handle more than one host and number less than the LAN-side ports 205B. One reason for this in a typical architecture is that a limited number of identifiable storage devices are supported on SAN domain 216, which is further defined by network cable 202.

SAN domain 216 may also be referred to herein as SAN 202 when referring to physical connection architecture. D1-DN may number from 2 to fifteen devices in this example; however application of LUNs can logically increase the number of "devices" D1-DN that may be addressed on the network and may be written to by hosts. This should not be considered a limitation in the invention.

SAN 202 is connected to ports 206B on FC switch 103 by way of high-speed optical cabling (206A) as was described further above with reference to FIG. 1 with one exception. A secondary storage sub-system 208 is provided in one embodiment to operate separately from but having data access to the SAN-based storage devices D1-DN. In a preferred embodiment System 208 includes a data-storage and recovery server 212 and at least one secondary storage medium (S-Disk) 211, which in this example, is a DAS system adapted as a SATA drive. In one embodiment disk 211 may be a PATA drive. In this example, server 212 is a dedicated node external from, but directly connected to storage disk 211 via a high-speed data interface such as optical cable. In one embodiment of the present invention server 212 may be PC-based running server and storage software. Disk 211 is, in this example, an external storage device or system however, in another embodiment, it may be internal. In one embodiment of the present invention disk 211 may be logically created or partitioned from the primary storage system including D1-DN on SAN 202. There are many possibilities.

Server 212 has a SW instance 214 installed thereon and executed therein. SW 214 is responsible for data receipt, data validation, data preparation for writing to secondary storage. SW 214 may, in one embodiment, be firmware installed in distributed fashion on line cards (not shown) adapted to receive data. In another embodiment, SW 214 is a mix of server-based software and line card-based firmware. More detail about the functions of instance 214 is given later in this specification. Server 212 has a direct connection to FC switch 103 in this example and with some configuration changes to the FC switch 103 and or the primary storage system including D1-DN has access to all data stored for all hosts in D1-DN over SAN 202 and through the FC fabric. In this example, server 212 also has a direct LAN connection to LAN 201 for both data access and data sharing purposes and for system maintenance purposes. Server 212 can read from primary storage and can sync with primary storage in terms of volume data location offsets when booted up.

However server 212 stores data differently from the way it is stored in primary storage. System 208 includes a tape drive system 210 for archiving data for long-term recovery and storage. System 208 is responsible for providing a secondary storage medium that can be used independently from the primary storage D1-DN for enhanced near-term (disk) and long-term (tape) data backup for hosts 204(1-N) operating on network 201. In this example, data written from hosts to primary storage (D1-DN) is split off from the primary data paths 206A (optical in this example) defining the dedicated host-to-storage channels. This is achieved in this example using a data path splitter 207 installed, one each, in the primary paths on the south side of FC switch 103 in this example. In this way system 208 may acquire an exact copy of all data being written to primary storage.

Data mirrored from the primary data paths is carried on high-speed fiber optics lines 209, which are logically illustrated herein as a single data path in this example for explanation purposes only. In actual practice, server 212 has a plurality of line cards (not shown) installed therein; each card ported and assigned to receive data from one or more splitters.

In one embodiment, data path splitting is performed on the north side of FC switch instead of on the south side. In this case more splitters would be required, one for each data path like 205A. The decision of where in the architecture to install splitters 207 is dependent in part on the number of hosts residing on LAN 201 and the amount of overhead (if installed on the south side) needed to efficiently keep track of source and destination addresses for each frame carrying payload data passing the splitters.

Data is transparently split from primary host paths for use by server 208 to provide enhanced secondary data storage and recovery that greatly reduces the work associated with prior-art operations. Server 212, with the aid of SW 214 provides data storage for hosts onto disk 211 and automated archiving to tape media 210 in a continuous streaming mode as opposed to periodic data back up and tape-transfer operations performed in prior art systems.

In one embodiment WAN data replication may be practiced instead of or in addition to tape archiving. For example, hosts 204(1-N) may be WAN-connected or WAN-enabled through a gateway. Data from disk 211 may be replicated for recovery purposes and sent over the WAN to a proxy system or directly to hosts. The data may be sent in pass through mode (lower level) where there are no application consistency features applied. In one embodiment recovery data may be replicated and sent to hosts in a time shot mode wherein application consistency measures are applied to the data.

In practice of the present invention according to the exemplary embodiment illustrated, a host, say host 5 for example, performs a save operation to a database. The save operation is considered a data write to primary storage. When the data hits splitter 207 after routing has been assigned to the appropriate storage device D1-DN by FC switch 103, an exact copy is mirrored from the splitter (207) to server 212. Server 212 receives the data inline via dedicated line interface and performs in some embodiments unique data optimization techniques before writing the data sequentially to secondary disk 211.

In an alternate embodiment mirroring data from the primary paths of the hosts may be performed within FC switch 103; however modification of switch hardware would be required. Splitting data from either the north side or the south side of switch 103 can be performed using off-the shelf hardware requiring no modification to FC switch 103. In the physical link layer of the FC protocol model there is no discernable difference in splitting data at the north or south side of FC switch 103, however in subsequent protocol layers the characteristics thereof provide some motivations for performing data splitting, optimally, on south side of FC switch 103. Likewise, data may be split at the location of each host 204 (1-N) using similar means. In still another embodiment server 212 may wait and read any new data after it has been written to primary storage. However in this case, an overhead would be created comprising the number of extra reads performed by server 212.

Splitting the data from primary data paths provides the least intrusive or passive method for obtaining the required data for secondary storage. Host machines 204(1-N) may have an instance of client SW (CL) 213 installed thereon and executable there from. CL 213 cooperates with SW 214 running on machine 212 to optimize data writing to secondary storage by helping to reduce or eliminate redundant data writes. Data storage and recovery server 212 keeps a database (not shown) of metadata describing all data frames received that are considered writes (having payloads for write) and optionally reads, the metadata describes at least the source address (IP or MAC), destination address, (LUN), frame sequence number, offset location, length of payload, and time received of each data frame that is copied thereto from the primary data paths from hosts 204 (1-N) to primary storage (D1-DN).

The metadata is used to validate write data. The technique is for ensuring against any data loss theoretically possible due to the split and lack of flow control that it implies. It also is used for reducing or eliminating secondary storage of redundant writes and requires cooperation, in one embodiment from hosts 204 (1-N) running instances of CL 213. In this way redundant writes, for example, of the same data whether created by a same or by separate hosts are not processed by server 212 before data is written to disk 211. Same writes by separate hosts are instead presented as one write identifying both hosts. CL 213 in the above-described embodiment has a utility for creating the metadata descriptions for each pending write performed by the host server or PC. At each write, server 212 receives both the actual data and the associated metadata. The metadata for a set of received write frames is compared with metadata formerly acquired by server 212.

A hit that reveals a same data checksums, length, order and other parameters for a payload indicates a redundant write or one where the data has not changed. More detail about this unique optimization technique is provided later in this specification. Other techniques used by server 212 include the use of a sparse file utility as one layer of one or more compression techniques to optimize the speed of secondary storage to match that of primary storage devices and to facilitate faster data recovery to hosts in the event that it is required. Sparse file technology is based on avoiding storing of unused data blocks. Storage is more efficient because no physical storage space is allocated for portions of the file that do not contain data.

In a predefined embodiment of the present invention, server 212 facilitates writing to secondary data storage in near real time in significantly larger sequential streams than would be possible if the input data itself were written per its normal characteristics. Also in a predefined embodiment of the invention stored data aging past a reasonable time window, perhaps 30-120 days, is archived to tape or other long-term storage media in an automated fashion per flexible policy settings. In still another enhancement to the way data is stored, server 212 is adapted in a preferred embodiment to write data to disk 211 is a sequential fashion instead of a random fashion as is the typical method of prior-art data store mechanics. In still another preferred embodiment any data that is older than a reasonable and configurable time window will be securely and automatically purged. The system of the present invention enables a client to allocate more disk space for primary storage and eliminates periodic data backup and archiving operations. In addition, data recovery back to any requesting host can be performed in a file-based, volume-based, or application-based manner that is transparent across operating systems and platforms. Still another benefit is that secondary storage space can be less than that used for primary storage or for normal secondary disks maintained in primary storage because of data compression techniques used.

One with skill in the art of network-based data storage will recognize that secondary storage system 208 may be provided as a CPE hardware/software system or as a CPE software solution wherein the client provides the physical storage and host machine for running the server application software. In one embodiment, system 208 may be provided as a remote service accessible over networks such as other LANs, MANS. WANs or SAN Islands. In the latter case, instead of using physical path splitters, the system may access data directly from the primary storage system before writing to secondary storage. Some overhead would be required for the extra read operations performed by the system. In a preferred embodiment, the system is implemented as a CPE solution for clients. However that does not limit application to clients using a WAN-based SAN architecture of storage network islands. System 208 is scalable and can be extended to cover more than one separate SAN-based network by adding capability and storage capability.

Figure 3:
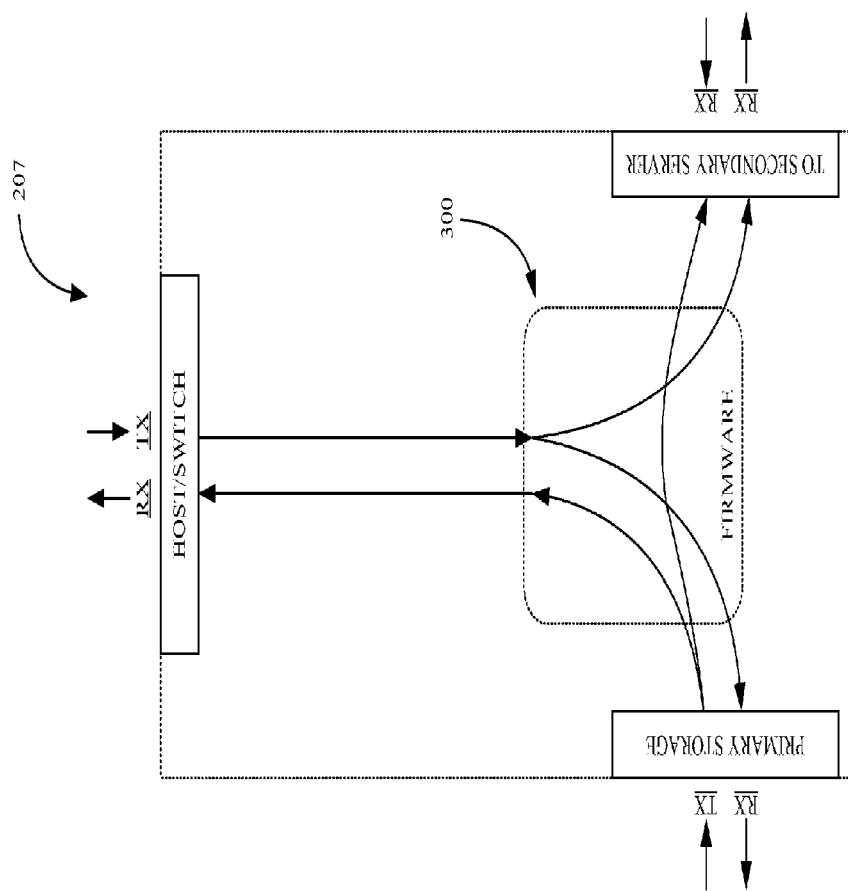
FIG. 3 is a block diagram illustrating data path splitting in the architecture of FIG. 2.

FIG. 3 is a block diagram illustrating data splitting as practiced in the architecture of FIG. 2. Data splitter 207 is in this example is an off-the shelf hardware splitter installed into each primary data path from a host/switch to the primary storage system. As such, splitter 207 has an RX/TX port labeled From Host/Switch, an RX/TX port labeled To Primary Storage, defining the normal data path, and an RX/RX port labeled To Secondary Server, leading to server 212 described with reference to FIG. 2 above. In a preferred embodiment each optical cable has two separate and dedicated lines, one for receiving data sent by the host/switch and one for receiving data sent by the primary storage subsystem. The preponderance of data flows from the switch in this example to primary storage and thereby to secondary storage. Normal FC stack protocol is observed in this example including the Request/response protocol for initiating and concluding a transaction between a host and a primary storage destination. Firmware 300 is illustrated in this example and includes all of the functionality enabling exact copies of each data frame received at the switch-side port and destined to the primary storage port to be split onto the secondary server side port.

In this configuration both the primary storage and secondary storage systems can theoretically communicate independently with any host configured to the FC switch. Referring back to the example of FIG. 2, data mirroring to secondary storage may, in one embodiment, only be performed on the stream that is incoming from a host and destined to primary storage. However in another embodiment server 212 "sees" all communication in both directions of the primary data path hosting a splitter 207. In this way, server 212 can insure that an acknowledgement (ready to receive) signal of the FC handshake has been sent from primary storage to a requesting host so that server 212 "knows" the write has been successful. In this embodiment, no data writes are mirrored to secondary storage if they are not also written to primary storage. In still another embodiment all data from a host to primary storage may not be split to secondary storage. In this embodiment firmware at the splitter is enhanced to mirror only data frames that include a payload or "write data" and, perhaps an associated ACK frame. In this was unnecessary data frames containing no actual write data do not have to be received at server 212. Logical cable 209 represents a plurality of separate fiber optics lines that are ported to Line Cards (not shown) provided within server 212. More detail about line communication capability is provided later in this specification.

Figure 4:
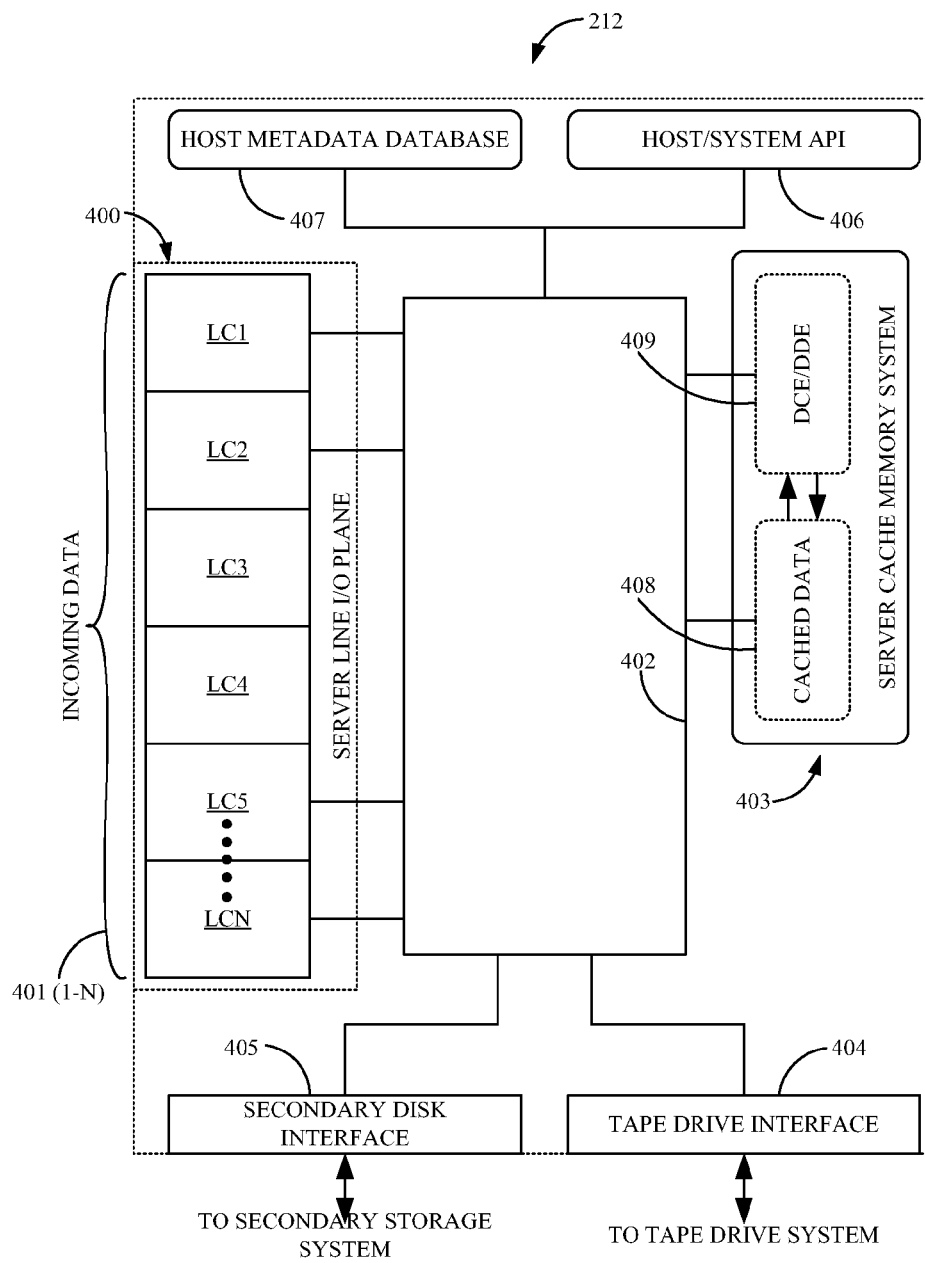
FIG. 4 is a block diagram illustrating components of the secondary storage and recovery server of FIG. 2 according to an embodiment of the present invention.

FIG. 4 is a block diagram illustrating components of secondary storage and recovery server 212 of FIG. 2 according to one embodiment of the present invention. Server 212 is, in this example, a dedicated data server node including just the hardware and software components necessary to carry out the Functions of the present invention. Server 212 has a bank of line cards 400 including line cards (LC) 401(1-N). Each line card 401(1-N) has at least two RX ports and two possibly inactive TX ports configured to receive data from the assigned splitter or splitters 207 described with reference to FIG. 2 above. In one embodiment, one or more line cards 401(1-N) may be dedicated for communication with FC switch 103 for the purpose of control signaling and error signaling and, perhaps direct communication with any host that is configured to FC switch 103.

In one embodiment of the present invention line cards 401(1-N) may include a mix of standard HBAs that engage in two way data transfer and special dedicated cards provided by the inventor and adapted primarily only to receive incoming write data and to offload that data into a cache system represented herein by cache system 403. Each line card 401(1-N) that is adapted to receive copied data from hosts has assigned to it the appropriate FC port 206B including identified hosts 204(1-N) that are assigned to the covered port for communication. The overall data load could be, in one embodiment, balanced among the available line cards 401(1-N). Server 212 has a high-speed server bus logically represented herein as bus structure 402. Bus 402 connects all necessary components together for communication within the server and to external components. A communication bus controller is not illustrated in the example, but may be assumed to be present. Each line card 401(1-N) has a direct link to a server cache memory system 403 over logical bus 402. All data received on line cards 401(1-N) that is considered read/write data is cached in one embodiment in cache memory system 403, the data represented herein by a block 408 labeled cached data. Data buffers and other components of cache system 403 and line cards 401(1-N) are not illustrated but may be assumed to be present. More detail about a unique line card adapted for receiving data for secondary storage is provided later in this specification. Server 212 has an I/O interface 405 to an external secondary storage disk or disk array analogous to storage disk 211 described with reference to FIG. 2 above. I/O interface 405 includes all of the necessary circuitry for enabling data writing to secondary storage from cache system 403 on a continuous streaming basis as data becomes available.

In one embodiment data cache optimization is performed wherein redundant frames including read requests and, in one embodiment, redundant writes are deleted leaving only valid write data. In a preferred embodiment, elimination of redundant writes is a line card function physically carried out on designated cards 401(1-N). In one embodiment the line cards 401(1-N) can write directly to the secondary storage through the I/O interface 405 using a shared file system module provided for the purpose. Server 212 has an I/O interface 404 to an external tape drive system analogous to tape drive system 210 described with reference to FIG. 2 above. Interface 404 includes all of the necessary circuitry for enable continuous writes to tape according to data availability for archiving long term storage data.

In one embodiment the I/O interfaces 404 and 405 can be one and the same. Server 212 includes a host/system application program interface (API) 406 adapted to enable communication to any LAN-connected host bypassing the FC architecture over a separate LAN communication link analogous to link 215 described with reference to FIG. 2. Interface 406 may, in one embodiment, be used in data recovery operations so that recovery data does not have to be conducted through a primary host-to-storage data path exclusively. Server 212 also has internal storage memory 407, which in this case is adapted to store metadata about data frames that are written to secondary storage and used by certain LCs 401(1-N) to validate that a particular write carries data that has changed from a last data write to related data. The metadata includes but is not limited to host ID, a destination ID (LUN ID), an offset location in primary storage allocated for the pending write, and the length value of the payload.

Host nodes 204(1-N), in one embodiment create the metadata sets with the aid of CL instance 213 described with reference to FIG. 2 when frames having write payloads are packaged for send through FC switch 103 to primary storage. The metadata can be sent either through the SAN or the LAN and is received at server 212 after the associated data frames. Each metadata set received is compared at least by payload length, and offset location to metadata sets previously received from a same host during a work period. Server 212 may, in one embodiment create hash values of metadata fields for use in a data search of a centrally located database containing all of the host metadata. In this embodiment the CL instance 213 may also create a hash value from the metadata set and exchange it with server 212 as a faster way of matching metadata sets. A hit, as described further above, indicates that the pending write as a duplicate payload already stored for the originating host or for another host or hosts. In this embodiment, redundant write frames can be eliminated onboard a LC without consulting database 407. For example, a limited amount of metadata may be retained for a specified period after it is received to any line card 401. This near-term metadata on a single line card describes only the data writes previously performed by hosts that are configured to the data path of that card. Metadata on other cards describes data sent by the hosts configured to those cards.

In another embodiment, metadata about data writes is generated at a line card analogous to the one described further above as the data is received from splitter 206A instead of at the host. In this embodiment, the generated metadata is immediately compared with previously generated and stored metadata either on board or in conjunction with an off-board database. Although not preferred, it is possible to send generated metadata lists to LAN hosts so that metadata generated at a LAN host can be compared locally before writes are completed.

In this aspect redundant saves may be prevented from entering the primary data path. In a preferred embodiment only change data written and sent for write from hosts 204(1-N) to primary storage is stored in secondary storage. In this embodiment data changes are also held separately as revisions from previous changes to a same volume of data. The purpose of this is to provide revision selectable and time-based recovery of data. In prior art systems old data is typically overwritten by new data including the change data and recovery is limited to recovery of the latest saved version of any data file.

Data changes are stored in disk 211 separately but linked to the relevant data block or blocks that the new revisions or versions apply to. Each time a new revision of data is recorded, it is also time stamped so that a host wishing to recover a specific version of a file, for example can select a desired time-based version or versions of a single file. In this way no data is lost to a host machine because it was over written by a later version of the same data. Cache system 403 has a data compression/decompression engine (DCEDDE) 409 provided therein for the purpose of compressing data before writing the data to secondary storage disk 211. In a preferred embodiment write data is prepared with a sparse file utility and then compressed before writing the data sequentially to storage disk 211. This technique enables more disk area to be utilized and with sequential storage, enables faster retrieval of data for recovery purposes. In one embodiment the DCEDDE can be embedded with the line cards 401(1-N).

In one embodiment, when data is served to one or more hosts during near term recovery (up to 30 days) it may be retrieved and served in compressed format. CL 213 running on host machines may, in this case, be adapted with a decompression engine for the purpose of decompression and access to the recovered data locally. This embodiment may be practiced for example, if volume recovery is requested over an IP connection or across a LAN network. In one embodiment, data streamed to tape drive (211) is decompressed and rendered in a higher-level application file format before transfer to storage tape for long-term archiving. In a preferred embodiment, data offload to tape is an automated process that runs on a schedule that may consider the amount of time data has remained in secondary storage. In another embodiment tape archiving is triggered when a physical storage limit or a time based policy condition has been reached.

Figure 5A:
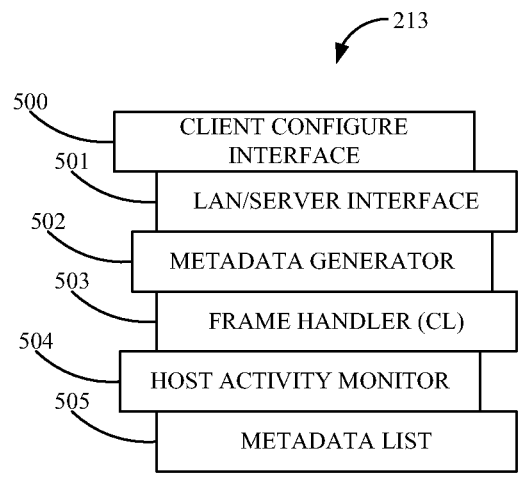
FIG. 5A is a block diagram illustrating client SW components of the SW of FIG. 2 according to an embodiment of the present invention.

FIG. 5A is a block diagram illustrating client SW components of client 213 of FIG. 2 according to an embodiment of the present invention. CL 213 has a client configure interface 500 enabling a LAN or remote network connection to and communication with server 212 described with reference to FIG. 4 for purpose of configuring a new LAN host to the system. This interface may be of the form of a Web browser interface that may also include a remote LAN to server interface 501 for manual configuration. Any LAN host may be configured or through an intermediate server as to what type and scope of data backup the host will practice. This consideration may vary according to task assignment from backup of all generated data to only certain types of critical data. In one less preferred embodiment CL 213 has a shared metadata list 505 for the purpose of checking if pending writes that may be redundant writes.

In another embodiment a metadata-generating utility 502 is used to create metadata descriptions of each pending write that has been approved for the host. In this case, the metadata are associated to the frames containing the payload data and sent with each physical data frame by a frame or file handler 503. In another embodiment metadata generated is sent to the system host server (212) via LAN, bypassing the FC switch (193).

SW 500 may include, in one embodiment, a host activity monitor 504 that is provided and adapted to monitor host activity including boot activity and task activity. It may be that a host is running more than one application simultaneously and saving data generated by the separate applications as work takes place within the host. Monitor 504 is responsible for spawning the appropriate number of metadata generation utility instances 502 for the appropriate tasks occurring simultaneously within the host if the host is configured to generate metadata. In another embodiment, CL SW 500 is kept purposely light in terms of components, perhaps only containing a configure interface, a LAN to server link, and an activity monitor. In this case the application and OS of the LAN host works normally to save data changes and the metadata is generated and compared on the server side of the system. There are many possibilities.

Figure 5B:
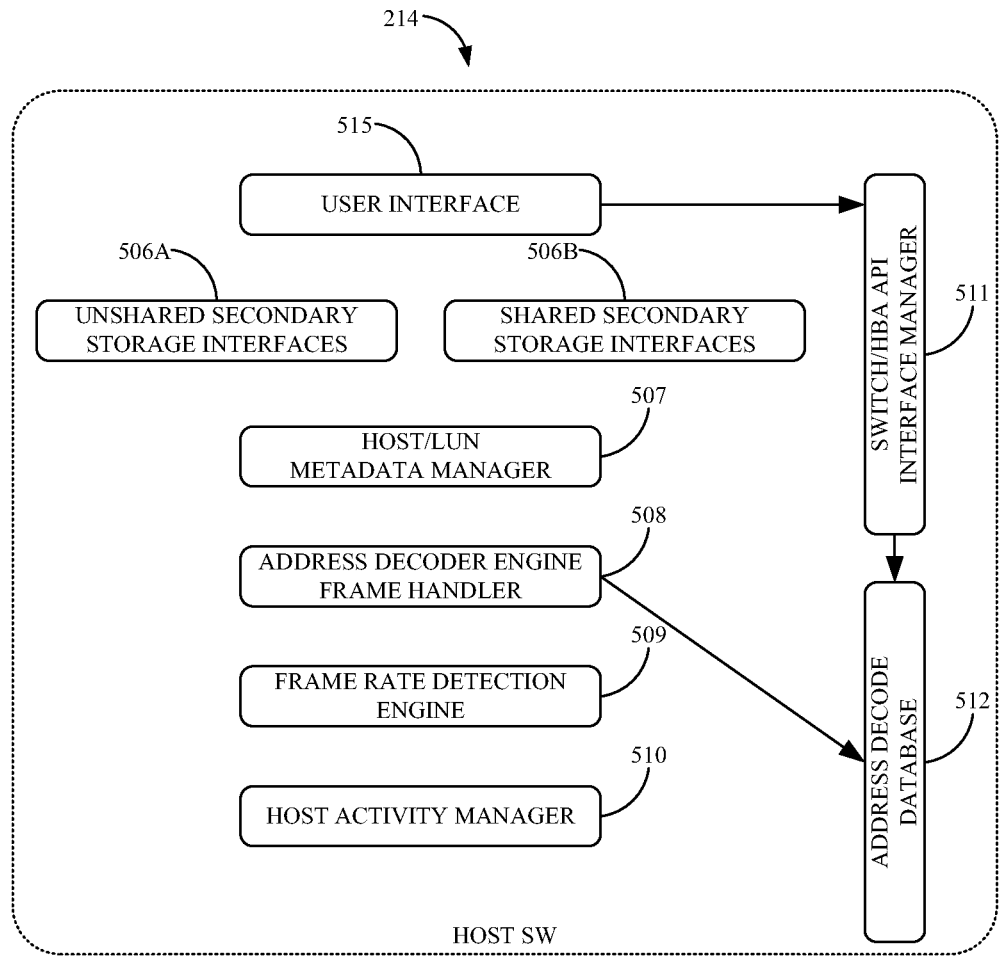
FIG. 5B is a block diagram illustrating components of the host SW of FIG. 2 according to an embodiment of the present invention.

FIG. 5B is a block diagram illustrating components of host SW 214 of FIG. 2 according to an embodiment of the present invention. SW 214 may be a mix of server software and line card firmware without departing from the spirit and scope of the present invention. SW 214 has a user interface 505 adapted for enabling remote configuration of LAN or WAN host machines that will have data backed up to near and long-term storage.

Interface 505 can be accessed via LAN or WAN connection and in some embodiments through a master server or intermediate server acting as a master server for distributed system sites. SW 214 has a switch HBA API interface 511 for enabling communication between the system (server 212) and an FC switch analogous to switch 103. In one embodiment interface 511 may be adapted for interface to an Ethernet switch. SW 214 has a pair of secondary storage interfaces 506A and 506B, which are optionally adapted to enable either shared write capability or unshared write capability to secondary storage from the server. Interface 506A is optional in an embodiment wherein one or more specially adapted line cards in the server are enabled to compress and write data directly to secondary storage from an onboard cache system thereby bypassing use of a server bus. In this case unshared implies that each line card adapted to write data to secondary storage may do so simultaneously and independently from one another.

In one embodiment all data writes to secondary storage are performed by the host server from a server cache memory. In this case interface 506B (shared) is used. All line cards adapted to send data to secondary storage in this case send their data onto a PCI or other suitable type of server bus (shared) into a server cache memory from whence the data is compressed and then written into secondary storage (disk 211). SW 214 has a host/LUN metadata manager utility 507 adapted either as a piece of software running on the server, or as distributed instances of fm ware running on line cards responsible for writing or sending their data for write into secondary storage. Manager utility 507 functions in one embodiment to compare metadata about physical data received in line with previous metadata sent from a same host to check for redundant writes against the same host and against writes performed by other hosts as well. In this way only valid changes are secured to the secondary storage media.

In another embodiment manager utility 507 is also adapted to generate metadata for comparison from data received from the data splitting junction for each line card. In this embodiment, the generated metadata is immediate compared with host metadata either onboard the line card or in conjunction with a server database containing a specific amount of metadata from all configured hosts. In one embodiment metadata is received at the server from hosts via LAN or WAN link and is not received by a line card from the FC switch. In this case the line card is adapted only to receive data from the split in the designated primary data path between a host and primary storage. Metadata lists generated at host machines can be exchanged periodically with server 212 off-board from line cards. SW 214 has a frame handler with an address decoder engine 508 adapted, in a preferred embodiment as firmware installed on line cards adapted to receive data changes from host machines through the suitable split data path.

Utility 508 works in conjunction with a configurable address decode database 512, which is adapted to retain host machine address information such as IP or MAC address depending on the network protocol used. Decode database 512 is populated through user interface 505 and interface manager 511. Configuration then provides both the home network information of a host and the FC or Ethernet port assignments and splitter address (if required). Decoder engine 509 is responsible for decoding incoming data frames so that payloads for write may be properly identified. LUN destination, source destination, payload length, timestamp information, splitter ID (if required), and other information is provided from decoding incoming frames.

In one embodiment of the present invention, SW 214 has a frame rate detection engine 509 adapted as a distributed firmware component installed on each line card adapted for backup duties. The purpose of detecting frame rate is to enable proper adjustment of buffer load and speed according to the actual data speed over the link. A host activity manager 510 is provided and adapted to log host activity reported by a client component residing on the host or by actual data activity occurring on a line card assigned to the host. Software 214 may contain additional components not mentioned in this example without departing £tom the spirit and scope of the present invention. Likewise some components illustrated may not be required such as the host activity manager 510, or one of the secondary storage interface types. SW 214, in a preferred embodiment, resides at least partially in the form of distributed firmware on special line cards provided by the inventor and dedicated to receive and process data incoming from the primary data path via optical splitter.

Figure 6:
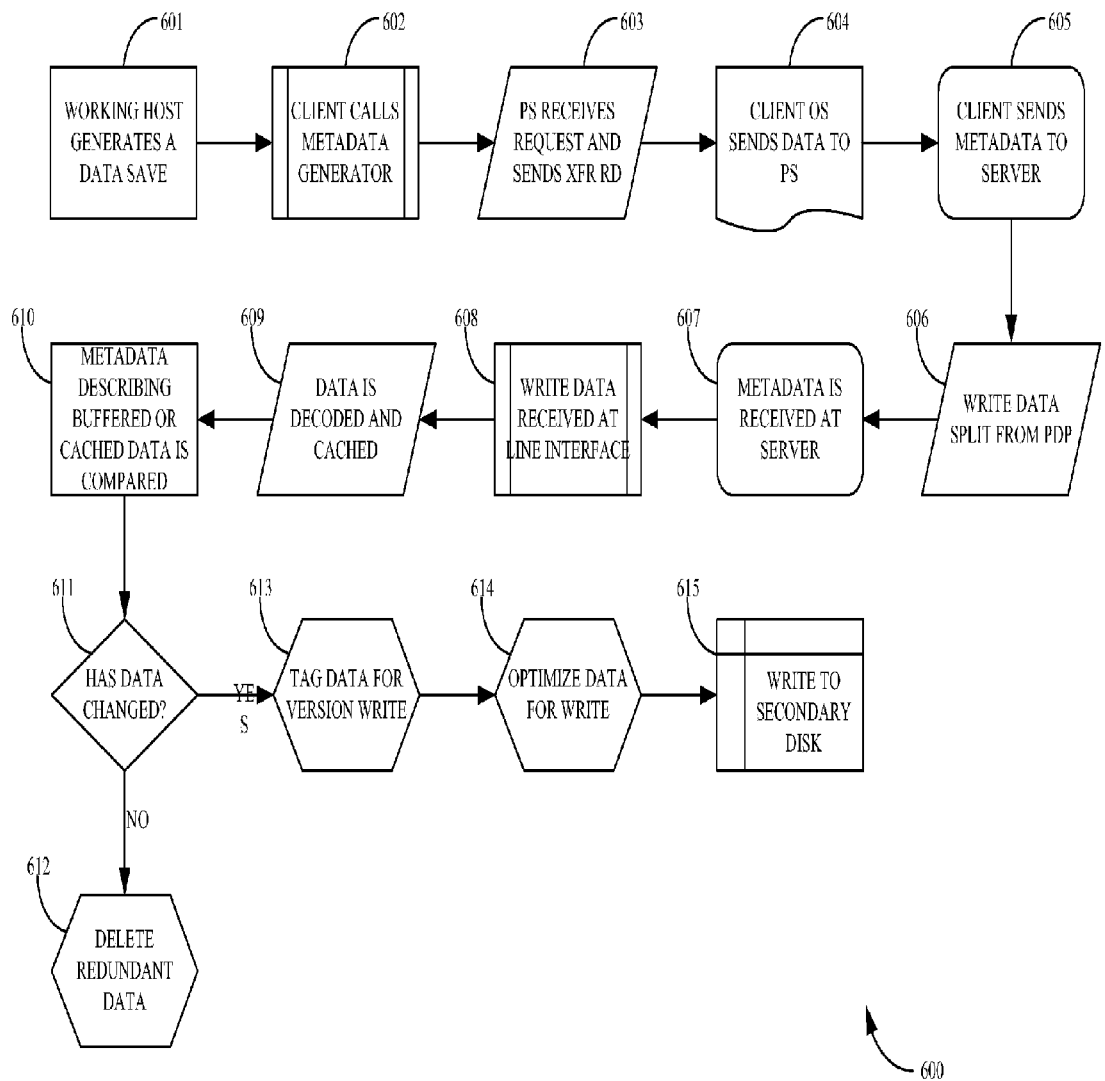
FIG. 6 is a flow chart illustrating a process for writing data to secondary storage according to an embodiment of the present invention.

FIG. 6 is a flow chart 600 illustrating a process for sending change data and writing the change data to secondary storage according to an embodiment of the present invention. At step 601, a LAN host analogous to one of hosts 204(1-N) described above generates a data save operation (s). It will be appreciated by one with skill in data transfer that data sent from any host is sent as soon as it is physically "saved to disk" at the host.

In one embodiment, replication is preformed if the host uses a local drive but is configured to send data changes through the FC switch to PS. At step 602, in one application, metadata describing parameters of the change data are generated by the client SW (213). CL 213 is configured to consider that each save operation performed by a host is a potential data write to primary storage although at this point it is not clear that it is a write containing change data. Therefore, each save made by an application working with files or other data whose data is to be backed up, is considered a write request, which must be initiated from the point of a host and must be acknowledged by the primary storage system before any writes are actually sent. At step 603, the primary storage system receives a request from the client OS and sends an XFER RD (equivalent to acceptance of the request) back to the OS to get ready for the data transmission over the primary data path. It is noted herein that the request and confirmation of the pending transmission are visible on the assigned line card designated to receive data split from the primary data path (PDP).

In one embodiment of the present invention wherein the secondary storage system (208) is remote from the operating LAN or WAN over IP, data replication is used over IP tunneling protocols or other suitable transport protocols to send the exact data copies of data generated by one or more hosts to the secondary storage system server. At step 604, the host, or client OS then sends the data over the PDP. The transmission is responded to by acknowledge and completion status packets. In one embodiment, these packets are used by server 212 to guarantee fidelity of writes to the secondary storage system by making sure that the writes to primary storage (PS) actually happened before storage space is allotted and writes are committed to the secondary storage.

In one embodiment, at step 605 CL (213) residing on the sending host generates metadata describing frames carrying a payload for write during a session with primary storage. The metadata describes aspects of the actual data frames it is associated with. For example, the host ID on the LAN and the destination device ID or LUN number is described. The offset position allocated by primary storage (received in ACK) is described. The frame sequence numbers are described, and the actual length of the data payload of the frame or frames is described. At step 605, the metadata, if generated by the client, is preferably sent over LAN, WAN, or other link to server 212 and not over the PDP between the client machine and the PS system. The metadata of step 605 may describe all of the data "saved" and not just the changed data (if any). Moreover, the metadata may be continuously or periodically shared with server 212 from the client Os. The metadata is compared to previous metadata generated by the client to isolate "changed data" received at the server line interface.

In another embodiment metadata is not generated in step 602 or sent to server 212 in step 605, rather, metadata is generated at server side, more particularly at the specific line interface receiving the data split from the PDP. In this case change data is isolated at server side by comparing recent metadata against a metadata database. Metadata "hits" describing a same LUN, payload length, source address, offset location, etc., are considered redundant writes or duplicate writes that contain no new information.

In this way processing is reduced. At step 606, the data sent over the PDP by the client machine is transparently split from the path onto a path leading to server 212 and a receiving line card. It is noted herein that data frames having no payload and therefore not considered a potential write may be ignored from the perspective of secondary storage caching.

At step 607, the latest metadata describing the saved data is received at server 212 either in server cache, or in one embodiment, to a special memory allocated for the purpose. In another embodiment the metadata may be routed through the server to the appropriate line cad that received the latest "save" data from the same client machine. At step 608, data split from the PDP is received at the appropriate line interface. It is possible that a single line interface will process frames from multiple client machines. Proper frame decoding is used to identify and segregate data frames. At step 609, data received at step 608 is decoded and cached. Data caching may involve offloading into a server cache.

In one embodiment data caching may be performed onboard the line interface wherein the line interface has a capability for writing directly to secondary storage as described further above. In the latter case metadata comparison may also be performed onboard without using server resources. The metadata database could be carried onboard to a limited extent. In either embodiment (line card based; server cache based), at step 610, the metadata describing the latest "save data" for the client is compared against previous metadata stored for the client.

The comparison "looks" for hits regarding source ID, LUN ID, payload length; checksums value, and offset location allocated for PS to identify redundant frames or frames that do not contain any changed data in their payload portions. At step 611, the system determines for the preponderance of frames cached for write whether data has actually changed from a last "save" operation performed by the client. For each frame payload, if data has not changed then the data is purged from cache and is not written to secondary storage in step 612.

At step 611, if it is determined for any frames that the payload has changed (is different), then at step 613, those data units are tagged for write to secondary storage.

At step 614, those data units of the "save session" that are considered valid writes reflecting actual changed data are further optimized for storage by using a sparse file utility to create sparse files for saving storage space and faster near-term data recovery along with a compression algorithm to further compress the data. At step 615, the data is sequentially written to the secondary storage media analogous to disk 211 described with reference to FIG. 2 above. At step 615, the existing data that would normally be overwritten with the new data is not overwritten. Rather, the change data is recorded as a time-based revision of the original file (viewing from an application level perspective). Similarly as new data changes have for the same data file, they too are recorded separately from the previous change. In this way file based and time-based recovery services may be offered wherein the client can browse the number of revised versions of a same file, for example, and recover only the version or versions desired.

Data on the secondary storage system is viewable as volume block data, file system data, and application level data. It is also recoverable in the same views. Primary storage offset locations will be different than secondary storage offset locations. However, communication capability between the disk storage systems enables synchronizing of positions so that one may be directed to the exact writer or read position in either system from the domain of either system.

One with skill in the art will appreciate that the secondary storage system of the present invention may be applied locally as a self-contained CPE solution or as a remotely accessible service without departing from the spirit and scope of the present invention. Performance of the primary data channels between host nodes and primary storage are not taxed in any way by the secondary storage system. Much work associated with manually directed backup operations as performed in prior art environments is eliminated.

Figure 7:
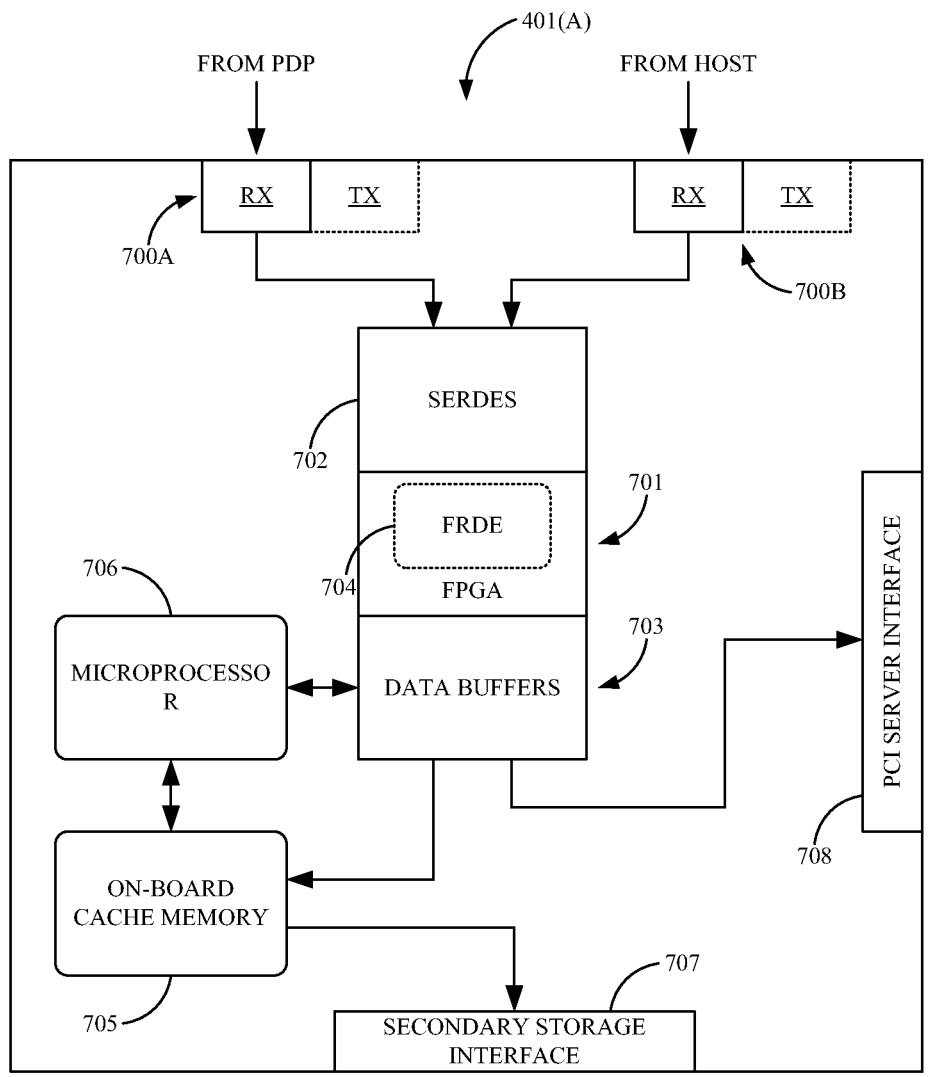
FIG. 7 is a block diagram illustrating components of one of line cards of FIG. 4 according to an embodiment of the present invention.

FIG. 7 is a block diagram illustrating components of one of line cards 401(1-N) of FIG. 4 according to an embodiment of the present invention. Line card (LC) 401(1) can be any one of cards 401 that are dedicated for receive only of split data from PDPs. The designation 401(1) is arbitrary. Card 401(1) may hereinafter be referred to simply as card 401. Card 401 has an RX port 700A capable of receiving data transparently split from a PS system analogous to the PS system (D1-DN) of FIG. 2 above. It is noted that card 401 cannot send data to the PS through the splitter onto the PDP. Card 401 also has an RX port 700B capable of receiving data transparently spit from a client machine or LAN host analogous to one or more of hosts 204(1-N) of FIG. 2. Similarly, card 401 cannot send data to any host through the splitter onto the PDP. The incoming lines are one way only so that data splitting is completely passive.

In one embodiment card 401 is fabricated from the ground up to include only RX ports specially adapted to receive split data. In another embodiment a generic card blank is used but the TX port circuitry is disabled from sending any data.

A Field Programmable Gate Array (FPGA) 701 is provided to card 401 and is adapted among other purposes for maintaining proper data rate through card 401 into cache and to secondary storage. FPGA 701 is associated with a serializer/de-serializer (SERDIES) device 702, which are known in the art and adapted for serializing and de-serializing data streams in data streaming devices. Device 702 de-serializes the data stream incoming from RX ports 700A and 700B for analysis and buffer loading. Card 401 has a data buffer or buffers provided thereto and adapted to hold data incoming from a splitter for processing. Data is streamed into card 401 and streamed out to secondary storage in near real time. That is to say that all data changes from hosts for write to secondary storage are processed from an incoming stream and offloaded in an outgoing stream for write to secondary storage.

In a streaming embodiment it is important to know the current data rate of incoming data so that processing data buffering and data outflow runs smoothly without overloading or under utilizing the data buffers and without having to discard any important data frames. Card 401 can only receive data from the splitter so it has no physical link control. Therefore, a method has to be implemented for deducing the actual data rate of the incoming stream and for fine-tuning the processing and buffer performance accordingly.

FPGA 701 has a frame rate detection engine (FRDE) 704 installed therein through firmware programming. FRDE 704 uses PLL and other technologies to fine-tune SERDIES performance, buffer performance and other internal data processing streams to a stable and constant data rate deduced through PLL methods. Card 401 has a microprocessor 706 provided thereto and having processing access to data residing in buffers 703. Processor 706 performs metadata comparison in one embodiment where it is practiced onboard rather than off-board using the server CPU. Processor 706 may also perform frame decoding, address decoding, data compression and data writing Functions in one embodiment utilizing an onboard cache memory 705.

Card 401 has a secondary storage interface 707 analogous to the unshared interface 506A of FIG. 5B and a PC1 server interface 708 analogous to the shared interface 506B of the same. Each interface is optional as long as one is used. Cache memory 705 is also optional in one embodiment. In another embodiment all described components and interfaces are present n card 401 and may be programmed for optional use states either offloading data from buffers through the server interface onto a server bus and into a server cache for further processing, or by emptying buffers into cache 705 for further processing and direct writing through interface 707 to secondary storage bypassing server resources altogether.

The present invention is not limited to SCSI, FC, or SAN architectures. DAS and NAS embodiments are possible wherein FC switches or Ethernet Hubs between separate networks are not required. Likewise, several SANS connected by a larger WAN may be provided secondary storage and recovery services from a central network-connected location, or from a plurality of systems distributed over the WAN. VIF' security and tunneling protocols can be used to enhance performance of WAN-based distributed systems.

SAN-Based Direct Read Access

According to another embodiment of the present invention, a method and apparatus for direct-read access from a remote location to one or more primary storage systems connected to a storage area network for data backup purposes is provided.

The methods and apparatus of the present invention are described in enabling detail in various embodiments described below.

Figure 8:
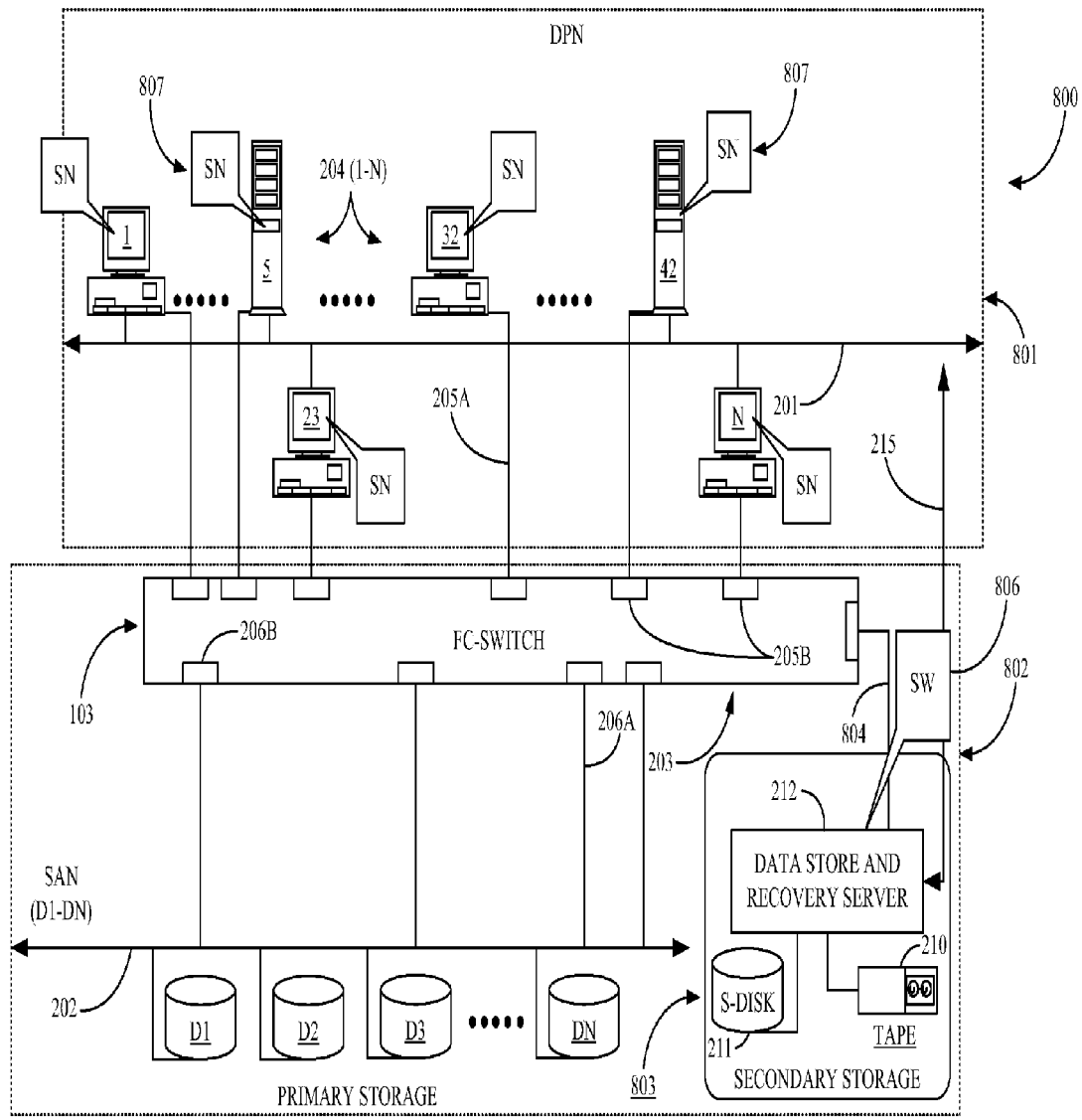
FIG. 8 is an architectural overview of a SAN-based data storage and recovery network according to an embodiment of the present invention.

FIG. 8 is an architectural overview 800 of a Storage Area Network (SAN) based data storage and recovery network according to an embodiment of the present invention. Network 800 includes a data-packet-network (DPN) 801 and a SAN-based storage network 802. Also provided according to an embodiment of the present invention is a secondary data storage and recovery facility 803. Network 801 may be a local-area-network (LAN), or a wide-area-network (WAN). In this embodiment DPN 801 is analogous to DPN 200 of FIG. 2 above and therefore may be an Ethernet LAN, Transfer Control Protocol/Internet Protocol (TCPAP) enabled WAN, or metropolitan area network (MAN), which may be a wireless network.

Some elements of this example of FIG. 8 are the same as elements described with reference to FIG. 2 above and therefore some elements not significantly altered by the present invention shall retain their same element numbers of FIG. 2 and shall not necessarily be re-introduced. DPN 801 connects hosts 204(1-N) for communication using, in this case, network cabling 201. Illustrated hosts include hosts 1, 5, 23, 32, 42, and N. Each host in this example has connection to SAN fabric switch 103 using Fibre Channel (FC) protocols, which may be afforded the same description as given above with reference to the fabric switch of the same element number in FIG. 1.

An Ethernet switch may replace switch 103 in one embodiment without departing from the spirit and scope of the present invention. Hosts 204(1-N) each have connection to switch 103 via high-speed optical, or in some embodiments copper connection cables 205A and north-side FC ports 205B. Switch 103 may be considered part of SAN network 802 and is included therein in this illustration. On the south side of switch 103, ports 206B provide access to primary storage illustrated herein as SAN (D1-DN).

Primary storage, in this case, encompasses D1, D2, D3, through DN and may be accomplished using raid array technologies as described above with reference to FIG. 2. Backbone 202 provides storage disk connection and disk inter-relate ability in this architecture. Network cables 206A (optical or copper) provide hardwiring between ports 206B and SAN backbone 202. In this example, data writes to primary storage are not split-off from the host-to storage data paths using a data splitter as was illustrated in the embodiment of FIG. 2 above with reference to data path splitter 207. Rather, data writes are read directly from primary storage and written to secondary storage facility 803. Therefore, the number of Host Bus Adaptors required by hosts interfacing with FC switch 103 will depend on the input/output load configuration of the primary storage subsystem. Likewise, the number of line cards installed in data store and recovery server, also referred to herein as a secondary storage server 212 can be significantly reduced.

Facility 803 includes storage disk (S-Disk) 211, which may be a serial advanced technology attached (SATA) or a parallel advanced technology attached (PATA) storage disk, a data store and recovery server 212 and a tape storage media 210 all previously described with reference to FIG. 2 above. It is noted herein that S-Disk 211 is not limited to a PATA or SATA disk. Disk 211 may be one of a SCSI disk, an FC disk, a SAS disk, an iSCSI disk and so on. In this example, server 212 has a direct FC connection 804 to FC switch 103, and a TCP/IP-enabled high-speed network communication line connection 215 to DPN backbone 201 for direct network communication with networked hosts 204(1-N). In a preferred embodiment high speed optical cabling is used for storage access and high speed DSL, broadband, or other high-speed network technologies may be used for communication between hosts 204 (1-N) and server 212. All applicable protocols such as SCSI, iSCSI, FCIP, including variations or versions thereof, Ethernet, TCP/IP, and other network and data protocols may be assumed to be capably active in this architecture. For example, in the case of iSCSI, server 212 would have access to primary storage over IP using a host bus adapter (HBA) and a network interface card PIC).

In an Ethernet embodiment, the appropriate Ethernet card would be required. Referring now back to DPN 801, each connected host configured for data backup has an instance of client software 807 termed sentinel (SN) installed thereon and executable there from. SN 807 may be provided in compatible versions for different host machines and operating platforms without departing from the spirit and scope of the present invention. SN 807 may include many or all of the functional components that were described with reference to software 500 of FIG. 5A. However, in this example SN 807 in addition to intercepting the data writes, is further enabled or adapted to map logical volume writes from the host to physical offsets on the primary storage as viewed from hosts 204 (1-N). SN 807 also records information about host data writes like logical write location (host view), origin and destination machine address information, write data and length of payload of the data writes.

Primary storage systems are typically configured to manage stored data according to prevalent protocols and user goals of the storage system. Logical unit numbers (LUNs) are typically used to identify accessible storage devices or storage partitions for accepting data from host machines for primary backup. The primary storage system assigns or allocates memory space for each data write request received from a host independently from the host act of sending the data. This allocation includes a memory offset that flags the beginning of a write wherein the length of the written data (payload) determines where the end of the write will be. Host machines might not in some cases be aware of exactly where in a physical sense their logical data writes are stored. However, the exact disk format, and data storage system used in a primary storage medium may differ a great deal from any logical view held by a networked host charged with backing up data. In other words, a specific offset location marking the beginning of a data write from a particular host to primary storage will not be the same as or have any direct equivalence to a write location indicated in a logical-view of a primary storage.

SN 807 is adapted to provide, through a process of mapping logical volume or file system writes through algorithmic function, to the exact offsets in primary storage and bit lengths of data writes received from the particular host that the application is covering. SN 807 is enhanced according to a preferred embodiment to resolve the exact data write offsets in primary storage using information available to the host without consulting primary storage facilities. The exact offset locations of PS data writes acquired by SN 807 are made available to secondary storage server 212 so that it may conduct asynchronous or, in some cases batched read operations against the primary storage system in order to document data revisions of valid data writes from host machines for time-based data storage backup and data recovery.

Server 212 has a software (SW) application 806 installed thereon and executable there from. SW 806 is a parent application to SN instances 807. That is to say the instances of SN 807 communicate directly with SW 806 to report true primary storage write locations (offsets) of changed data and payload lengths of data writes performed to enable reading of such information for subsequent writing to storage disk 211. The process of obtaining the hue write locations in primary storage may be performed as they occur for each host 204(1-N) in near real time. SN 807 may, in a less preferred embodiment, report or submit data-write lists to SW 806 at server 212 in batch mode for each connected host that is equipped to practice the present invention, however that feature is not necessarily practiced as it is preferred to track changes for each host continuously.

In a preferred embodiment, for each connected host, SN 807 reports true offset and payload length of data writes to SW 806 as they occur. Subsequently, data server 212 with the aid of SW 806 reads the changed data from primary storage for each separate host and applies the information to disk 211 in an appropriate manner as to be time-based recoverable. More detail about time-based storage and recovery of data is provided further below.

In one specific embodiment of the present invention, server 212 tries to maximize reads from the cache system of primary storage instead of the disk storage to help reduce read impact on the primary storage system. In this embodiment server 212 initiates reads immediately after the offset locations for the data writes (allocated write position offsets) in primary storage are known to server 212. In actual practice of the present invention, as each host machine 204(1-N) saves data to primary storage, SN instances 807 filter and track the saves or writes of each host according to the host-logical-view of where those writes are stored in primary storage.

SN 807 also records at least the payload length of each write and performs a mapping function against the PS view to derive the "true" offset location in primary storage where the writes will be stored. The algorithm may in some embodiments utilize certain static variables that represent pre-configured knowledge of primary storage physical architecture and may also derive results with the aid of an application program interface designed to provide certain equivalency values that may also be used in the algorithm. In addition PS driver information may also be shared with SN 807 to aid in creating a viable mapping algorithm.

It is desired in a preferred embodiment, that each host have a configurable host view, which may be an application level or file system view of its storage volume and, for purposes of recovery, access to time-stamped versions of it's backed up volume or volumes that are instantly compatible with its host view. While the host view does not reflect actual format or location of data stored in primary storage, the mapping function enables server 212 to provide any point-in-time version of a host volume over network communication link 215 to any requesting host according to that particular host view.

In this case, disk 211 could contain near term-stored data up to 120 days or more that is mountable according to time-based intervals. When a host requests a time-based view of a file, a volume, or a set of application-specific files or objects for recovery, those data are viewable and recoverable containing the specific data writes last saved for the ordered "point-in-time" time period. Therefore, a host may order versions identified by time and date of any files, application specific data sets, or full data volumes that were subject to the data backup and recovery process of the invention.

Figure 9:
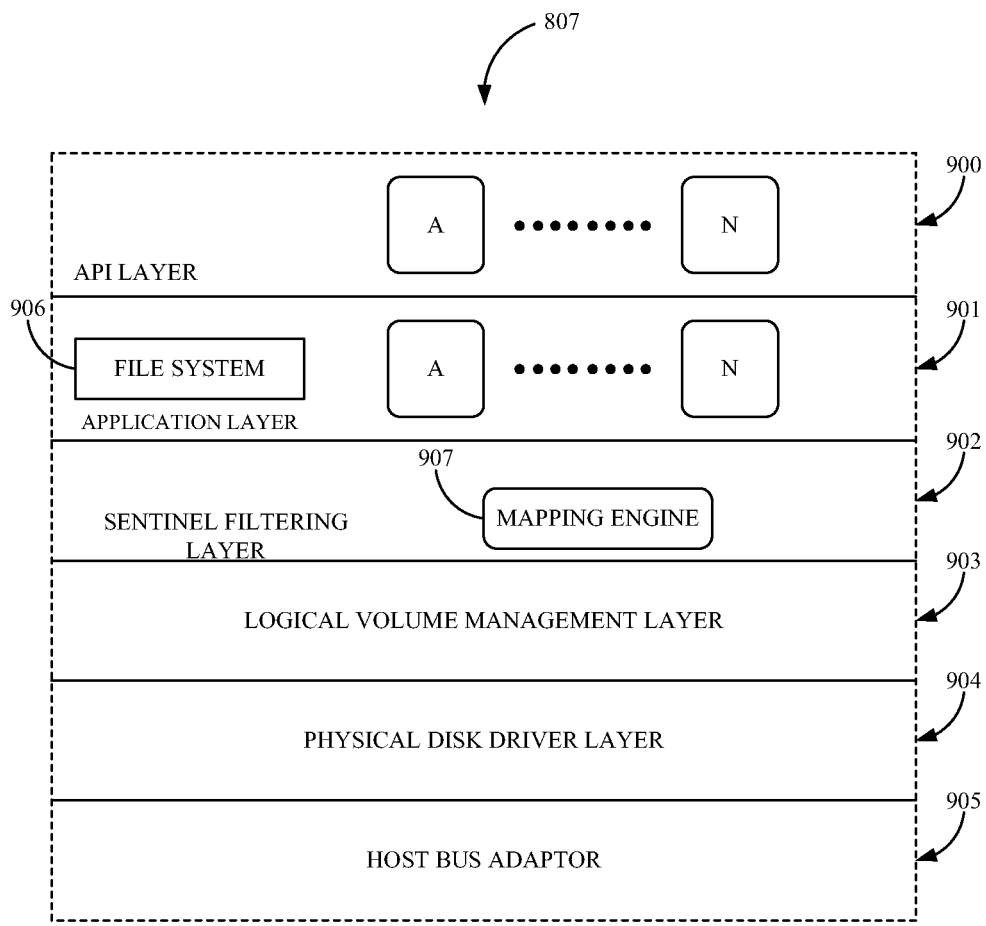
FIG. 9 is a block diagram illustrating components of a client application according to an embodiment of the present invention.

FIG. 9 is a block diagram illustrating components of a client application SN 807 according to an embodiment of the present invention. SN 807 includes a host bus adaptor layer 905 that is adapted to provide interface ability between a host and FC switch 103 (FIG. 2). Layer 905 includes all of the configurable options required for configuring a host machine to communicate with a SAN-based primary storage subsystem through a Fibre Channel switch. In one embodiment however the method and apparatus of the present invention does not require a Fibre Channel to be present such as may be the case with an Ethernet-based system. In that case layer 905 may be assumed to contain the appropriate interfacing mechanisms to enable an Ethernet embodiment of the storage system and network. SN 807 contains a physical disk driver layer 904. Layer 904 contains one or more disk drivers required to communicate effectively with the primary storage subsystem and for controlling any direct attached storage (DAS) facilities of the host. SN 807 also contains a logical volume management layer 903. Layer 903 is responsible for providing the hosts a logical representation of the physical primary storage system (disks, partitions, etc.) that is assigned to that particular host for backing up data. A host's entire amount of backed up data may be considered a host data volume that represents the data saved for backup at any given point-in-time. Layer 903 may also provide the underlying constructs for enabling an application level or file system view of the entire data storage area allocated for the host for data backup.

SN 807 has a sentinel data filtering layer 902 provided thereto and adapted to filter data writes from hosts activity wherein those filtered writes are destined to primary storage backup. With the aid of a mapping engine 907, which may comprise an algorithm, SN 807 derives the true physical data offsets in the primary storage disks allocated for the data writes filtered from the host activity. Layer 902 further contains processing components for compiling write information containing at least the description of the write relating to host machine address and destination machine address including at least the storage device address or LUN, payload bit length and true offset flag or point (derived through mapping) of each write saved to the primary storage subsystem. SN 807 has an application layer provided therein and adapted to present the application or file system view of the logical volume of the host in relation to each application listed as present on the host and configured for data backup. For example, the file system may be NTFS or UFS whereby the files are organized and viewable according to the file system format. In this example, applications A-N are illustrated as participants of the backup system. In other words there may be one or more than one application configured to back up data to primary storage at each host.

From an application perspective, a host operator may see only application related data whereas in an overall view the operator of a host may view an entire volume. SN 807 includes, in one embodiment, an application program interface (API) layer 900 adapted to include any included and possibly optional APIs, illustrated in this example as APIs A-N, for performing stated tasks in cooperation with backing up data to secondary storage according to embodiments of the present invention. For example, one or some of APIs A-N may be configured for, among other things, communication to SW 806 residing in server 212.

Likewise one or some of APIs A-N may exist in some embodiments and may be used to aid mapping between logical write location and primary storage write offsets for host data writes. Also, one or some of APIs A-N may exist within layer 900 and be utilized for data-write flushing during application level processes configured for practice of the present invention such as a process of batch read during active data backup periods. Likewise, APIs may be provided within the logical volume level, file level, and application level as well without departing from the spirit and scope of the present invention.

One such application level process may be that of a read of primary storage space assigned to a host machine. If, for example, new writes are application-pending to PS while a read operation is in progress at those write locations, then the API may be used to flush all of those application writes quickly from the host application so that they may be copied on write (COW), a process generally known to and available to the inventors, and held separately from the snapshot until it is confirmed whether they are valid writes that equate to data changes. This is performed to enforce write ordering in an embodiment whereby SW 806 performs data reads. In this example, mapping engine 907 can aid in recreating file system views of recovered files and entire data volumes from near-term storage (disk 211) by providing the correct write location mapping and the host/application level identification of the data changes occurring to the volume data over time.

In one embodiment of the present invention, the metadata file redundancy verification process described further above with reference to FIG. 2 may be used to verify data writes acquired by read at server 212. However, this is not required in order to successfully validate data changes as the read process can compare the compression gain or loss with the same offset location at a last point-in-time position of the data. More specifically, new data can be verified quickly by bit-length comparison and other means with the data existing in a last version of a host volume.

Figure 10:
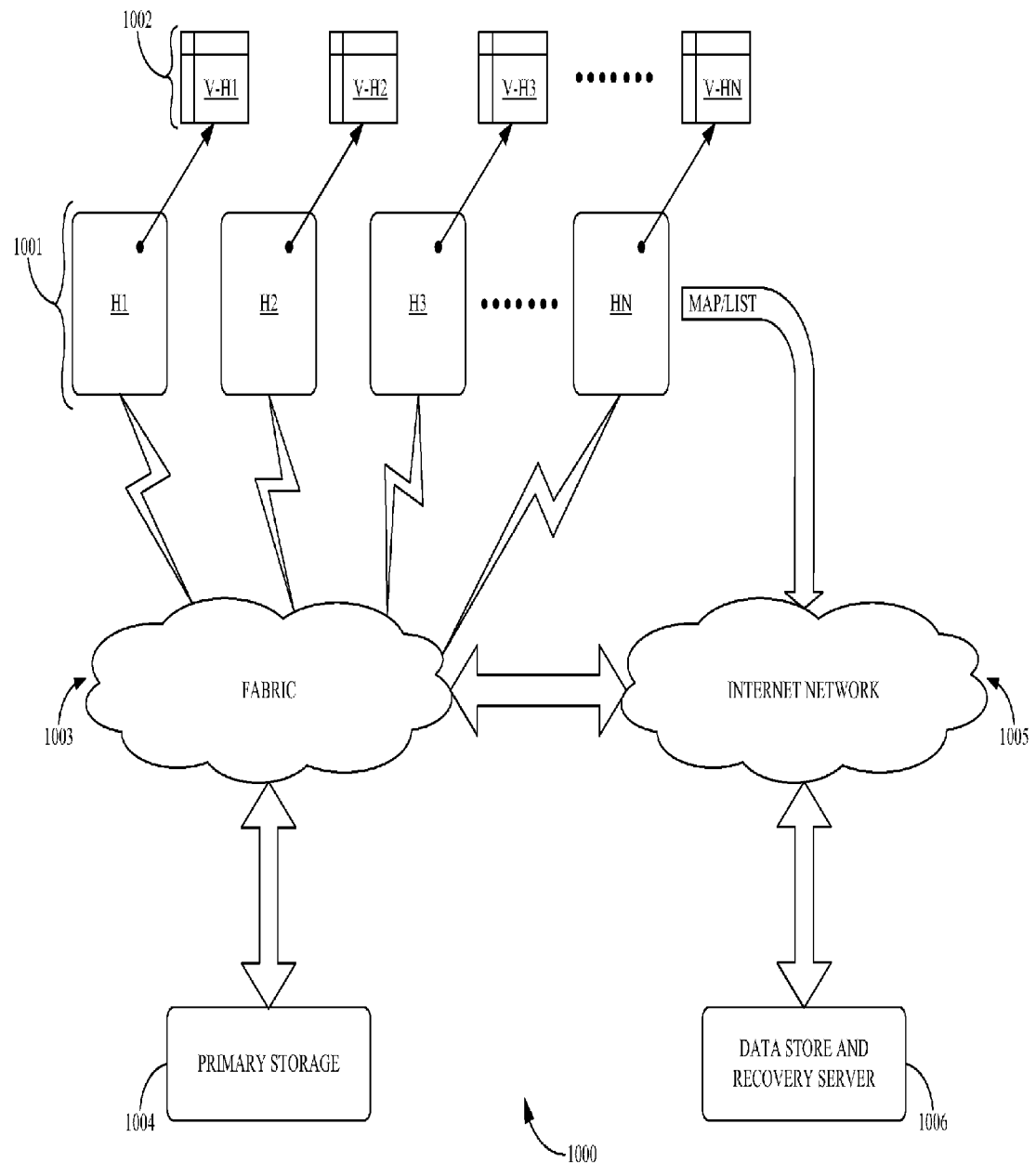
FIG. 10 is a block diagram illustrating data access from primary storage according to an embodiment of the present invention.

FIG. 10 is a block diagram 1000 illustrating data access from primary storage according to an embodiment of the present invention. In this example, host machines are illustrated logically as host machines 1001(H1-HN). Each host 1001 has a volume 1002 collectively illustrated herein as volume host 1(V-H1) through (V-HN). Volumes 1002 are considered logical host-view data volumes organized as higher-level file system or application level views. Each volume 1002 V-H1-V-HN represents a portion of data stored at primary storage 1004 that needs to be backed up by the host. Hosts 1001 continuously save data to primary storage 1004 through fabric 1003 as illustrated. Correct data write information including data write location information in primary storage is compiled by each host and sent after the mapping layer algorithms are applied.

This mapped information (Map/List) is sent to a data store and recovery server 1006, in this case, over IP through Internet 1005. However, the Internet is not specifically required to practice the present invention successfully. Data store and recovery server 1006 may be, in one embodiment, a CPE implement accessible over a LAN or private WAN. The map/list information forwarded to data store and recovery server 1006 amounts essentially to instructions for reading the described writes from SAN-based primary storage 1004. In a preferred embodiment, changes are tracked continuously as they occur, meaning that Host sentinels report data writes and mapping information to server 1006 for each save to primary storage as it occurs for each host. Data store and recovery server 1006, analogous to server 212 of FIG. 2 may perform read operations in a manner to effect a low impact on the primary storage system such as reading from primary storage buffer systems or system cache so long as frame decoding information and true offset locations are known.

In a preferred embodiment, server 1006 is reading data writes made to primary storage in a continuous manner. If server 1006 is remote then access to primary storage system 1004 may be accomplished over IP using an iSCSI/HBA/NIC configuration. In another embodiment server 1006 has port access to FC Fabric 1003 via SCSI and HBA.

In another embodiment of the present invention, primary storage system 1004 is a SAN storage island held remotely and accessible to host machines 1001 via the Internet or another WAN network using an iSCSI/HBA/NIC configuration. There are many configuration variables that are possible without departing from the spirit and scope of the present invention.

Figure 11:
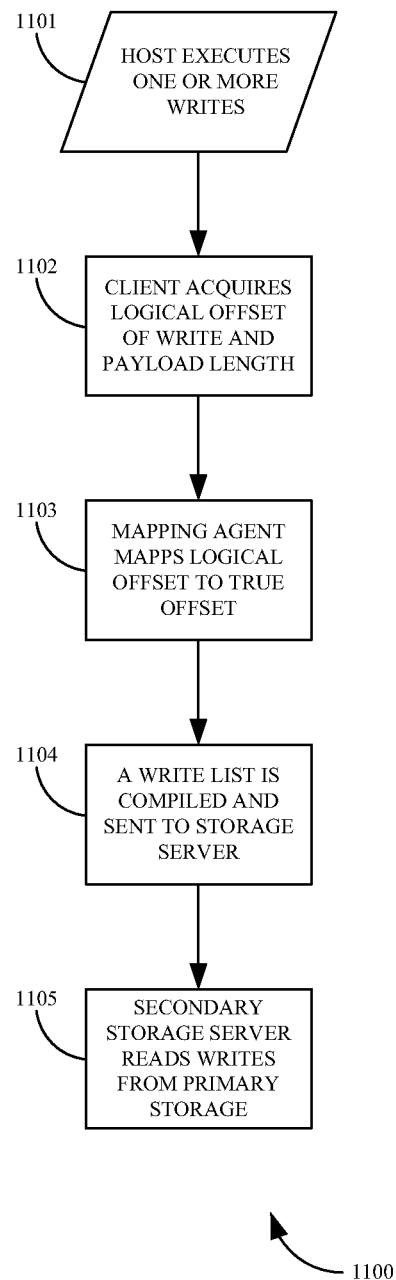
FIG. 11 is a process flow diagram illustrating steps for enabling read access to primary storage from a secondary storage server according to an embodiment of the present invention.

FIG. 11 is a process flow diagram illustrating steps for enabling host-instructed read access to primary storage from a secondary storage server according to an embodiment of the present invention. At step 1101, a host executes one or more writes destined to primary storage. At step 1102, the client, or more particularly, the sentinel acquires the logical offset of the one or more data writes and bit lengths of the associated payloads. Also, the sentinel filters out the origin and destination addresses, host name, and other pertinent decoded information that may help to identify the data writes. At step 1103, a mapping engine or agent maps the logical or host-view location or offset of the data write to an actual or true offset position in a primary storage subsystem.

This may be accomplished using an algorithm that incorporates some knowledge of the primary storage architecture and data storing procedure. An API may be provided, as previously described, for contributing architectural and storage scheme and format knowledge to the mapping process. At step 1104, a write list or series of write descriptions including write access instructions is compiled by each host sentinel and forwarded over a separate network other than Fibre Channel to a secondary storage server analogous to server 212 described previously. These instructions preferably arrive in a continuous data stream and the data is immediately acted upon according to host instruction at step 1105 wherein the secondary storage server reads the write data from primary storage thereby obtaining the changed data for the hosts and applying the changes to secondary storage disk analogous to disk 211 of FIG. 2 above.

Before secondary storage of data begins for a host, each host having data for backup and an allocated LUN for storing the data in primary storage has its initial volume read by the secondary storage system and stored in near term storage. Thereafter, only the changes are read and stored according to some configurable time frame for time-based recovery purposes and the volume is rolled up to each time interval where the changes are applied over the old data writes affected by the new changes. Therefore at any specified point-in-time, a host may order a snapshot logical view of the entire volume including the latest changes applicable to that specific time. This may be relevant to one or more specific application objects, files or to an entire data volume.

More particularly, data recovery from secondary storage may be file based, volume based, or application object based. A host may order a snapshot according to any configured safe point in the past and receive the view including the exact file versions or changes that were applicable at that time. The unaffected volume is simply rolled forward or backward along the time line to complete the mountable view as will be further described below.

Figure 12:
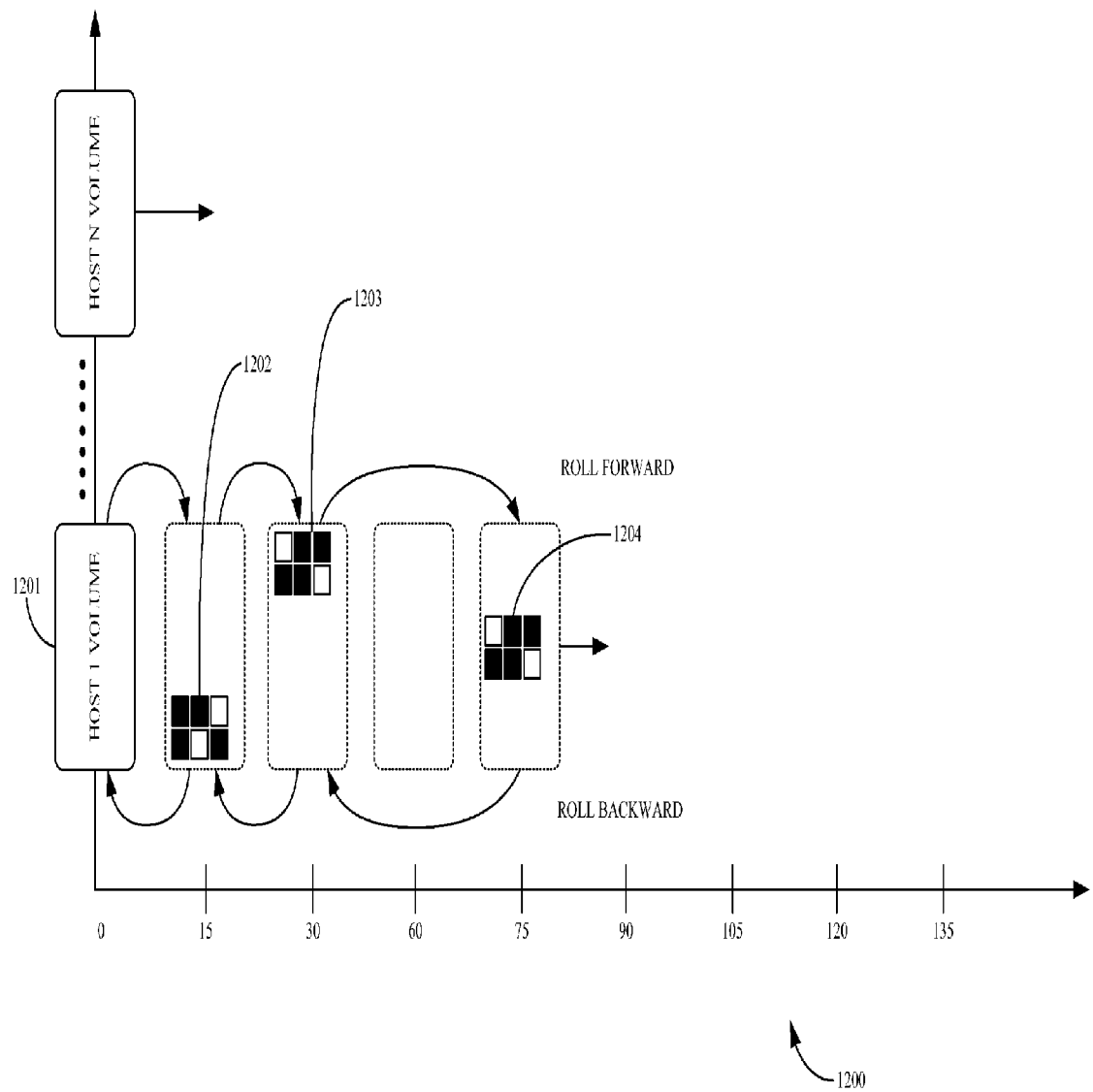
FIG. 12 is a time-based graph illustrating volume management in time-based data storage according to an embodiment of the present invention.

FIG. 12 is a time-based graph 1200 illustrating host volume management in a time-based data storage application according to an embodiment of the present invention. Graph 1200 has an exemplary time line starting at 0 time and progressing at 15 minute intervals to illustrate points along the time line that are potential data recovery points-in-time. It is noted herein that the time period reflected is only an example. The smallest granularity possible is at the individual write I/O level. At time 0, the secondary server must have available by previous read operation a host back-up volume of data illustrated herein as Host 1 volume 1201. This must be accomplished before secondary data backup can begin. This is true for all host machines to be configured for secondary storage backup as is illustrated herein by inclusion of a host n volume at the same 0 point in time.

The "Y" line simply illustrates that multiple hosts may be backed up for time-based data snapshot view or snapshot recovery using the methods and apparatus of the present invention. Moreover, each host may be configured for entirely different time-line recovery points. For example, instead of providing a volume view for every 15 minutes a host may be configured for every 25 minutes or every 5 minutes. Similarly, multiple hosts may be provided a tier snapshot for n hosts wherein each snapshot of host volume for all of the participating hosts represents the latest view of the hosts' volumes at the specific point-in-time. In this example, at 15 minutes time the secondary server has read, validated and stored to secondary disk (near term storage) new data writes 1202.

Data writes 1202 were read and stored between point-in-time 0 and point-in-time 15 minutes as an example. The host machine may now order a snapshot view of host volume at point-in time 15 minutes on the same work period date and will be served the volume view including writes 1202. The host may instead order a view of a certain file at time 15 minutes. If the file contains writes 1202 then that file has two separate recoverable versions if it existed at point-in-time 0. The host machine may also order an application view or a view of all of the data specific to one application that is running and being backed up to secondary storage. In this case data writes 1202 may be specific to only one or a few files updated by the application in question. To show all of the applications data, the application data at point-in-time 0 is logically rolled up and the new writes 1202 replace the old writes of the same files if they existed. It is also possible that the new writes 1202 did not have earlier versions, for example, new account information that was acquired between point-in-time 0 and point-in-time 15 minutes. It is noted herein that rollup is logical only. The data is overlaid over the full volume using in-memory or on-storage data structures and accompanying algorithms.

At point in time 30 minutes, a snapshot is available of the host volume of point in-time 0 plus writes 1202 and new writes 1203, that were read between point-in-time 15 minutes and point-in-time 30 minutes. If writes 1203 represent over-writes of writes 1202, then writes 1202 would not be visible in a point-in-time snapshot taken for time interval 30 minutes. However, data writes 1202 are still recoverable by rolling back to point-in-time 15 minutes. If data writes 1203 are of different application files and are not related then both writes 1203 and 1202 are visible in a snapshot of point-in-time 30 minutes on that particular day. It is noted herein as implied above that the time period referred to in this example is exemplary and pertains more to periodic firing of a consistency enforcement measure and is not a limitation concerning the ordering of time based views. Of course, time based views can be order for any time period.

The host volume is simply rolled up or back for snapshots wherein the appropriate time-based versions or writes that were read between the last time and the snapshot time apply and can be viewed and recovered. At point-in-time 60 minutes, there were no data writes to primary storage from the host. In this case, the host volume does not need to be rolled forward in the event of an ordered snapshot taken at point-in-time 60 minutes.

The last point-in-time snapshot of 30 minutes is served instead because it contains data changes to the volume. At point-in-time 75 minutes, new data writes 1204 were read and stored since the last point-in-time interval of 60 minutes.

Again as described further above, snapshots may be ordered at any time as data read and write operations are performed continuously.

The process for each host ensues throughout the work period for up to 120 days being applied to near term storage before old data is offloaded to tape or other long-term storage media. However, point-in-time snapshots may also be taken from long-term storage. Any host may change the point-in-time snapshot interval for data view and recovery. Likewise, a snapshot view may be created asynchronously by instruction from the host. For example, a host may at any time create a point-in-time where the host volume may be viewed containing the latest file or data revisions.

In one embodiment, a host that is configured for synchronous point-in-time snapshot may insert additional points-in-time asynchronously meaning they do not follow any specific time interval or pattern. In addition, point-in-time intervals may be synchronous, not in a time sense, but in an event-driven sense. For example, a host may order that when new writes reach a data size threshold, a point-in-time interval is created that can be viewed as a snapshot containing those writes. The next point-in-time interval is then created when new writes since the last created point-in-time again reach the size limit.

Likewise, a combination rule can be created that incorporates a regular time interval and a data write size accumulation threshold. It is important to note herein that if a host orders a view that falls in between two points-in-time, then the particular view may not be the most consistent view ass consistency measures are enforced according to pre-specified time interval. Nevertheless, a snapshot view may be served at any requested time. A host may also select multiple snapshots covering a span of time for a file, a set of application files, or for an entire volume. In this case, the host may, after review, mount to a selected volume or recover a selected file, data set, or volume of application specific data from the volume.

The system of the invention provides a file system, file level, or application level view of the host volume in addition to providing a view of the whole volume according to a file system perspective. The point-in-time snapshot feature may be further granulated for two or more hosts that may be writing to a same volume (volume sharing). In this case, each host has an own specific view of the shared volume and may also have same or differing point-in time intervals. Moreover, an administration snapshot may be ordered for a shared volume wherein data backed up by all of the hosts of the volume are visible. Furthermore, a volume may be shared for backup, but not necessarily accessed simultaneously by hosts, which is the more common occurrence in practice where different hosts share one volume.

In one embodiment of the present invention for any particular host, a data write can be validated against data written to secondary storage previously by comparing two consecutive snapshots. For example, if a save occurs that is an overwrite of a same write of a previous snapshot the system can compare the new write against the old write and determine if the payload has any compression gain or loss, or is of the same exact length, or has the same checksum value. If it is wholly the same then the new write can be discarded as redundant data. If the data is partially different, then only the differential data is stored.

In a more complicated validity check, using a metadata hash table containing metadata of previous writes from all of the hosts for a certain period of time can be used to perform redundant data identification from more than one host having more than one separate volume. Any new write for any new host can be checked against the table and if it is redundant then it can be deleted because another host has written the same data to another volume. These volumes can be integrated in terms of data representation such that a data write that is exactly the same among more than one host machine can be physically represented on host volumes by a pointer to a single host volume where it was first saved as a non-redundant data write. This embodiment assumes importance when multiple hosts are providing some service collectively such as customer-relations management (CRM). It is noted herein that to server a point-in-time snapshot according to a request from a host, the secondary storage server must access the secondary disk (near-term storage) and read the changes stored for the period ordered. Data already transferred to long-term storage must be rendered back to disk storage before it may be recovered.

The volume applicable to that period is rolled up from the last period or back from the next period to complete the volume view if the entire volume at that time is made available. The host's logical specification of a file, set of files, or volume including the requested time reference is sufficient for serving views and for allowing drive mounting of the data.

Figure 13:
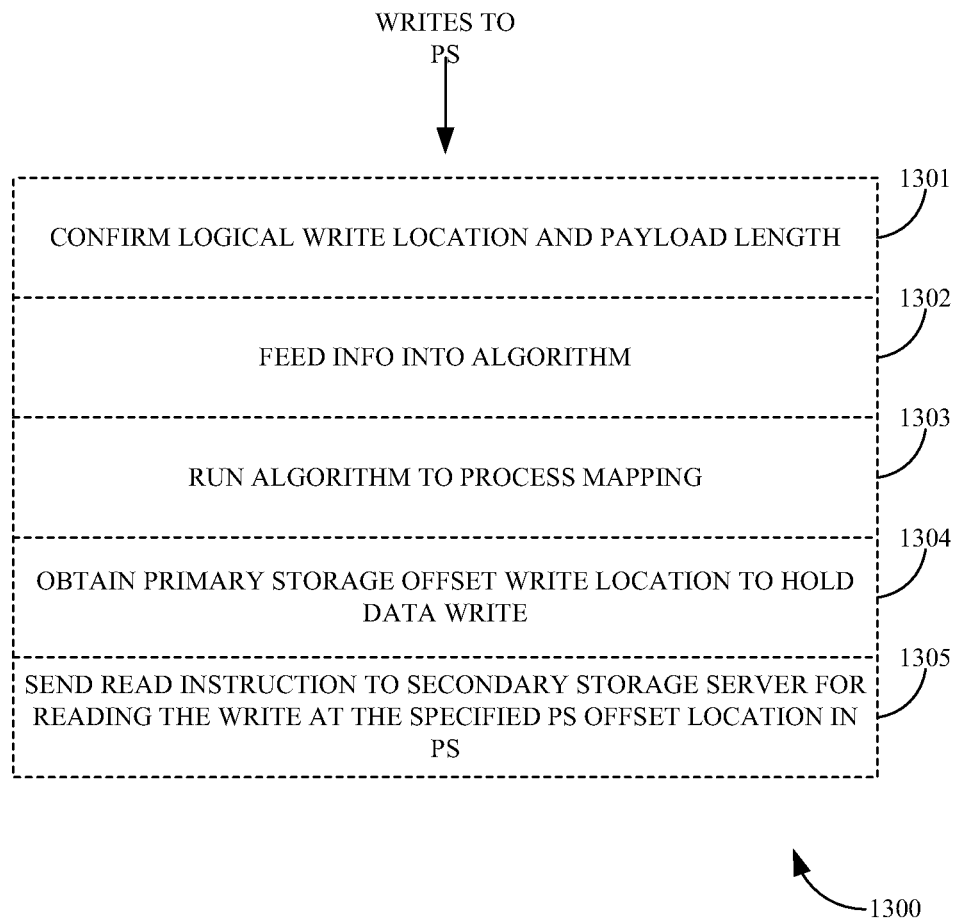
FIG. 13 is a block diagram illustrating basic steps for translating logical write location to true offset location in primary storage according to an embodiment of the present invention.

FIG. 13 is a block diagram 1300 illustrating basic steps for translating a logical write location to true offset location in primary storage according to an embodiment of the present invention. Block 1300 represents the mapping engine 907 described further above with reference to FIG. 9. Block 1300 is, in a preferred embodiment installed on each machine host as part of a sentinel software component that is part of a client software instance analogous to SN 807 described with reference to FIG. 8 above.

Each time a host machine writes to primary storage, the writes are analyzed for information at step 1301 to obtain at least the logical (host view) write location and the write payload length. Other information such as host machine address, destination machine address, LUN identification, and other frame attributes may be collected.

At step 1302, the write information is fed into an algorithm adapted to provide mapping between host write location and actual primary storage offset location. At step 1303, the algorithm processes to derive the offset location at the destination for the write. The offset is allocated by the primary storage system for the storage device (LUN) that the host machine has permission to write to.

At step 1304, the true offset location for the data write is obtained and the other parameters of the write frame or frames are known. Using the LUN and offset information, block 1300 prepares read instruction that the secondary storage server may use to access the appropriate destination device and offset location to read the write. At step 1305, the read instruction is sent to the secondary storage server.

In one embodiment, all host machines that write data to primary storage and are configured for secondary storage backup using the methods and apparatus of the present invention send their write instructions in a combined data stream to the secondary storage server over an open TCPAP or other WAN connection. This may be a secure high-speed data link analogous to link 215 of FIG. 8. In a preferred embodiment, the secondary storage server performs read operations according to the host instruction in near real time as the instruction becomes available using an HBA-enabled link through the FC switch using the FC and SCSI or iSCSI protocols.

In another embodiment, a number of read instructions are compiled as a read list before sending the read list to the secondary storage server. When the storage server is reading from a primary storage disk on behalf of a host, it is possible that one or more new writes may come in to a same offset location that is being read during the read operation. To avoid any consistency problems during read, an AFI is used to flush any write data an application, a file system, or the OS may have pending. These writes are then copied before they are sent through using an algorithm and written to a buffer, cache, or other secondary storage location. If any flushed writes apply to offset locations just read, they are compared against those writes to determine if they are redundant. Redundant data is discarded if encountered while the rest of the change data is applied appropriately.

In still another embodiment, the host amounts the entire volume and performs its own recovery at the file system, application object, or volume levels. In yet a further embodiment, the secondary server does al of the recovery mapping without the involvement of the host. In this case the server exposes just the file/application objects through any of multiple standard protocols such as CIFS, NFS, HTTP, FTP, or through custom APIs adapted for the purpose. There are many possibilities.

Figure 14:
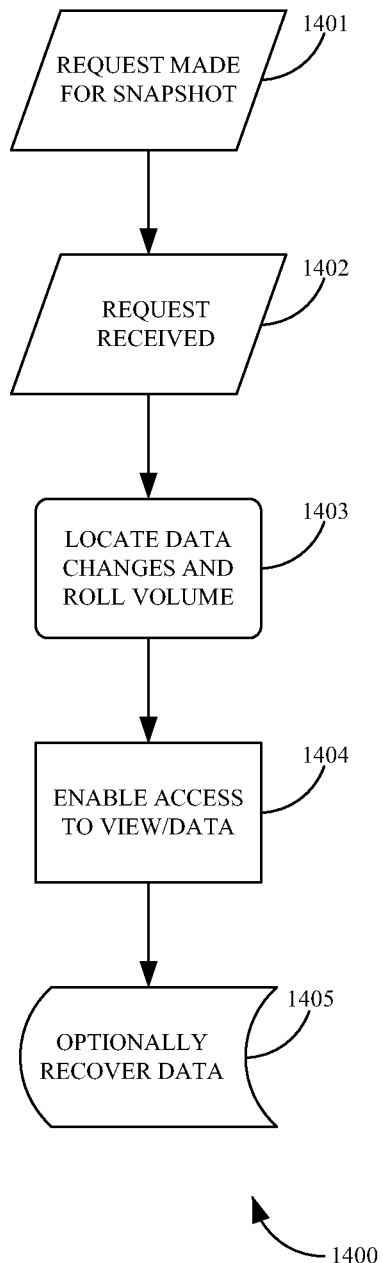
FIG. 14 is a process flow diagram illustrating a process for providing a point-in time snapshot to a host according to an embodiment of the present invention.

FIG. 14 is a process flow diagram 1400 illustrating a process for providing a point-in-time snapshot to a host according to an embodiment of the present invention. At step 1401, one or more host machines request a point-in-time snapshot view according to some point-in-time reference of volume, files, or application-specific data files or data sets. If multiple hosts initiate a request then each of the host will receive its own private logical snapshot that it can read and write to. There is no handshake requirement among the host machines for receiving the point-in-time snapshot for the requested period and data order instructions. At step 1402, the secondary storage server receives the request of step 1401. At step 1403, the secondary storage server locates the point-in-time data changes stored on near-term disk (211) for the host according to the host instruction including time reference, specific name of data, for example volume Z, or application name (all files), or file name reference. It is noted herein that the specific file references including name, type and other information have request parameters that are of the form of the requesting host's logical view of the system.

The secondary storage sever may maintain a logical host-view of each host's data and has the capability of mapping the actual stored data to that view. At the same step, the volume data that is original and that has not changed is rolled forward or backward and associated with the found data changes for the specific point-in-time ordered. Those data changes overwrite previous data for their offset locations to complete the view of the volume data for the ordered period. At step 1404, the secondary server presents or serves the point-in-time view to the requesting host according to that host's requested view parameters. The secondary storage server may also serve more than one view of the same point-in-time reference to more than one host, which may be sharing the view according to different viewing perspectives. It is important to note herein that ISCI, FCP, and TCP/IP sockets based proprietary protocols to enable a host to mount volumes from logical snapshots. For example, there may be an application view of a volume requested for one host and a different application view requested by another host of the same point-in-time reference.

Likewise, an administrator may request a point-in-time volume view inclusive of all applicable application files whereas application-specific requests are ordered for the same point-in-time reference by other hosts. There are many possibilities. At step 1405, the requesting hosts may elect to mount a data volume represented by the point-in-time view as it looked during the time interval requested. Actual data recovery is conducted between the hosts and the secondary storage server over a channel other than the Fibre Channel such as over a TCP/IP enabled network line analogous to line 215 of FIG. 8.

In one embodiment of the present invention, a single host may specify a time and date range and may order several views of its volume, each view representing data as it looked during a covered point-in-time. A host machine, or an operator thereof, may select and sample (read only) files from any of the views before making an optional decision to recover a specific volume. In one embodiment of the present invention, data recovery to a host of a particular point-in-time may involve transcending application versions or further, operating system platforms. In this case, the inventors provide applicable virtual machines that can process and present the requested data views according to past application versions or operating system parameters which are viewable on the present host system. Likewise the data stored according to past application version or system parameters can be made viewable and recoverable according to the present application versions and operating system platform of the requesting host.

The methods and apparatus of the present invention can be incorporated as an overflow option or as an alternative option to passive data splitting described further above for acquiring data from hosts for secondary storage. The described data view and recovery methods may apply both to passively split data and to SAN-Based read data without departing horn the spirit and scope of the present invention.

SAN-Based Backup Logging and Read for Backup

According to another preferred embodiment of the present invention, the inventor provides a method of logging actual host data write activity and metadata generated and associated with the write activity for the purpose of data read and data backup at a secondary storage location in a fashion that eliminates the necessity of LAN traffic associated with data backup activities and eliminates requirements for direct read access of primary storage volumes.

Figure 15:
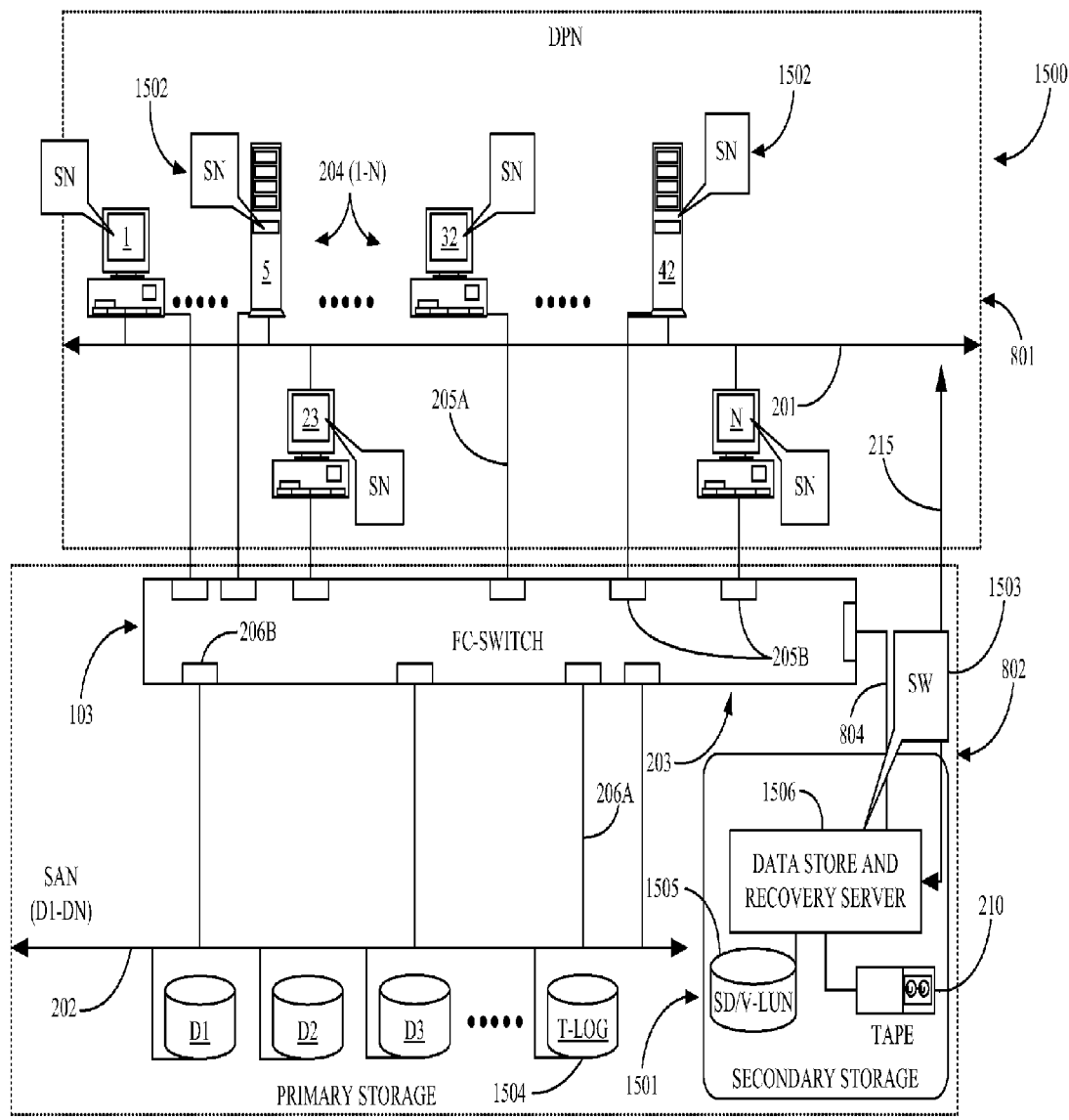
FIG. 15 is an architectural view of a SAN-based data storage and backup system according to another embodiment of the present invention.

FIG. 15 is an architectural view 1500 of a SAN-based data storage and backup system according to an embodiment of the present invention. Architecture 1500 is similar to architecture 800 described with reference to FIG. 8 above. Therefore, many of the elements already described shall not be re-introduced unless they are fundamentally modified according to embodiments described below. DPN 801 may be a LAN or a WAN. In this embodiment DPN 801 is analogous to DPN 200 of FIG. 2 above as was previously described above and therefore may be an Ethernet LAN, Transfer Control Protocol/Internet Protocol (TCPIIP) enabled WAN, or metropolitan area network (MAN), which may be a wireless network. Hosts 204 (1-N) all have connections to a FC-Switch in this example via north side FC switch links 205A to associated ports 205B installed on switch 103. SAN 802, which includes the domain of FC-Switch 103, contains primary storage system (D1-D3), and an addition to primary storage memory illustrated herein as a transactional (T)-Log 1504. T-Log 1504 may be provided in the form of a shared transactional data log adapted to receive actual write data and/or metadata from each of hosts 204(1-N).

In another embodiment each host may have a separate T-Log assigned to it. T-Log 1504 is not a mirror of any portion of the primary storage system. Rather, T-Log 1504 contains write data from each separate host or all hosts as the data is written to the appropriate LUN devices or data volumes maintained for each host in the primary storage system. In this example, T-Log 1504 is shared by all hosts charged with data backup to the primary storage system and the organizational nature of T-Log 1504 is that each host 201(1-N) writing to primary storage duplicates it's data writes to T-Log 1504. The write transaction records for each host may be organized in the form of a plurality of log transaction entries including embedded metadata information about the parameters of those transactions. Each entry then contains, in one embodiment, the actual write data including the generated metadata associated with the actual write data.

In an alternate embodiment, the log data may include only the metadata that describes the actual data writes, the metadata enabling the secondary storage system to access and read the actual write data from primary storage. T-Log 1504 may be managed as a LUN or partition of a LUN on a primary storage system set to sufficient size, in this example, for accepting the combined data from all of the hosts for any given period of time. For example, if all hosts are writing at the same time, T-Log 1504 shall be sufficiently large to accommodate all of the written data and the associated metadata.

Each host 204(1-N) has an instance of client software (SN) 1502 provided thereto, which is significantly enhanced from the previously described SN 807 of the example of FIG. 8.

In a preferred embodiment, each instance of SN has pre-programmed knowledge of the existence and location T-Log 1504 including having a utility for managing the host's own transactional record. Therefore, instead of using LAN 201, or separate network 215 to propagate any primary storage read or write activities or metadata describing such activity, hosts 204(1-N) append their write activity directly to T-Log 1504 in real time through Fibre channel switch 103 in a managed fashion, which will be described further below. As described repeatedly throughout this specification, Fibre channel switch 103 may also be an Ethernet switch running iSCSI protocol. As described further above, T-Log 1504 may have a LUN assigned thereto and may further be divided for transactional integrity according to Sub-LUN or SLUNs so that each host may own or may be assigned to a variable or dynamic portion of the log volume by SLUN. For example, if host 204(1-N) is writing to primary storage to D1 under LUN assignment, the write may also be duplicated to the appropriate LUN and SLUN in T-log 1504 for that same host the duplicate write may include metadata describing the write data at the application level and the bit length of the data write.

The metadata may also include, among other things, the beginning or offset location of the write as mapped from primary storage, the payload length of each write, and the checksum figures for each frame of the write. In this example, a secondary data storage and recovery facility 1501 is provided and is largely analogous to facility 803 described with reference to FIG. 8 above except for how write data is accessed from the primary storage system.

Facility 1501 has a data store and recovery server 1506 provided therein and adapted with an instance of parent SW 1503. SW 1503 is adapted to access T-Log 1504 periodically in an asynchronous mode, or in near real time synchronous mode for the purpose of reading data from T-Log 1504, backing that data up to a secondary storage disk, and then clearing the log entry from the log volume.

In an alternate embodiment, a virtual (V)-LUN is provided by the Secondary Storage Server and obviates the need for T-Log 1504 to reside in primary storage. Such an embodiment will be described further below. In the first embodiment server 1506 may access T-Log 1504 in the primary storage system over FC link 804 to read the write data and embedded metadata, backup that data following redundancy protocols, and clear transactional entries related to actual data write activity from the log volume to free it up for more write data. The data read from log volume 1504 is checked for redundancy against near term storage data for the same host and is added to near term storage for that host.

A unique synchronization protocol is provided and adapted to ensure that a host is not writing data to a portion of the log being read by server 1506 for that host. The protocol may also be used to synchronize writes from the separate hosts into the log volume. More about synchronized access and control permissions for log read and write access will be detailed later in this specification.

In the case of provision of a shared T-Log 1504 within the domain of the primary storage system, hosts 204 (1-N) write to PS as they normally would through an FC channel, however those writes may be duplicated for each host into T-Log 1504 using the host assigned FC channels or a special FC channel adapted for the purpose. Metadata including the mapping of the true offset positions used in primary storage is appended to the log and embedded with each write session for each host.

In one embodiment, the log volume itself is presented to or may be viewed by host nodes and the secondary storage system server in a file system format or other proprietary formatting. Data byte limits may be allocated for each container or file of the system containing write data from a host. In this embodiment, a bit flag is set for each data write pending. The bit is cleared when the change data is logged to the secondary storage. Secondary storage server 1506 aided by SW 1503, may access T-Log 1504 and may be granted permission to read from files, containers or blocks that have the bit flag set indicating that the file is complete and ready for archiving.

If more than one host writes the same exact data, that data is duplicated for each host into the log volume under the appropriate partitions or SLUNs. When the data is read by server 1506, the server performs appropriate redundancy checks before backing up that data to a secondary storage disk for near term storage. The metadata enables the secondary storage system to save the appropriate change data into time-based records for each separate host for near term disk storage. In one embodiment, T-Log 1504 may possess a capability of managing itself to reduce instances of redundant data duplicated thereto by host nodes and to cross-reference host identifications to instances of same or unchanged data blocks, files or containers.

In a preferred embodiment all redundancy checks and operations are performed at server 1506 before backup to secondary storage disk. When practicing "any-point-in-time" data recovery, more data is typically stored so a method of reducing such storage space may be required, hence redundancy practices are used to eliminate the need for extra storage space. In one embodiment of the present invention, the primary storage system is capable of data stripping (storing more than one data record) from one set of data from one host. In this case, the data stripping utility may also be adapted for appending T-Log 1504 with a copy of the record including the associated metadata. In any case, redundant writes may be eliminated from the secondary storage view of T-Log 1504 by virtue of comparison to data already stored for any host data is being read for. As server 1506 reads data from T-Log 1504, it may also, in a preferred embodiment, clear data write log entries of all data during the same session.

If a file system format is adopted, or even if data containers, buckets, or lower level blocks are used, then server 1506 may reset bit flags after clearing data to indicate empty memory space that may then be repopulated by hosts. By the same token, hosts may not write to a file that is currently being read by the secondary storage server. Bit setting for access permissions may also be applied to logical data blocks or clusters of data represented in T-Log 1504 as opposed to a file system formatting.

In another preferred embodiment, instead of providing T-Log 1504, a plurality of Log volumes to a primary storage sub-system, one or more virtual LUN Log volumes may be hosted in secondary storage system 1501, perhaps on disk 1505 or in server memory provided and allocated for the purpose. In one embodiment, a single virtual LUN defining a log volume may be assigned to all hosts writing to primary storage and virtual SLUNs may be assigned per host using the space. In this case the log functionality may be the same, as that described above with respect to T-Log 1504. However in the latter case, the access and read functions are internal to the secondary storage system and server 1506 does not have to communicate with the primary storage system at all. Hosts writing to primary storage generate the metadata and mapping information as previously described and duplicate their writes to their assigned data volumes in primary storage while at the same time writing the data using, in this case, the channel connecting the secondary storage system to the FC switch (FC link 804). This represents a push embodiment that eliminates any requirement for direct read from the primary storage domain. In this case, the read activity from the transactional log is internal. The synchronization between server 1506 and any of hosts 204 (1-N) is the same. That is to say that server 1506 may read from the log wherein bit flags are set indicative of completed records that will not incur more data and hosts may write to the log wherein bit flags are set indicative of file space or memory blocks that have been cleared of data and are ready to accept new data.

Read access performed by server 1506 may be programmed to occur in a synchronous mode or asynchronous mode in the virtual LUN embodiment as data becomes available, or in an asynchronous manner in the T-LUN embodiment where the server periodically access the log volume to read and clear data. A benefit of providing the log internally within system 1501 is that it may be hosted in static random access memory (SRAM), which is faster than dynamic random access memory (DRAM). Also the log volume may be hosted on a cached disk using protocol extensions SCSI, FC, SATA, PATA, and the like. Therefore the speed of journaling writes for multiple hosts may be maximized using various forms of fast memory management internally available to system 1501.

The log access, read and clear operations are not dependent on existing primary storage system limitations. One with skill in the art will recognize that reading from and then clearing log entries is much faster than accessing and reading data from a robust primary storage system.

In still another embodiment, a virtual log volume is not necessarily required and direct reads from primary storage are also not necessarily required in order to practice the present invention. In this case, an application may be provided to the secondary storage server, the application enabled to listen for all data writes from the protected hosts and to facilitate writing those directly to the secondary storage medium. In this case, sentinel software splits the writes from each host, one to primary storage and one to the provided application, which in turn accesses the second q storage medium and writes the data to second q storage on behalf of the host. It is important to note herein as well that the communication between the protected hosts and the secondary storage system is not necessarily limited to any particular protocol. For example, the write data may be transferred using a variety of standard data transfer protocols like file transfer protocol (FTP), hypertext transfer protocol (HTTP), FCP, SCSI, iSCSI, FCIP, and so on.

In one embodiment, an enhancement referred to herein as a tag synchronization protocol (TSP) may be used to perform time-based synchronization between multiple protected hosts and one or more secondary storage servers located at one or more than one network site on a network where latency issues may be a factor. This protocol (not illustrated), adjusts for differing latencies related to backup and recovery due to network diversities. Latency issues may arise from states like different time representation among multiple application servers running an enterprise application.

Likewise, network latencies related to data transfer from those separate server nodes to one, or in some cases, more than one secondary storage server may vary quite a bit. Using a tag synchronization protocol may enable a more accurate return of a particular "state-of-application" with respect to actions or writes performed on the multiple protected application servers at some requested point in the past. This is particularly important where some application writes depend on other application writes for purposes of validity, consistency, security, or understanding. A protocol such as this may be used with or without APIs already discussed may, in some embodiments, to form a basis for enabling consistent backup synchronization procedures. In an alternate embodiment, synchronization for backup may be based on a concept other than time. For example, it may be based on application states reached on one or more of the secondary storage servers. For example, the backup and recovery software may use indexing by event and time, or just by event or state to optimize file recovery.

In still a further enhancement, the concept of time bands may be used in conjunction with time based backup synchronization. Due to possible network diversity, different speeds, number of hops, routes etc. It may not be possible in all cases to achieve perfect synchronization of tags based solely on time. A time-band is a small period or window of time that bounds a set of differences (data changes) that were generated on the protected servers. The time-bands enables determination with near certainty the relative order of differences that were produced by different protected host servers.

The determination itself can occur anywhere the software of the present invention resides. In still another enhancement, the writes themselves can be ordered synchronous from the protected hosts to the secondary storage servers.

Figure 16:
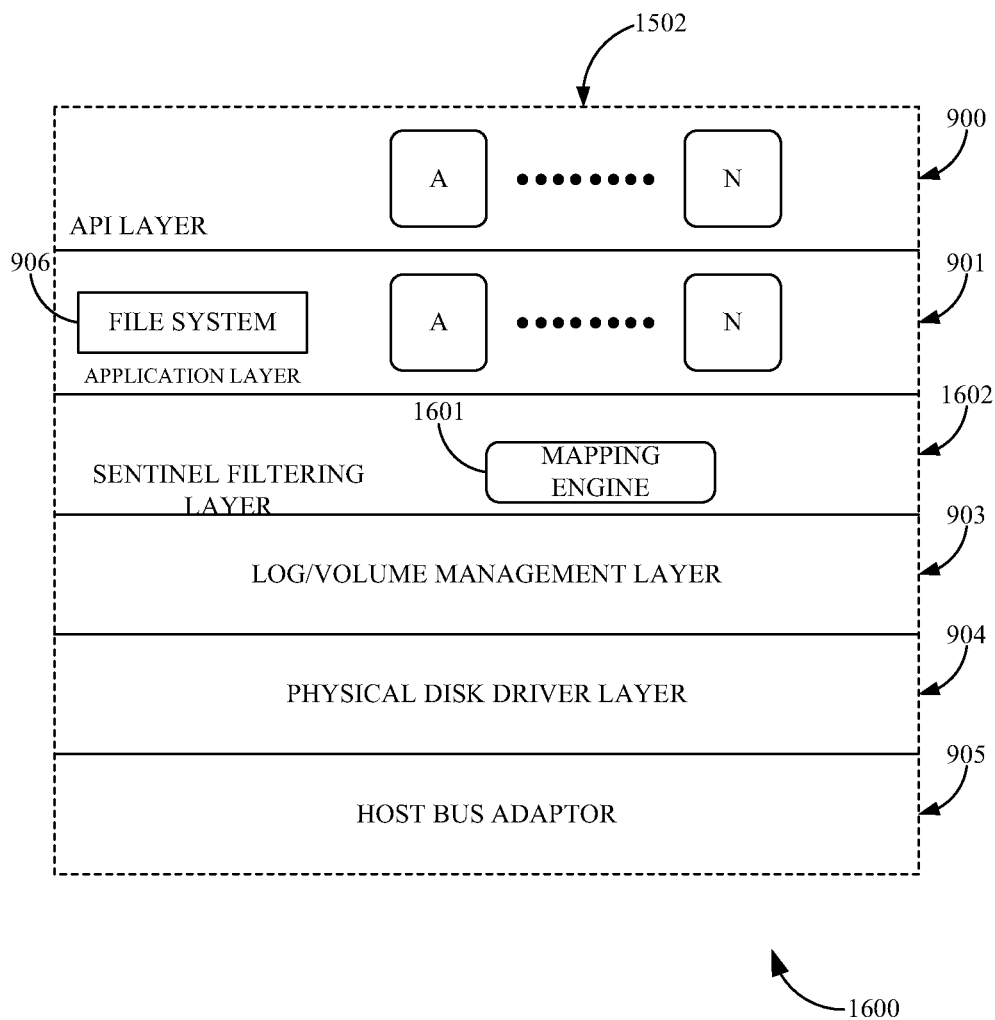
FIG. 16 is a block diagram illustrating components of a client application according to another embodiment of the present invention.

FIG. 16 is a block diagram 1600 illustrating components of a client application analogous to application 1502 according to an embodiment of the present invention. Application or instance 1502 is somewhat analogous to client application 807 described with reference to FIG. 8. API layer 900 and application layer 901 including file system 906 are virtually unchanged from the description of FIG. 9 of this specification. Likewise layers 904 and 905 are identical to the previous version.

In this case, an enhancement for Log volume management is provided and illustrated as layer 1602 of client application 1502. Layer 1602 contains the components responsible for generating metadata and for setting bit flags during log volume write population. The log/volume management layer enables the host system to access and write data to the log volume in either embodiment described with respect to FIG. 15. The same write data that is destined for a primary storage LUN or target space is written to the log volume using a separate LUN or SLUN in the case of a shared volume.

In a preferred embodiment, a bit flag is set to mark when a block is locked from access and a second bit flag is set to indicate that writes to the block are complete and are ready for access by a reader. Layer 1602 may, in one embodiment, contain a utility (not shown) that detects when a log file or block is Full and automatically sets a flag bit to indicate the state before moving on to the next file or block. A mapping engine 1601 may provide the true-to-logical offset mapping metadata and frame based metadata so that the true offset and end-write locations are known. Layer 902 may also continue to provide filtering results using onboard metadata and algorithmic function to continue to reduce redundant writes from the same host before actually committing data to a log entry in one embodiment. A disk-locking feature of the system enables rigid log entry journaling and log entry clearing by setting bits in asynchronous or synchronous mode in the case of V-LUN.

Figure 17:
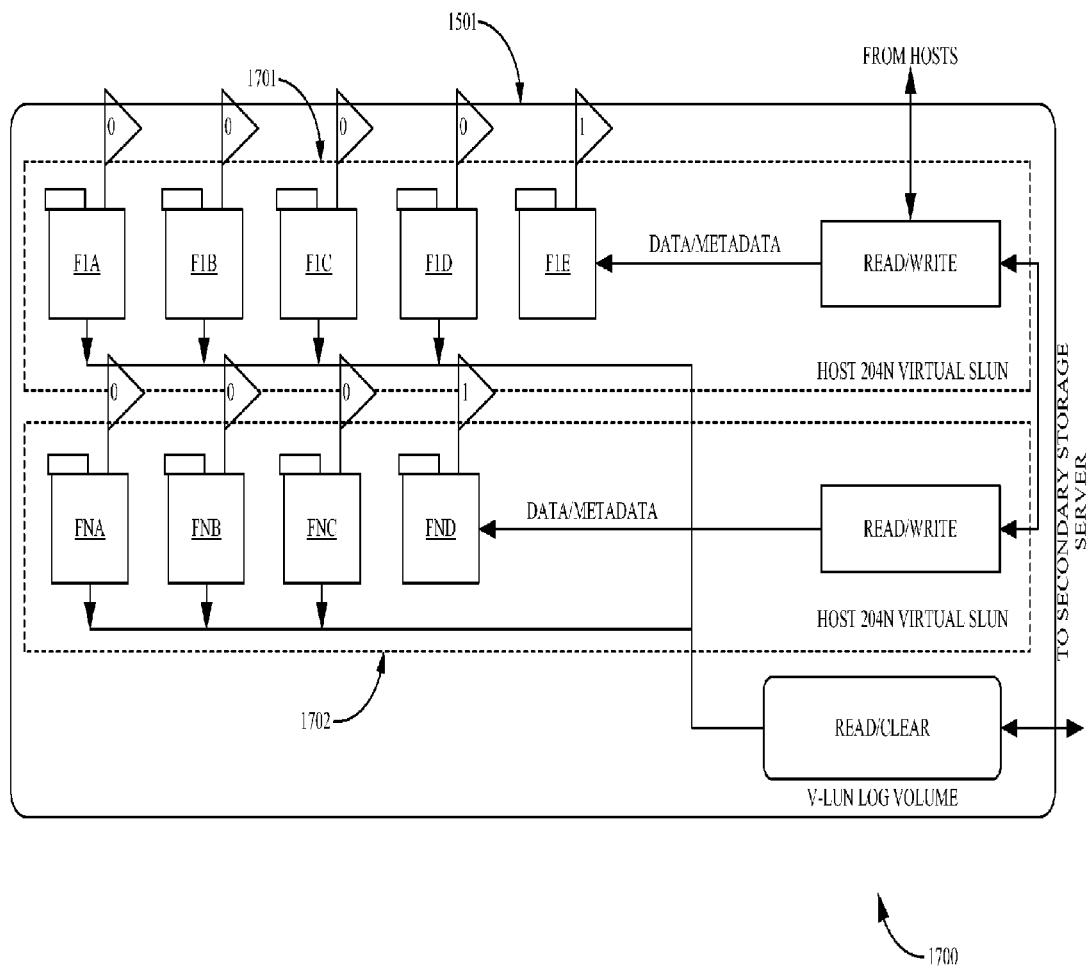
FIG. 17 is a block diagram-illustrating format of a virtual LUN according to yet another embodiment of the present invention.

FIG. 17 is a block diagram 1700 illustrating formatting of a virtual LUN Log volume according to another embodiment of the present invention. Diagram 1700 logically illustrates a virtual LUN portion of a secondary storage disk or server memory allocation, herein referred to as V-LUN LOG Volume 1501. Virtual LUN Log volume 1501 contains a data write transactional record 1701 for an exemplary host 2041, and a data write transactional record 1702 for exemplary host 204N. In one embodiment, Log volume 1501 has a LUN number assigned identifying it as a virtual device for use by hosts charged with backing up data. In this case, the hosts may have a primary storage LUN device (data volume) and a virtual Log LUN (log volume).

In another embodiment, each host may be assigned a dynamic portion of volume 1501 for writing data to wherein each assigned portion is identified with a SLUN. In this case, transactional records including write data and metadata are physically separated from each other by SLUN. Transaction record 1701 is formatted according to a file system wherein 1701 may appear as a folder containing files F1A through F1E. Each block has a bit flag set [O] to indicate when it is locked and one bit flag set [I] to indicate when the writes to it are complete and ready for read access as described further above. It is noted herein that the representation of record 1701 as a set of files is exemplary only. Lower level block representation may also be the rule. In the case of record 1701, each file F1A-F1D represents a sequential portion of a data write each portion or file being full and of the same number of bytes. A bit flag value of [0] represented by a triangle flag icon containing the value 0 is set indicating that the files are completed and free for use by the host. File F1E has a 1-bit flag value indicating that it is locked from access.

Host nodes may access volume 1501 via FC channels to the secondary storage server and may perform read/write operations within volume 1501 in tandem with other operating host nodes. In this case, records 1701 and 1702 are being created almost simultaneously by two identified hosts (1701) and (1702). Read/Write operations are performed from hosts accessing their appropriate SLUNs in volume 1501.

The secondary storage server is running a READ/CLEAR operation on both log entries 1701 and 1702. Each file of each record is sequentially read and cleared if the bit flag is set for read access. As files F1E and FND become available, they will in turn be read and cleared. It is noted herein that in a preferred embodiment all data read from log entries 1701 and 1702 is backed up to a secondary near term storage disk before the data is erased or cleared from the entries. The actual memory space in use by V-LUN log volume 1501 at any given point in time may vary according to actual use by hosts.

Memory is allocated dynamically as it is needed to contain the write data and associated metadata. Likewise as data is cleared, the actual memory space may be, in one embodiment, de-allocated and used for other purposes.

In one embodiment, log volume 1501 may contain only metadata enabling the secondary storage server to read directly from data volumes on the primary storage system. However, logging of actual write data eliminates direct read overhead from primary storage. It is noted herein as well that there may be separate V-LUN log volumes for separate hosts, in which case only one host would access and write to one volume.

Figure 18:
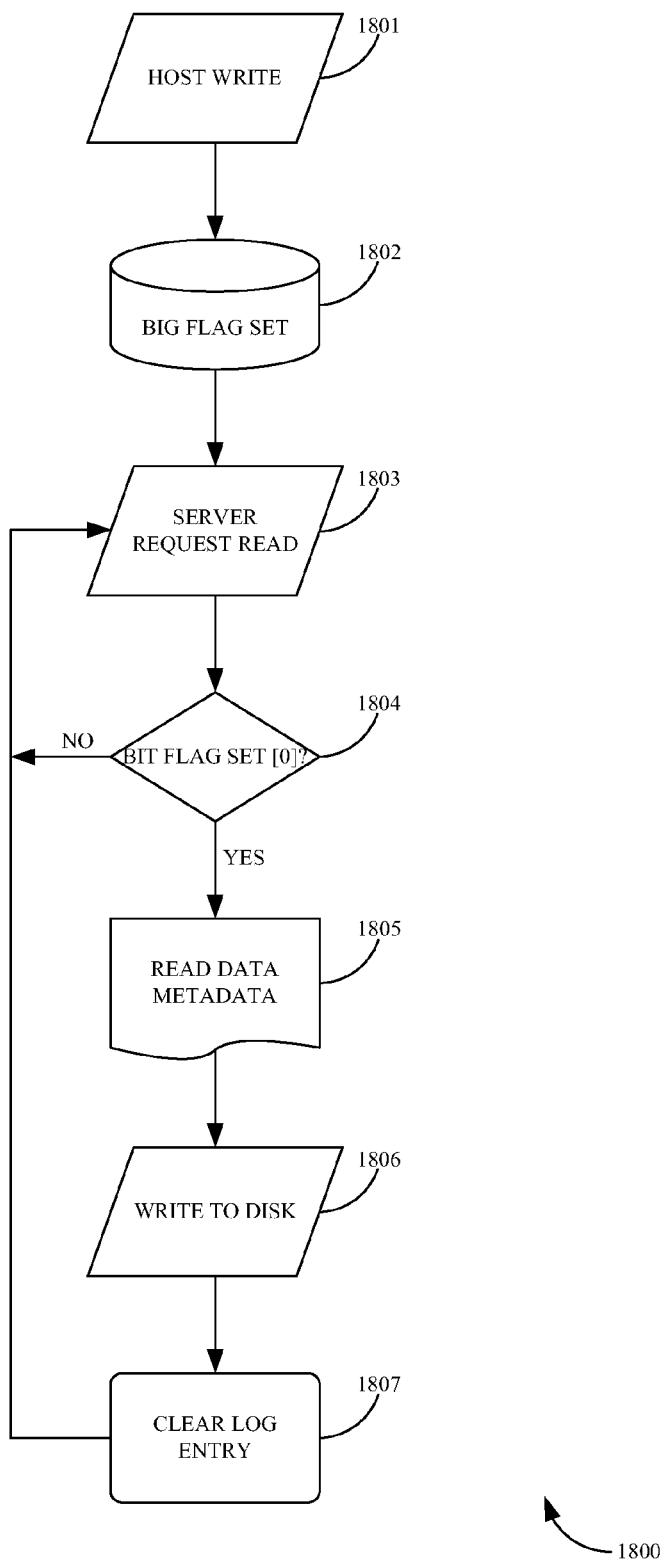
FIG. 18 is a process flow diagram illustrating log volume access synchronization according to an embodiment of the present invention.

FIG. 18 is a process flow diagram 1800 illustrating log volume access synchronization according to an embodiment of the present invention. At step 1801, a host accesses and writes data to a log volume in conjunction with writing to primary storage. It is not specifically important which write location is populated first. In the case of the data volume in primary storage, the write session follows the protocols of RAID or other primary storage system type. In the case of the log volume, the write session is limited to pre-sized containers or files limited to a certain number of bytes of data.

At step 1802, the host sets a bit flag when each file is full of data, the bit indicating that the file or container of data is read ready. A byte limit may be imposed for a write session whereby when one container has reached the limit of data then a next container is created or if already created, used for the next write data until the session is over for that log entry. Steps 1801 and 1802 may represent multiple writes being conducted by multiple hosts. Moreover, each write session may contain multiple data files if a file system is used. Likewise granularity may be ordered to specific regions within a file, each region representing a portion of the logical volume being protected. At step 1803, the secondary storage server requests to read data from the log volume. This step may be initiated periodically wherein the server according to a time schedule accesses the log volume to read and clear any read-ready files.

In one embodiment, reads can be based on the amount of changes made, which may be tracked by a collection of set bits. In one embodiment, step 1803 is performed at boot and the server has connection to the log volume as long as the system is up and running. When attempting to read a log entry containing write data, the server determines which bit value is set for each file scanned. If a file is locked then the next file is scanned and so on until the server finds a read ready file or data container. If the appropriate bit value is detected, then the server may read the data within the container at step 1805. The read step is incrementally followed by a write step 1806 whereby the server writes the read data to disk or other near term storage on behalf of the host. In a preferred embodiment, data journaling is sequential and data reading and backup to disk is likewise sequential. In step 1807, the server, having completed step 1806 for a file or for a log entry then clears the read files or data containers of data. The host may then reuse the cleared space for more data writes. Each log entry may be generic to one data write session performed by one host and may include embedded metadata describing the write data, offset location in primary storage of the data write, the payload length of the data frames, source and target identification, time stamp data, and so on. In one embodiment, a certain amount of redundant data may be included in the log volume or even in a log entry from a single host. However, once data is read a snapshot view or bitmap image of previous write activity already backed up can be used to eliminate near term storage of redundant data. Likewise a metadata comparison between metadata about data stored and metadata about data read can be used to eliminate any redundant writes.

One with skill in the art will recognize that process 1800 may contain more or fewer steps than those illustrated without departing from the spirit and scope of the invention. Depending on configuration of a log volume and whether it is software managed, as in a virtual LUN, or hardware managed as a disk partition, other steps may be introduced to process 1800 without departing from the spirit and scope of the present invention. In addition, SCSI, FC, or other network communication protocols may be implemented on top of the client and server application stacks to enable direct communication between hosts and the server through the supporting switch fabric or Ethernet switch. Writing to a log volume and then reading from that volume and clearing the data is just one preferred method of acquiring data for backup from one or more host nodes.

This method may reduce or eliminate, in some embodiments, any need for direct access to a SAN-based primary storage system from the secondary storage facility. Likewise, many enhancements related to speed of journaling and speed of data acquisition can be implemented using a virtual log volume approach.

Figure 20:
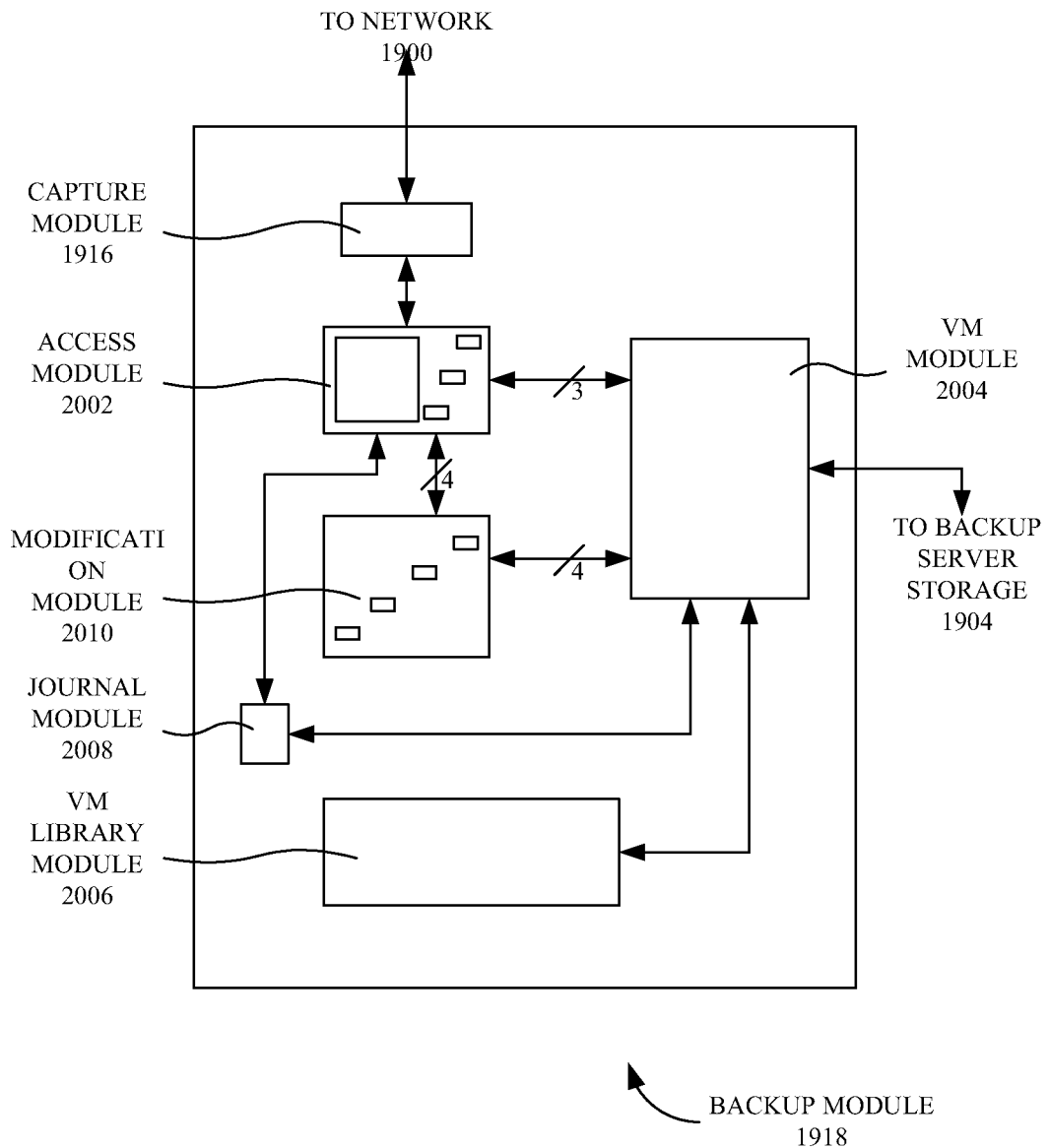
FIG. 20 is a modular diagram of the backup module in the backup server of FIG. 19, according to one embodiment.
Figure 21:
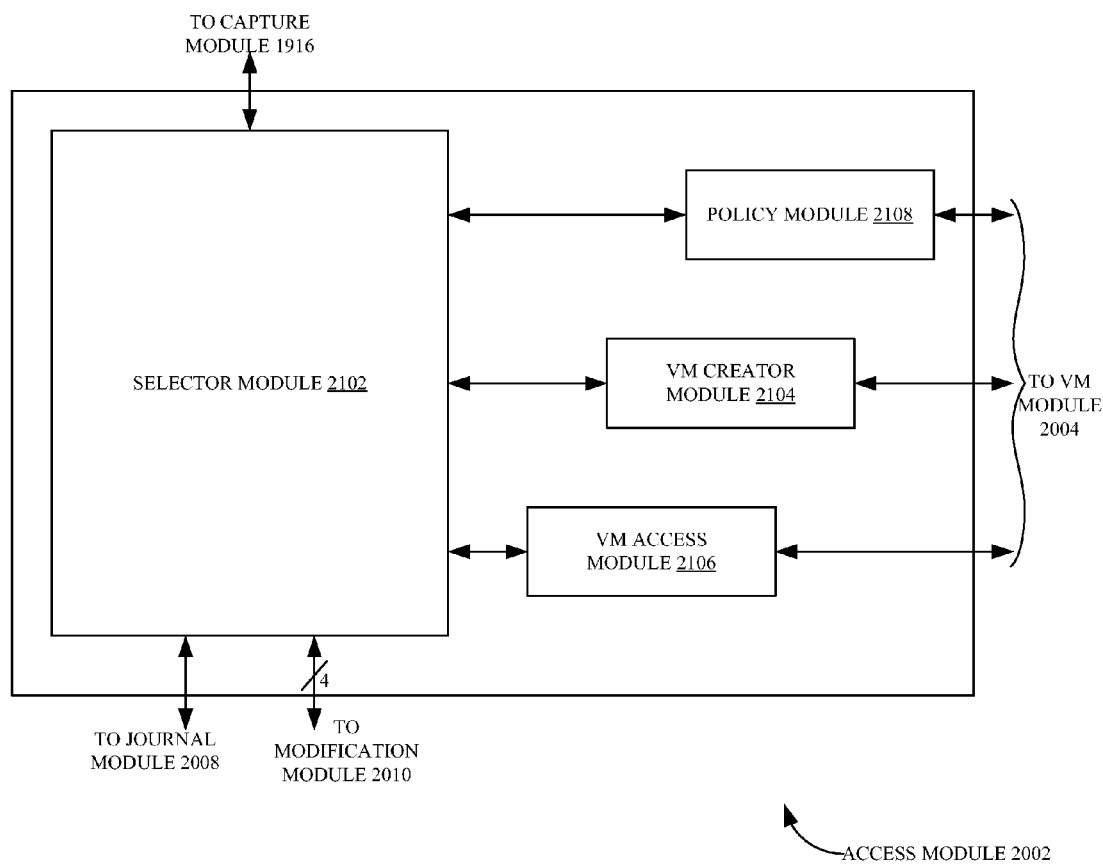
FIG. 21 is a modular view of the access module with a selector module determining a task based on a signal data communicated through the capture module of FIG. 19, according to one embodiment.
Figure 22:
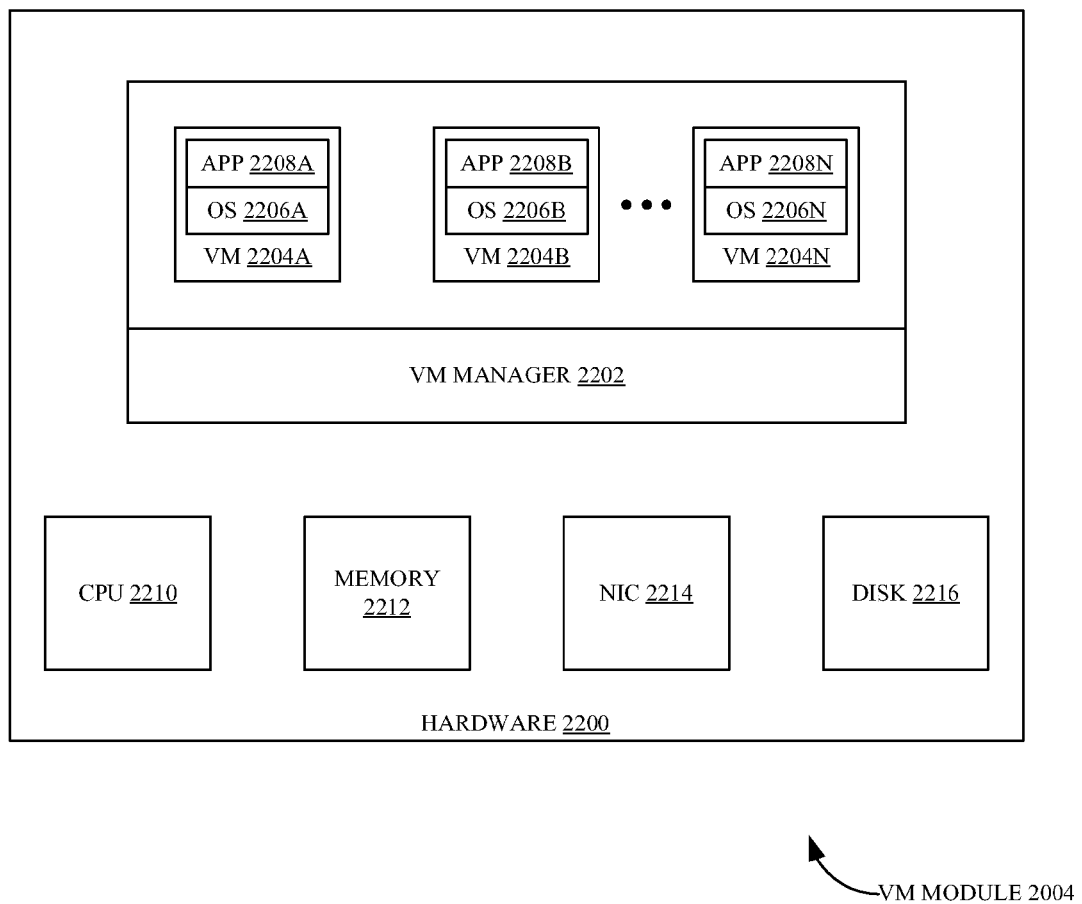
FIG. 22 is a modular view of the VM module of FIG. 20 having a VM manager, according to one embodiment.
Figure 24:
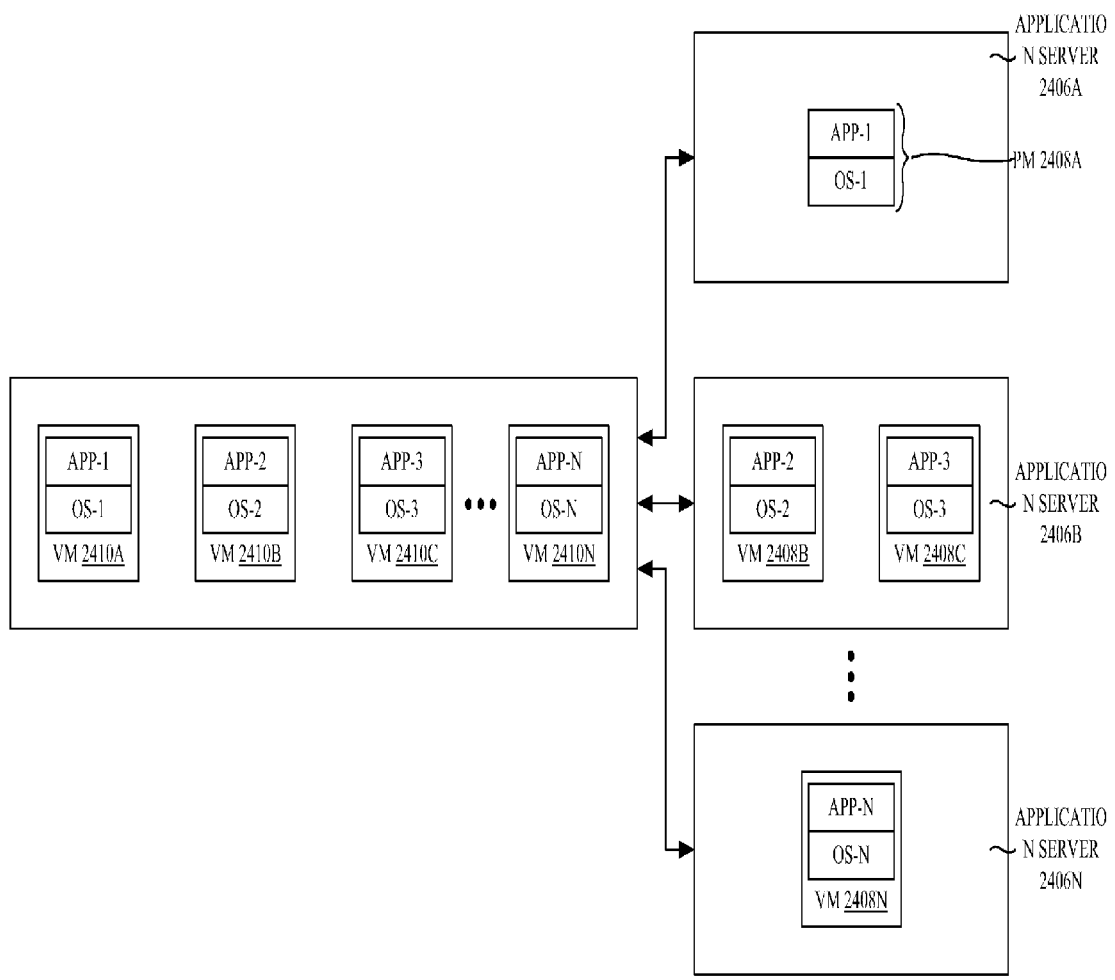
FIG. 24 is a block diagram of a backup server having a plurality of virtual machines connected to a plurality of application servers, according to one embodiment.

In one embodiment, as illustrated in FIG. 20 and FIG. 21, an apparatus includes a virtual machine (VM) creator module to generate a command to create a virtual machine (e.g., as illustrated in FIG. 22) mirroring an operating system and an application of an application server (e.g., as illustrated in FIG. 24) when the application server is coupled to the backup device, a capture module to collect any change of a data processed in the application server and communicate the any change of the data to the backup device, a VM access module to match the virtual machine which corresponds to the operating system and the application of the application server when an identification data associated with the application server is communicated to the backup device, and a journal module to continuously copy the any change of the data to a storage device coupled to the backup device using the virtual machine and/or directly through the backup device.

Figure 19:
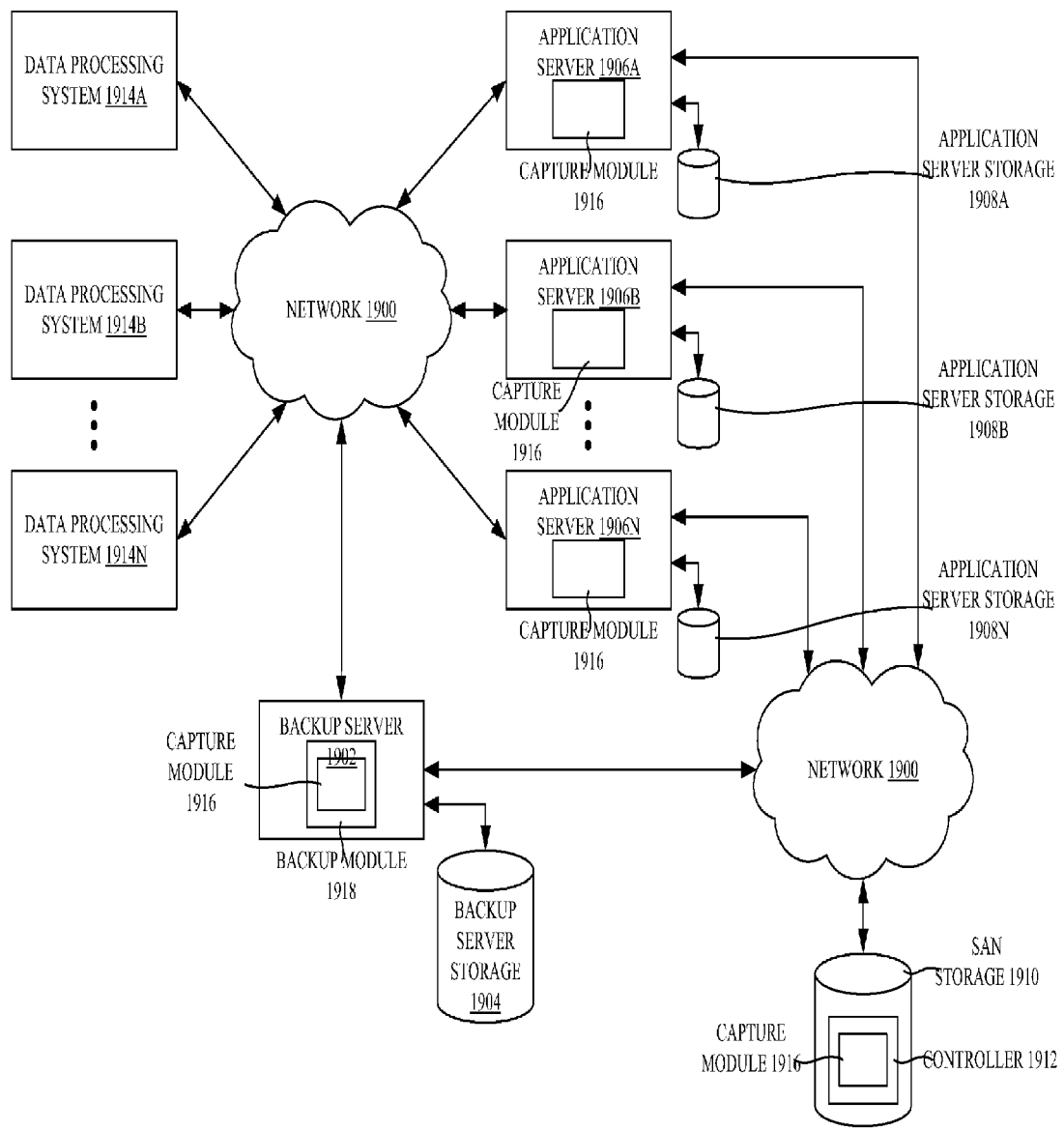
FIG. 19 is a network enabled view of a backup module of a backup server connected to a plurality of application servers, according to one embodiment.

In another embodiment, a network system of servers (e.g., as illustrated in FIG. 19) includes an application server to process any change of a data and a backup server coupled to the application server via a network to continuously back up the any change of the data in a storage device (e.g., a backup server storage 1904 of FIG. 19) coupled to the backup server using a virtual machine of the backup server. In yet another embodiment, a method, as illustrated by FIGS. 21-24, includes creating a virtual machine associated with a backup module based on attributes of an application server when the application server is coupled to a network having the backup module, continuously capturing any change of a data processed in the application server and automatically backing up the any change of the data in a storage device coupled to the backup module using the virtual machine, and communicating at least the data in the storage device to the application server using the virtual machine when a command is communicated to the backup module.

Also, the method may be in a form of a machine-readable medium embodying a set of instructions that, when executed by a machine, cause the machine to perform any method disclosed herein. It will be appreciated that the various embodiments discussed herein may not be the same embodiment, and may be grouped into various other embodiments not explicitly disclosed herein.

FIG. 19 is a network enabled view of a backup module 1918 of a backup server 1902 connected to a plurality of application servers 1906, according to one embodiment. In FIG. 19, the backup server 1902 having the backup module 1918 is connected to a network 1900 (e.g., internet, WAN, LAN, SAN, etc.). The backup module (e.g., in software and/or hardware) manages a communication (e.g., reading, writing, modifying of data) via the network 1900 between the application servers 1906 and a backup server storage 1904 attached to the backup server 1902. In one example embodiment, the application server 1906 may issue (e.g., write, retrieve, etc.) a request (e.g., using a meta-data) for blocks (e.g., segments) of data to and/or from the backup server storage. Here, the backup server storage 1904 may act in a similar fashion to an internal drive, accessing the blocks and sending response across the network 1900.

In another example embodiment, the application server 1906 may issue a request (e.g., using a meta-data) for a data file as a part of a larger file system which may be managed by the backup module 1918 of the backup server 1902. The backup module 1918 may then determine a physical location of the data file, access the data file on one of internal drives of the backup server storage 104 attached to the backup module 1918, and communicate (e.g., send) the data file to the application server 1906 via the network 1900.

The application server 106 may operate an application (e.g., FoundationIP®, Hotmail®, Citibank®, File/Print®, Orbitz®, etc.) based on an operating system (e.g., Win XP®, Win 2000®, Linux®, Novell®, etc.). The operating system may be a program that manages a relationship between the application and a number of hardware that are connected to the application server 1906. The operating system may provide a variety of services (e.g., disk access, memory management, task scheduling, access to other hardware services, etc.).

The operating system may also be equipped with tools for programs to display and manage a user interface as well as utility programs to manage files and configure the operating system. For example, the operating system may provide a file system which may be a method of storing and organizing computer files and data as well as a method for accessing the files and data. A user (e.g., using a data processing system 1914 such as a desktop, a laptop, a Blackberry@, etc.) of the application may access the application via the network 1900.

An application server storage 108 may be a direct access storage device (e.g., floppy disk, hard disk, magnetic disk, optical disk, CD-ROM, DVD, etc.) which may permanently (e.g., in a non-volatile manner) store data mechanically, magnetically, and/or optically. The data may be also stored in a storage area network (SAN) storage 1910 via the network 1900 (e.g., SAN, etc.). A controller 1912 (e.g., a plurality of disk array controller, etc.) of a the SAN storage 1910 which attaches to the application server 1906 via the network 1900 may be attached to a number of disk drives in disk enclosures which are organized into RAID (e.g., redundant array of independent disks which uses multiple drives to share and/or replicate data among the drives for increased data integrity, fault tolerance, and/or throughput compared to single drives) sets for data protection and performance reasons.

The controller 1912 may also provide other services in addition to the RAID. The services may include read cache, write cache and/or copy services such as Flash Copy and Peer to Peer Remote Copy (PPRC). The controller 1912 may be attached to the application server 1906 using a number of different methods including a SCSI command protocol over a Fibre Channel (FC) link, a SAN over either an IP Network (iSCSI) or FC, and/or the SCSI command protocol over a serial bus such as Serial Attached SCSI.

A capture module 1916 of the backup module 1918 may be used to continuously capture (e.g., to store for a later use) any change of a data processed in the application server 1906 (e.g., via the application). The change of the data may include any one of a first instance of the data (e.g., the data saved when the user first created a file, folder, etc.) and subsequent changes (e.g., based on a write operation and/or a delete operation) to the data. The capture module 1916 may be located (e.g., installed) in the application server 1906, the backup module 118 of the backup server 1902, and/or the controller 1912 of the SAN storage 1910.

When capturing of the data takes place in the application server 1906 and/or the controller 1912 of the SAN storage 1910, the data may be communicated to the backup module 1918 of the backup server 1902 via the network 1900 which backs up the data in the backup server storage 1904. When capturing of the data takes place in the backup module 1918 of the backup server 1902, the data will be communicated directly to the backup server storage 1904.

FIG. 20 is a modular diagram of the backup module 1918 in the backup server 1902 of FIG. 19, according to one embodiment. The backup module 1918 includes a capture module 1916 of FIG. 19, an access module 2002, a virtual machine (VM) module 2004, a VM library module 2006, a journal module 208, and a modification module 2010. The capture module 1916 of FIG. 19 (e.g., of the backup module 1918, the application server 1906, and/or the backup server 1902) may be used to capture (e.g., acquire) a change of a data (e.g., in text, images, audio and video) in their original format. Once captured, the change of the data are typically edited and converted into another format in the journal module 2008.

The access module 2002, as will be illustrated in more details in FIG. 21, may include a number of sub-modules (e.g., a selector module 2202, a VM creator module 2104, a VM access module 306, and a policy module of FIG. 21) to provide an access to the VM module 2004 when a command (e.g., data and/or a meta-data) is communicated to the access module 2002. The VM module 2004 may be used to create and manage a plurality of virtual machines used in various operations of the backup module 1918, as will be illustrated in FIG. 22. In one example embodiment, the virtual machines may be created using a software algorithm (e.g., which may be already available on the market such as VM Ware®, Xen®, etc.).

The VM library module 206 may be used to store attributes (e.g., an application, an operating system, etc.) of the application server 106 when the application server 1906 is connected to the network 1900 (e.g., at least once at the time of the connection). In one example embodiment, the VM library module 2006 may be a software program to manage a storage device (e.g., the backup server storage 1904 of FIG. 19) that handles multiple units of media and/or to provide one or more drives for reading and writing the application and operating system.

The journal module 2008 may be used to continuously copy (e.g., synchronously and/or asynchronously) the any change of the data to a storage device (e.g., the backup server storage 1904) coupled to the backup module 1918. The journal module 2008 may also modify the any change of the data to a format (e.g., a format of the operating system, file system, application, and/or other attributes) of the virtual machine before backing up in the storage device. The modification module 2010 may be used to perform a retrieval operation, a restore operation, a disaster recover (DR) operation, and/or a purge (e.g., deletion) operation as will be illustrated in more details in FIG. 23.

FIG. 21 is a modular view of the access module 2002 with a selector module 2102 determining a task based on a signal data (e.g., a data and/or a meta-data) communicated through the capture module 1916 of FIG. 19, according to one embodiment. The access module 202 includes the selector module 2102, the VM creator module 2104, the VM access module 2106, and the policy module 2108. In one example embodiment, the selector module 2102 may receive the change of the data acquired in the capture module 1916 of FIG. 19 and a command to back up the change of the data to the backup server storage 1904. In this case, the selector module 2102 may be used to access a virtual machine which may correspond to attributes (e.g., the application, the operating system, the file system, etc.) of the application server 1906 using the VM access module 2106. Then, the change of the data may be modified and/or copied to the backup server storage 1904 using the journal module 2008 of FIG. 20.

In another example embodiment, the selector module 2102 may receive a metadata (e.g., any descriptive item about data, such as a title field in a media file, a field of key words in a written article and/or a content in a meta tag in an HTML page) describing data and a command to perform a modification (e.g., retrieval, recovery, restore, and/or deletion) of the data. Here, the selector module 2102 may be used to access a virtual machine which may correspond to the attributes (e.g., the application, the operating system, the file system, etc.) of the application server 1906 using the VM access module 2106. Then, the selector module 2102 may be used to communicate (e.g., retrieve, restore, recover, and/or purge) the data back to the application server 1906 using a sub-module (e.g., the retrieval module 2302, the restore module 2304, the DR module 2306, and/or the delete module 2308 of FIG. 23) of the modification module 2010 of FIG. 20.

Furthermore, the selector module 2102 may communicate (e.g., send and/or receive) a signal data to the VM creator module 2104 when the selector module 2102 detects an application server coupled to the network 1900 of FIG. 19. Then, the VM creator module 2104 may process the signal data to create a virtual machine mirroring (e.g., duplicating data onto another computer at another location for backup purposes) the attributes (e.g., the application, the operating system, the file system, etc.) of the application server 1906.

Next, the virtual machine may be stored using the VM library module 2006, a software program/management tool which may used to backup the virtual machine (e.g., equipped with the attributes of the application server 1906) to a specified storage space (e.g., a designated drive) of the backup server storage 1904 of FIG. 19.

Figure 23:
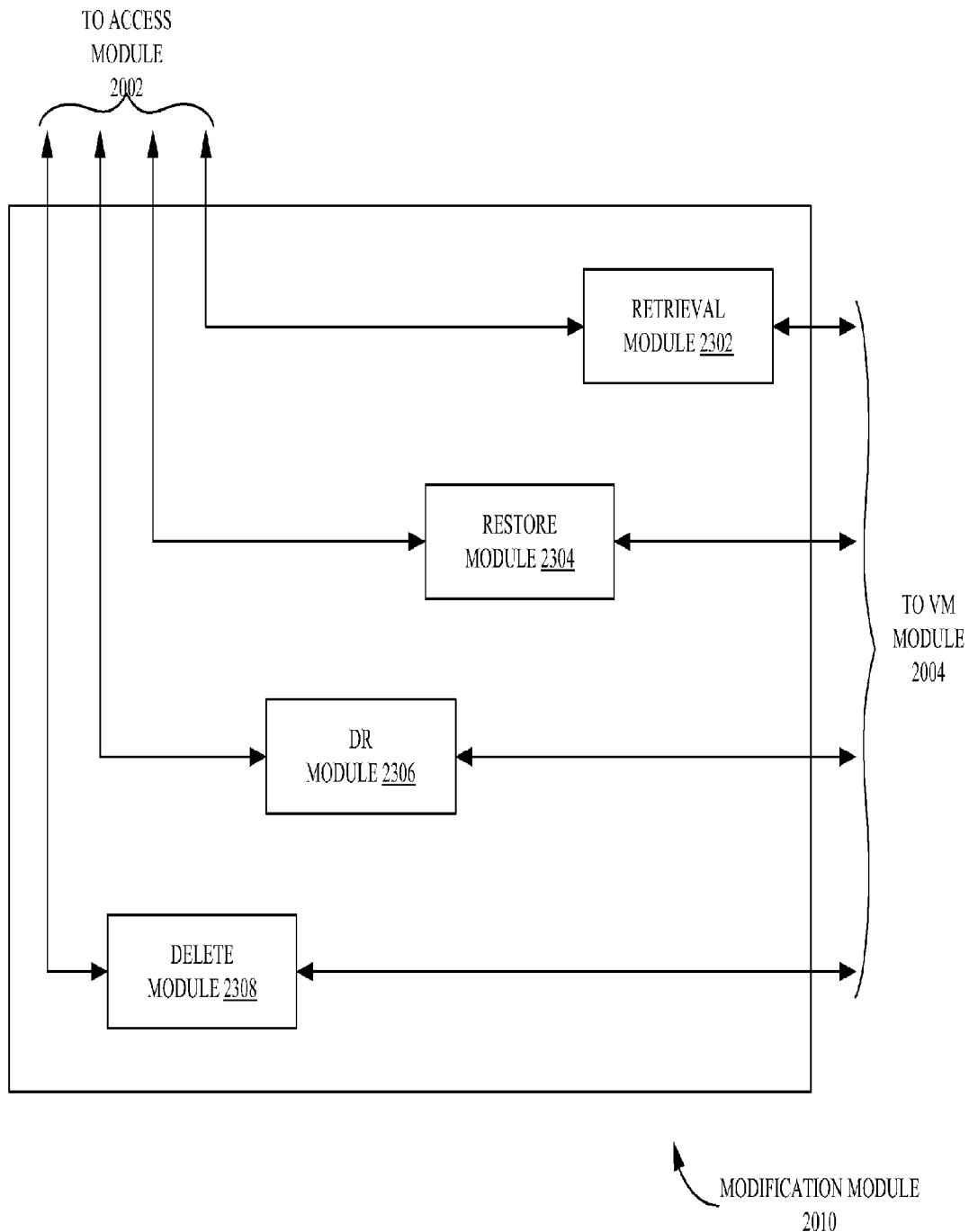
FIG. 23 is a modular diagram of the modification module of FIG. 20, according to one embodiment.

Moreover, the policy module 2108 of the selector module 2102 may generate a command data to purge data using the deletion module 2308 of FIG. 23 described by a meta-data (e.g., which may be a part of the command data) when a signal data indicating that a period since a recent modification of the data exceeds a threshold value is communicated to the selector module 2102.

For instance, data that have not been modified for a long duration of time (e.g., 50 years) and/or are not required to keep due to other valid reasons (e.g., no legal requirement and/or business need) may be automatically purged (e.g., deleted) by setting an algorithm with a threshold value in the policy module 2108. Accordingly, the virtual machine which corresponds only to the data but none other data stored in the backup server storage 1904 may be purged from the VM module 2004 and/or the VM library module 2006 of FIG. 20 as a part of an effort to manage a backup operation of the backup server 1902 and/or the backup server storage 1904 in a more efficient manner.

FIG. 22 is a modular view of the VM module 2004 of FIG. 20 having a VM manager 2202, according to one embodiment. The FIG. 22 includes a hardware (e.g., of an application server, a backup server, etc.), a VM manager 2202, a VM (virtual machine) 2204, a OS (operating system) 2206, an APP (application) 2208, a CPU (central processing unit) 2210, a memory 2212, a NIC (network interface card) 2214, and a disk 2216. The VM module 2004 may be a software program and/or a hardware (e.g., which may be modified based on a product existing in the market such as VM Ware® and Xen® and/or may be created in its entirety) to enable a virtualization of a machine (e.g., the application server 1906, the backup server 1902, etc.).

The virtualization may be a method of separating a resource for a service (e.g., an application) from a physical delivery of the service (e.g., an application server running the application). A key benefit of the virtualization may be an ability of running multiple applications (e.g., the APPs 2208A-N) and/or multiple operating systems (e.g., the OS 2206A-N) on a single physical system (e.g., a single application server) while sharing underlying hardware resources available in the single physical system. The VM manager 2202 may be a software program that runs in a layer between the VM 2204 and the hardware 2200 to export (e.g., to create using the VM creator module 2104 of FIG. 21 and the VM manager 2202 and/or provide an access to the VM module 2004 of FIG. 20 using the VM access module 2106 and the VM module 2004) a VM 2204 identical to the attributes (e.g., the application, the operating system, the file system, etc.) of the application server 1906 of FIG. 19. Here, the VM 2204 may be used to export (e.g., to create and/or provide an access) using a transparent virtualization which allows an operating system or a particular component of the operating system to run inside the VM 2204 without any modification.

In addition, the VM 2204 may be exported using a para-virtualization which requires the operating system to be modified before it can run inside the VM 2204. The CPU (central processing unit) 2210, the memory 2212, the NIC (network interface card) 2214, and the disk 2216 may be managed by the VM manager 2202 so that they may be accessed by the VMs 2204A-N.

FIG. 23 is a modular diagram of the modification module 2010 of FIG. 20, according to one embodiment. The modification module 2010 includes a retrieval module 2302, the restore module 2304, the disaster recovery (DR) module 2306, and the delete module (2308). The retrieval module 2302 may be used to retrieve a past instance of data describe by a meta-data when the retrieval module 2302 is trigged by the selector module 2102 of FIG. 21 with the meta-data describing the data targeted for a retrieval operation.

In one example embodiment, the meta-data may indicate files of Hotmail messages from Smith to Mike between Jan 1st of 1980 to December 31" of 1982. Upon trigged by the selector module 2102 with the meta-data, the retrieval module 2302 may patch the data from the backup server storage 1904 of FIG. 19 using a virtual machine (e.g., the VM 2204 of FIG. 22) of the VM module 2004 of FIG. 20 which matches attributes (e.g., the application, the operating system, the file system, etc.) of the application server 1906 used in backing up the data.

The restore module 2304 may be used to restore a past instance of the application server 1906 of FIG. 19 describe by a meta-data when the restore module 2304 is trigged by the selector module 2102 of FIG. 21 with the meta-data describing the application server and a time stamp of the past instance. In one example embodiment, the meta-data may contain the application server 1906 with a particular network IP address (e.g., the address of the application server 1906 attached to an IP network) and the time stamp denoting "5:15 pm of December 25th, 2005." Upon trigged by the selector module 2102 with the meta-data, the restore module 2304 may patch a version of system configurations (e.g., attributes and/or other data) of the application server 1906 stored in the backup server storage 1904 of FIG. 19 up until 5:15 pm of December 25th, 2005 using a virtual machine (e.g., the VM 2204 of FIG. 22) of the VM module 2004 and/or the VM library module 2006 of FIG. 20. Thus, the restore module 2304 may allow the application server 1906 to return to a state (e.g. system configurations) of the application server 1906 before there was any corruption (e.g., pf the data and/or the system due to a virus, incorrigible error, etc.).

The DR module 2306 may be used to automatically recover recent (e.g., most recent) attributes and/or data of the application server 1906 when the DR module 2306 is trigged by the selector module 2102 of FIG. 21. In one example embodiment, the DR module 2306 may be triggered by the selector module 2102 when the application server 1906 is inactive (e.g., down). Upon trigged by the selector module 2102, the DR module 2306 may patch a recent (e.g., most updated) copy of the attributes (e.g., the application, the operating system, the file system, etc.) and/or data of the application server 1906 from the backup server storage 1904 of FIG. 19 using a virtual machine (e.g., the VM 2204 of FIG. 22) of the VM module 2004 and/or the VM library module 2006 of FIG. 20.

The delete module 2308 may be used to purge (e.g., delete) data described by a meta-data when the delete module 2308 is trigged by the selector module 2102 of FIG. 21 with the meta-data describing the data targeted for a delete operation. In one example embodiment, the meta-data may indicate files of Hotmail® messages from Smith to Mike between Jan 1" of 1980 to December 31" of 1982. Upon trigged by the selector module 2102 with the meta-data, the delete module 508 may delete the data from the backup server storage 1904 of FIG. 19 using a virtual machine (e.g., the VM 2204 of FIG. 22) of the VM module 2004 of FIG. 20 which matches attributes (e.g., the application, the operating system, the file system, etc.) of the application server 1906 used in backing up the data.

In another example embodiment, the delete module 2308 may be used to purge (e.g., delete) data described by a different type of meta-data (e.g., type of file, topic, author, or similar meta-data). In both example embodiments, the policy module 2108 of FIG. 21 may generate a sensory data (e.g., visual, auditory, etc.) to warn any possible breach of legal requirement (e.g., Sarbanes-Oxley which requires public companies and their public accounting firms to retain records, including electronic records that impact the company's assets or performance) before the delete module 2308 is in effect.

FIG. 24 is a block diagram of a backup server 2402 having a plurality of virtual machines 2410 connected to a plurality of application servers 2406, according to one embodiment. The application server 2406A may be based on a physical machine (e.g., a PM 2408A) with an application (e.g., an APP-1) and an operating system (e.g., an OS-1). The application server 606B may be based on two virtual machines (e.g., a VM 2408B and a VM 608C) each virtual machine having a unique application and operating system (e.g., an APP-2 and an OS-2 for the VM 2408B and an APP-3 and OS-3 for the VM 2408C).

Here, the application server 2406B may be able to better utilize an operating capability (e.g., such as operating an APP-3 while an APP-2 is not being used) of the application server 2406B. The application server 2406N may be based on a single virtual machine (e.g., a VM 2408N) having an application (e.g., an APP-N) and an operating system (e.g., an OS-N). More virtual machines may be added to the application server 2406N.

The backup server 2402 may include a VM 2410A, a VM 2410B, a VM 2410C, and a VM 2410N. The VM 2410A may be a replication of the PM 2408A of the application server 2406A created by the VM module 2004 of FIG. 20. The VM 2410B and the VM 2410C may be a replication of the VM 2408B and a replication of the VM 2408C of the application server 2406B respectively created by the VM module 2004. Likewise, the VM 2410N may be a replication of the VM 2408N of the application server 2406N.

In one example embodiment, a virtual machine (e.g., the VM 2410) mirroring a physical machine (e.g., the PM 2408A) and/or a virtual machine (e.g., the VMs 2408B-N) of the application server 2406 may be created (e.g., at least once) in the backup server 2402 (e.g., the backup module 1918 of FIG. 19) using the VM creator module 2104 of FIG. 21 and the VM module 2004 of FIG. 20 when the application server 2406 is connected to the backup server 2402 through the network 1900. The virtual machine (e.g., the VM 2410) may be maintained and/or accessed through the VM access module 2106 of FIG. 21 and/or the VM module 2004 of FIG. 20. In addition, attributes (e.g., the application, the operating system, the file system, etc.) of the virtual machine (e.g., the VM 2410) may be stored in the VM library module 2006 of FIG. 20 and the VM module 2004 of FIG. 20.

The virtual machine (e.g., the VM 2410) of the backup server 2402 may be purged from the backup server 2402 using the delete module 2308 of FIG. 23 when the policy module 2108 of FIG. 21 does not raise any flag (e.g., an age of data about to be purged is less than a threshold value set in the policy module 2108).

Figure 25:
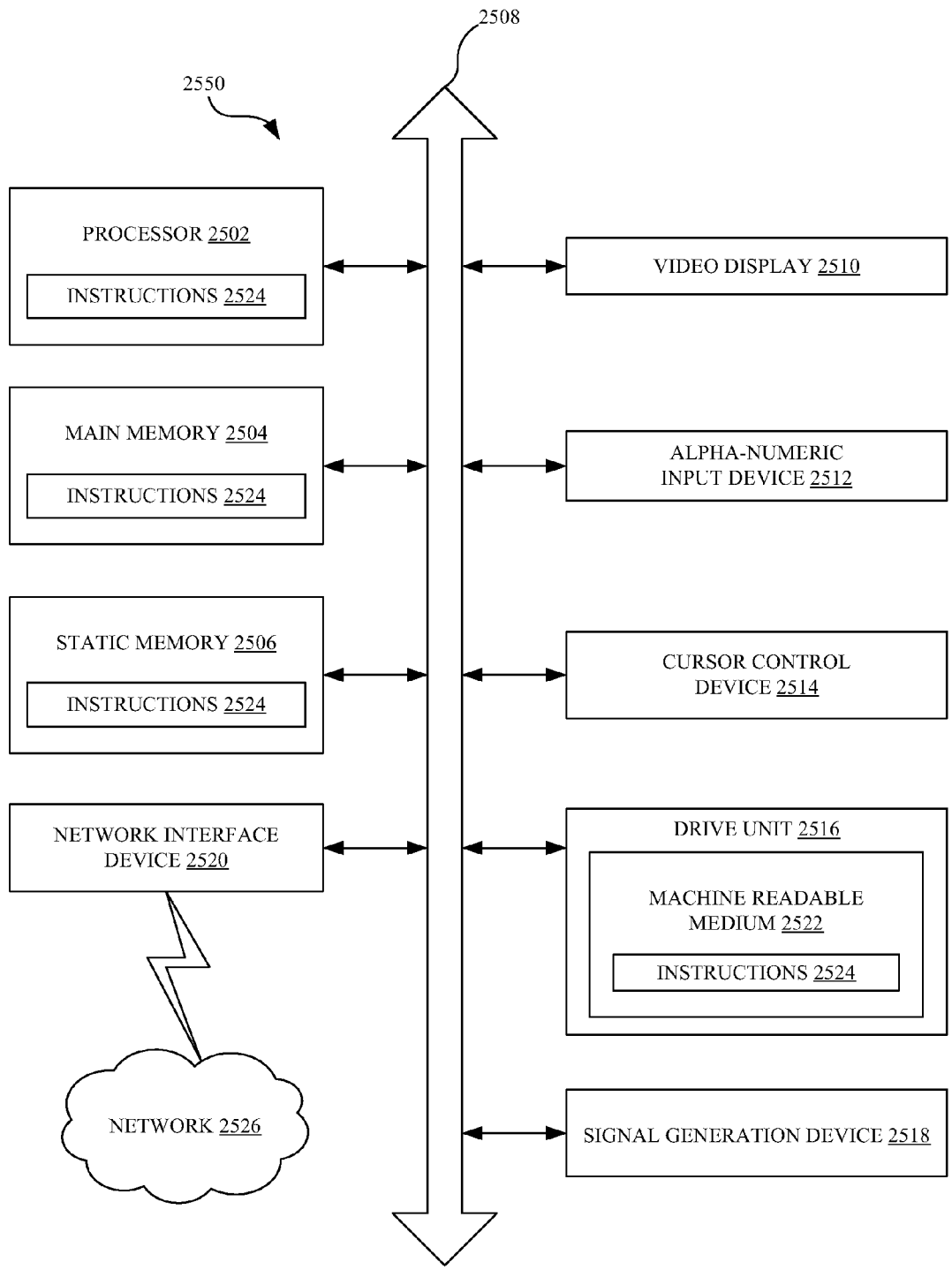
FIG. 25 is a diagrammatic representation of the data processing system of FIG. 19 capable of processing a set of instructions to perform any one or more of methodologies described herein, according to one embodiment.

FIG. 25 is a diagrammatic representation of the data processing system 1014 of FIG. 19 capable of processing (e.g., to initiate, communicate, etc.) a set of instructions to perform any one or more of methodologies described herein, according to one embodiment. In various embodiments, the data processing system 1914 operates as a Stand alone device and/or may be connected (e.g., networked through the network 1900) to other machines. In a network deployment, the data processing system 1914 may operate as a workstation (e.g., to provide a graphic user interface) which connects to the application server 1906 and the backup server 1902 of FIG. 19. The data processing system 1914 may be any one or any collection of a personal computer (PC), a tablet PC, a set-top box (STB), a personal digital assistant (PDA), a cellular telephone, a web appliance, a network router, a switch and/or a bridge, an embedded system, and/or any machine capable of executing a set of instructions (sequential and/or otherwise) that specify actions to be taken by the machine.

One example of the data processing system 1914 may include a processor 2502 (e.g., a central processing unit (CPU) or the CPU and a graphics processing unit (GPU)), a main memory 2504, and a static memory 2506, which communicate to each other via a bus 2508. The data processing system 1914 may further include a video display unit 2510 (e.g., a liquid crystal display (LCD) and/or a cathode ray tube (CRT)), an alpha-numeric input device 2512 (e.g., a keyboard), a cursor control device 2514 (e.g., a mouse), a drive unit 2516, a signal generation device 2518 (e.g., a speaker), and a network interface device 2520.

The drive unit 2516 may include a machine-readable medium 2524 on which is stored one or more sets of instructions (e.g., instructions 2522) embodying any one or more of the methodologies and/or functions described herein. The instruction 2522 may also reside, completely and/or at least partially, within the main memory 2504 and/or within the processor 2502 during the execution thereof by the data processing system 1914, wherein the main memory 2504 and the processor 2502 may also constitute machine readable media.

The instruction 2522 may further be transmitted and/or received over the network 1900 via the network interface device 2520. While the machine-readable medium 2524 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" should also be taken to include any medium that is capable of storing, encoding, and/or carrying a set of instructions for execution by the machine and that causes the machine to perform any one or more of the methodologies of the various embodiments. The "machine-readable medium" shall accordingly be taken to include, but not limited to, solid-state memories, optical and magnetic media, and carrier wave signals.

Figure 26:
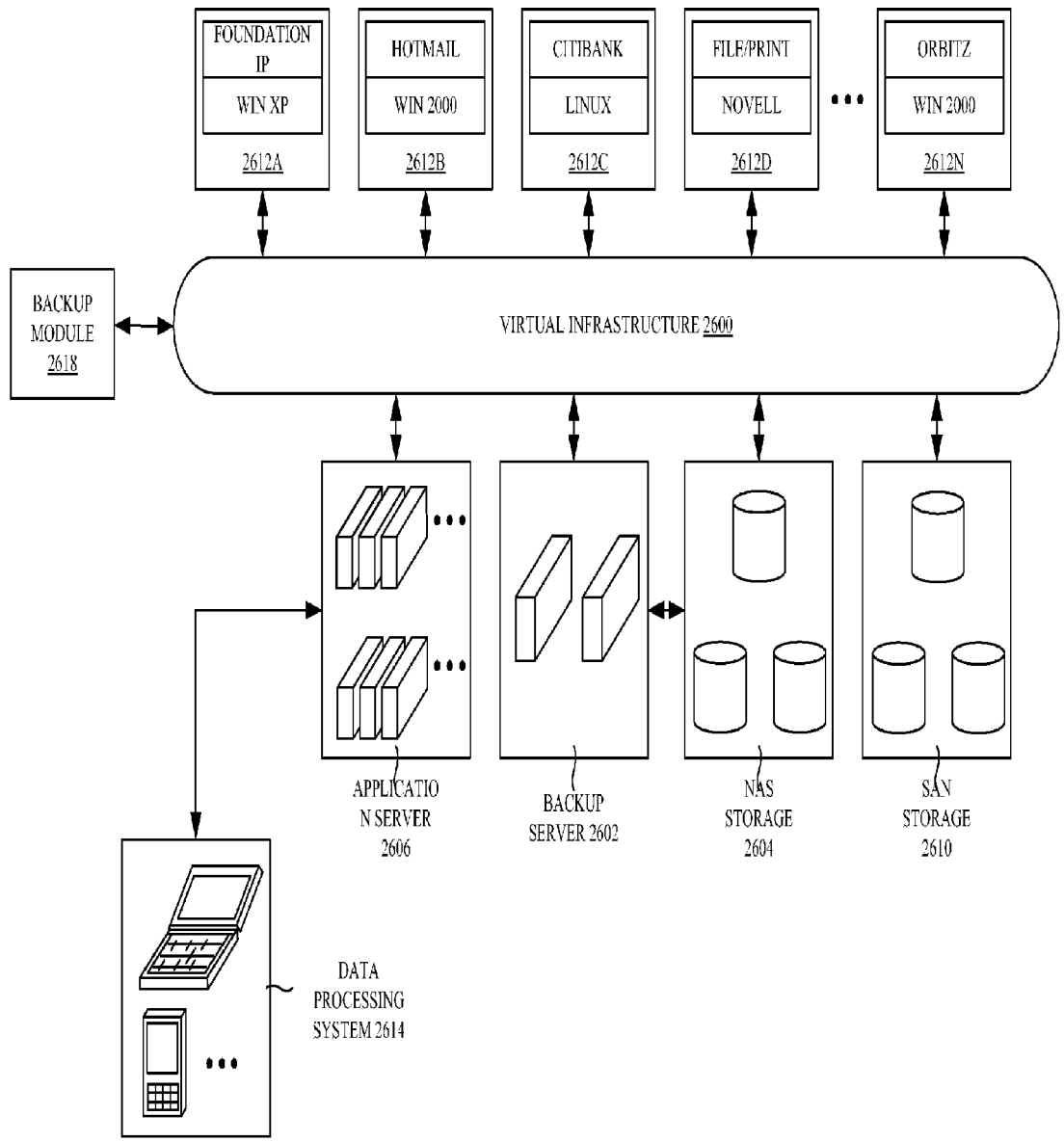
FIG. 26 is a conceptual diagram of a virtual infrastructure which allows the application server and the backup server an access to a virtual machine, according to one embodiment.

FIG. 26 is a conceptual diagram of a virtual infrastructure 2600 which allows the application server 2606 and the backup server 2602 an access to a virtual machine 2612, according to one embodiment. FIG. 26 includes the virtual infrastructure 2600, the backup server 2602, a network-attached storage (NAS) 2604, the application server 2606, a SAN storage 2610, the virtual machines 2612, a data processing system 2614, and a backup module 2618. The virtual infrastructure 2600 (e.g., a set of interconnected structural elements that may provide a framework for the entire structure using a virtual machine technology) may be created, managed, and/or purged by the backup module 2618 (e.g., which may be a software algorithm and/or a hardware algorithm).

When the virtual machine 2612 is created by the backup module 2618 mirroring (e.g., replicating) the application server 2606, the virtual machine 2612 becomes accessible regardless of a state of the application server 2606. Accordingly, the virtual machine 2612 may be available to retrieve, recover, restore, and/or delete data in spite of an unavailability (e.g., due to a failure and/or removal) of the application server 2606 which participated in backing up the data at an earlier point in time. The backup module 2618 may also be used to manage the virtual infrastructure 2600 through providing an access to the virtual machine 2612 when the access is requested (e.g., processed) by the application server 2606.

In one example embodiment, a request for the access may be communicated (e.g., initiated, triggered, etc.) from the data processing system 2614 when a user logs on to the application server 2612C to use an application (e.g., a Citibank® online bank) to withdraw some money from the user's account. Upon being requested by the user of the withdrawal, information about the withdrawal (e.g., and/or other transactions) may be captured at the application server 2606 and/or the backup server 2602, communicated, and/or backed up to the NAS 2604 (e.g., which may enable multiple computers to share a same storage space at once minimizing overhead by centrally managing hard disks) using the virtual machine 2612 to have an access to attributes (e.g., an application and/or an operating system) of the virtual machine 2612C which corresponds to the attributes of the application server 2606. A capture of the information about the withdrawal (e.g., and/or other transactions) may also take place at an array controller of the SAN storage 2610, communicated, and/or backed up to the NAS 2604.

In another example embodiment, a recent attribute and/or data of the application server 2606 may be recovered using the virtual machine 2612C when the application server 2606 fails (e.g., thereby downing the Citibank® online bank). Here, the backup module 2618 may automatically initiate a recovery of the recent attributes (e.g., the Citibank® online bank and/or Linux® operating system) and/or data (e.g., the user's account information). In addition, other modification operations (e.g., a retrieval operation, a restore operation, and/or a delete operation) associated with the attributes of the application server 2606 and data processed through the application server 2606 may be performed using the virtual machine 2612.

Figure 27:
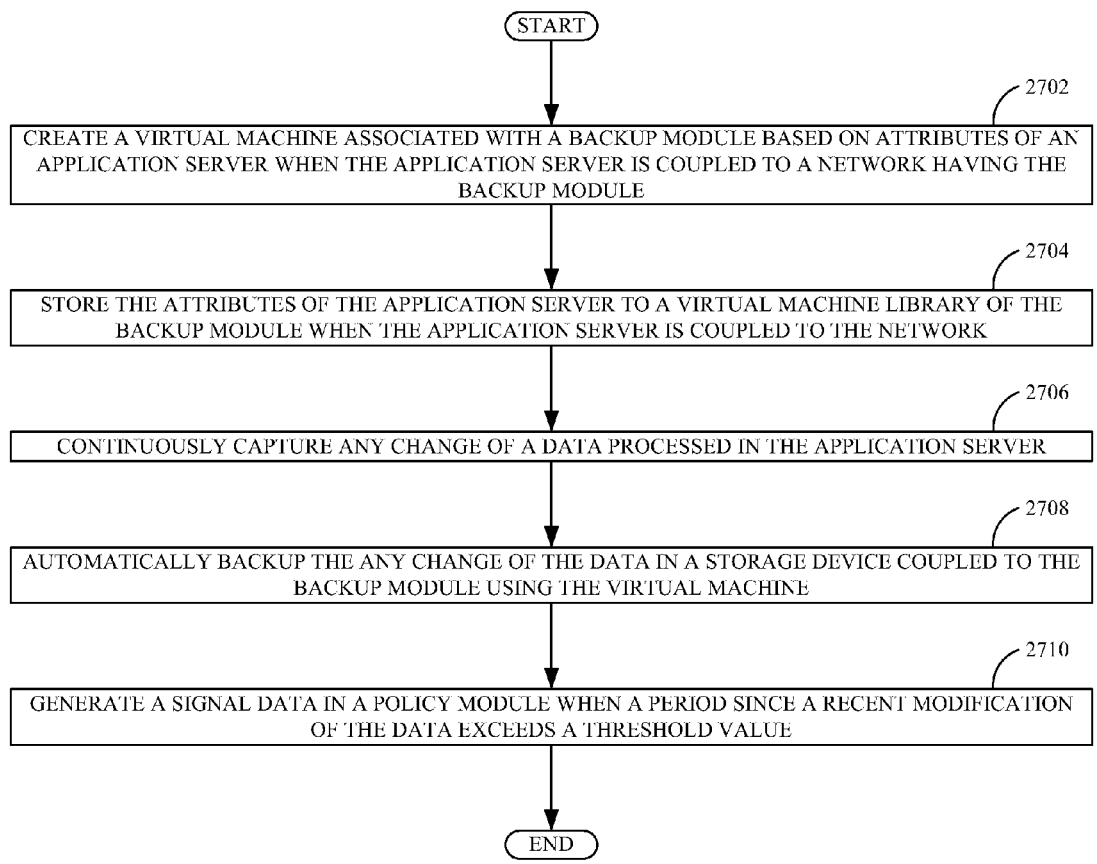
FIG. 27 is a process flow of backing up any change of data using a virtual machine associated with the backup module of FIG. 19, according to one embodiment.

FIG. 27 is a process flow of backing up any change of data using a virtual machine associated with the backup module 1918 of FIG. 19, according to one embodiment. In operation 2702, a virtual machine associated with a backup module (e.g., the backup module 1918 of FIG. 19) may be created based on attributes of an application server (e.g., the application server 1906) when the application server is connected to a network (e.g., the network 1900) having the backup module. The attributes (e.g., an application, an operating system, a file system, etc.) of the application server may be stored in operation 2704 to a virtual machine library (e.g., the VM library module 2006 of FIG. 20) of the backup module when the application server is connected to the network (e.g., the network 1900 of FIG. 19).

In operation 2706, any change of a data may be continuously captured (e.g., acquired) in the application server (e.g., the backup server 1902 and/or the controller 1912 of the SAN storage 1910). Then in operation 2708, the any change of the data may be automatically backed up (e.g., copied) in a storage device (e.g., the backup server storage 1904 of FIG. 19) coupled to the backup module using the virtual machine and/or directly through the backup device. Next in operation 2710, a signal data (e.g., informing a possible obsolescence of the data) may be generated in a policy module (e.g., the policy module 2108 of FIG. 21) when a period since a recent modification of the data exceeds a threshold value.

Figure 28:
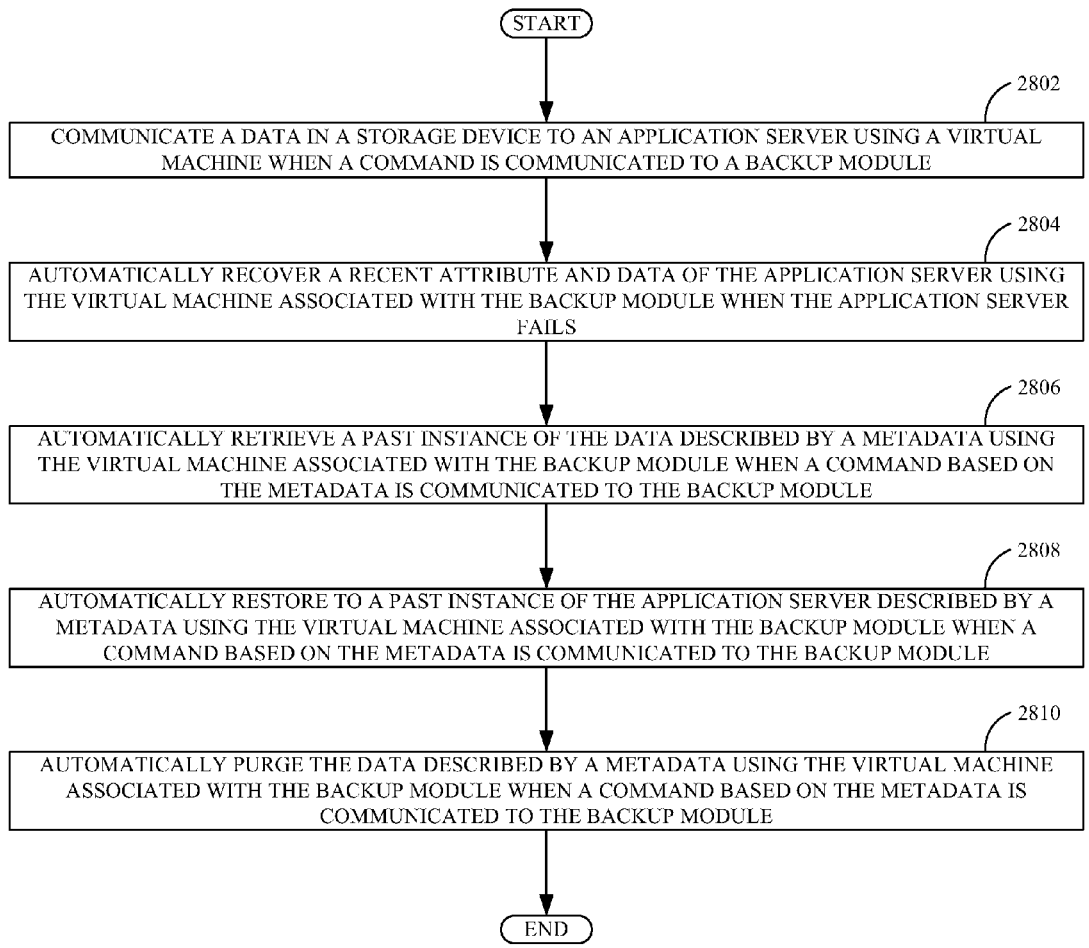
FIG. 28 is a process flow of modifying data and attributes associated with the application server of FIG. 19 using a virtual machine associated with the backup module, according to one embodiment.

FIG. 28 is a process flow of modifying data and attributes associated with the application server 1906 of FIG. 19 using a virtual machine associated with the backup module 1918 of FIG. 19, according to one embodiment. In operation 2802, a data in a storage device may be communicated to an application server (e.g., the application server 1906 of FIG. 19) using a virtual machine when a command (e.g., to retrieve, recover, restore, and/or delete) is communicated to a backup module (e.g., the backup module 1918). A recent attribute (e.g., an application, an operating system, a file system, etc.) and data of the application server may be automatically recovered in operation 2804 using the virtual machine associated with the backup module when the application server fails.

Then in operation 2806 a past instance of the data described by a meta-data (e.g., of the data targeted for a retrieval operation) may be automatically retrieved using the virtual machine associated with the backup module when a command based on the metadata is communicated to the backup module. In operation 2808, a past instance of the application server described by a meta-data (e.g., describing the application server 1906 and a time stamp of the past instance) may be automatically restored (e.g., to the application server 1906 of FIG. 19) using the virtual machine associated with the backup module when a command based on the meta-data is communicated to the backup module. The data described by the meta-data (e.g., describing type of file, topic, author, and/or similar meta-data) may be automatically purged (e.g., deleted) in operation 2810 using the virtual machine associated with the backup module when a command based on the meta-data is communicated to the backup module.

Although the present embodiments have been described with reference to specific example embodiments, it will be evident that various modifications and changes may be made to these embodiments without departing from the broader spirit and scope of the various embodiments. For example, the capture module 1916 and the backup module 1918 of FIG. 19, the access module 2002, the VM module 2804, the VM library module 2006, the journal module 2008, and the modification module 2010 of FIG. 20, the selector module 2102, the VM creator module 2104, the VM access module 2106, and the policy module 2108 of FIG. 21, the retrieval module 2302, the restore module 2304, the DR module 2306, and the delete module 2308 of FIG. 23, described herein may be enabled and operated using hardware circuitry (e.g., CMOS based logic circuitry), firmware, software and/or any combination of hardware, firmware, and/or software (e.g., embodied in a machine readable medium).

A method and system of recovery point data view shift through a direction agnostic roll algorithm is disclosed. In the following description, for the purposes of explanation, numerous specific details are set forth in order to provide a thorough understanding of the various embodiments. It will be evident, however to one skilled in the art that the various embodiments may be practiced without these specific details.

Figure 31:
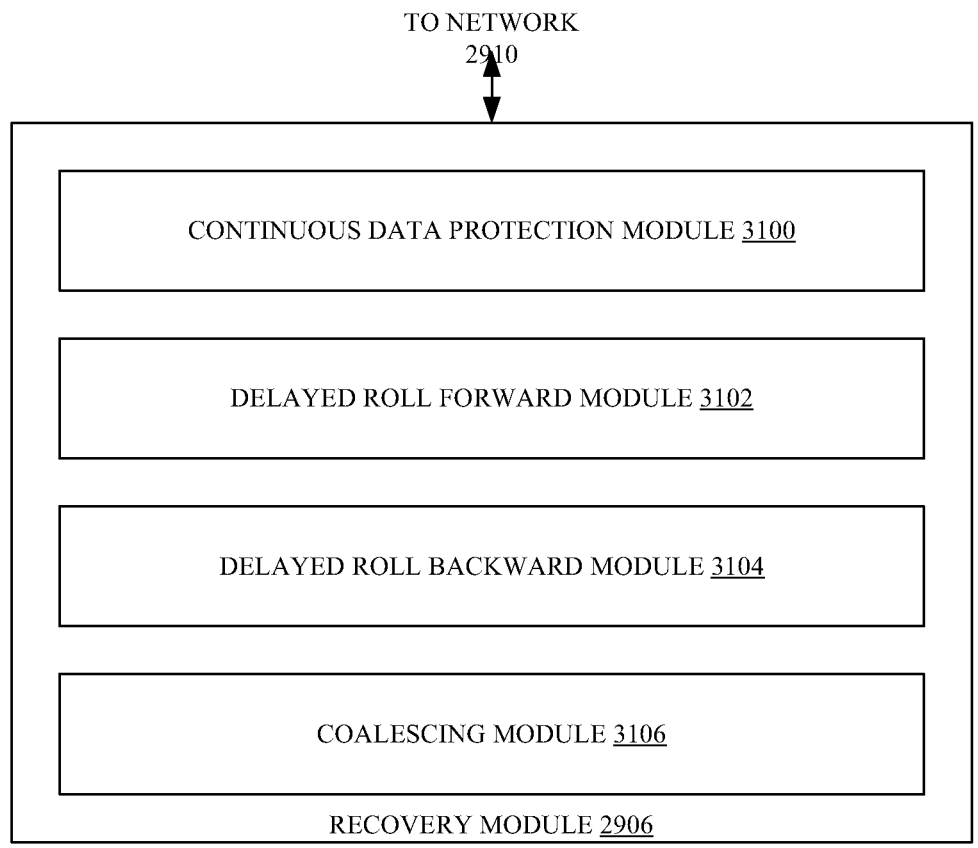
FIG. 31 is an exploded view of the recovery module of FIG. 29 having a continuous data protection module, a delayed roll forward module, a delayed roll backward module, and/or a coalescing module, according to one embodiment.

In an example embodiment, a data view is formed (e.g., formed by a virtualization module 2904 of FIG. 29) around a recovery point (e.g., as specified by an events module 2908 of FIG. 29), and the data view is shifted (e.g., shifted by a recovery module 2906 of FIG. 29) around the recovery point through a direction-agnostic roll algorithm that uses at least one of a roll-forward algorithm (e.g., a roll-forward algorithm of a delayed roll forward module 3102 of FIG. 31) to shift the data view to a time after the recovery and a roll-backward algorithm (e.g., a roll backward algorithm of a delayed roll backward module 3104 of FIG. 31) to shift the data view to a time before the recovery point.

Figure 32:
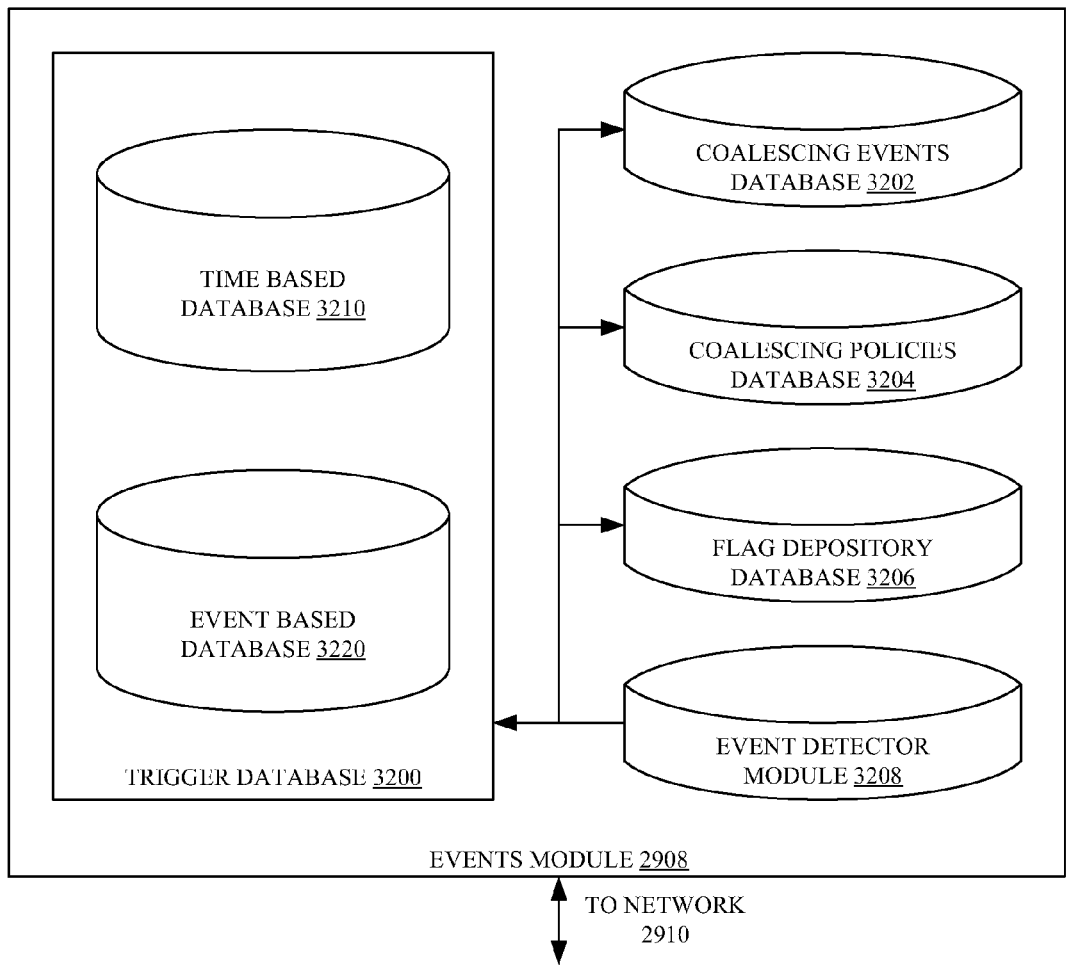
FIG. 32 is an exploded view of the events module of FIG. 29 having a trigger database having a time based database and/or a event based database, a coalescing events database, a coalescing policies database, a flag depository database, and/ or an event detector module, according to one embodiment.

In an additional example embodiment, a recovery snapshot is generated (e.g., generated by a virtualization module 2904 of FIG. 29) at a predetermined interval (e.g., as specified by an events module 2908 of FIG. 32) to retain an ability to position forward and backward when a delayed roll back algorithm (e.g., a delayed roll back algorithm of a delayed roll backward module 3104 of FIG. 31) is applied, and a virtual view may be created (e.g., created by the virtualization module 2904 of FIG. 30) using an algorithm (e.g., a continuous disaster recovery algorithm of a continuous data protection module 3100 of FIG. 31) tied to an original data, a change log data, and a consistency data related to an event (e.g., as specified by the events module 2908 of FIG. 32).

In a further example embodiment, a network having a virtualization module (e.g., a virtualization module 2904 of FIG. 30) forms a data view around a recovery point (e.g., as specified by an events module 2908 of FIG. 32), a recovery module (e.g., a recovery module 2906 of FIG. 31) generates a recovery snapshot having an ability to position forward and/or backward from the recovery point when a rolling algorithm (e.g., a rolling algorithm of a delayed roll forward module 3102 and/or a delayed roll backward module 3104 of FIG. 31) is applied, and an events module (e.g., the events module 2908 of FIG. 32) to generate a coalesce policy (e.g., a coalesce policy in a coalescing policies database 3204 of FIG. 32) around the recovery point (e.g., as specified by the events module 2908 of FIG. 32) to reduce a storage requirement.

Figure 36:
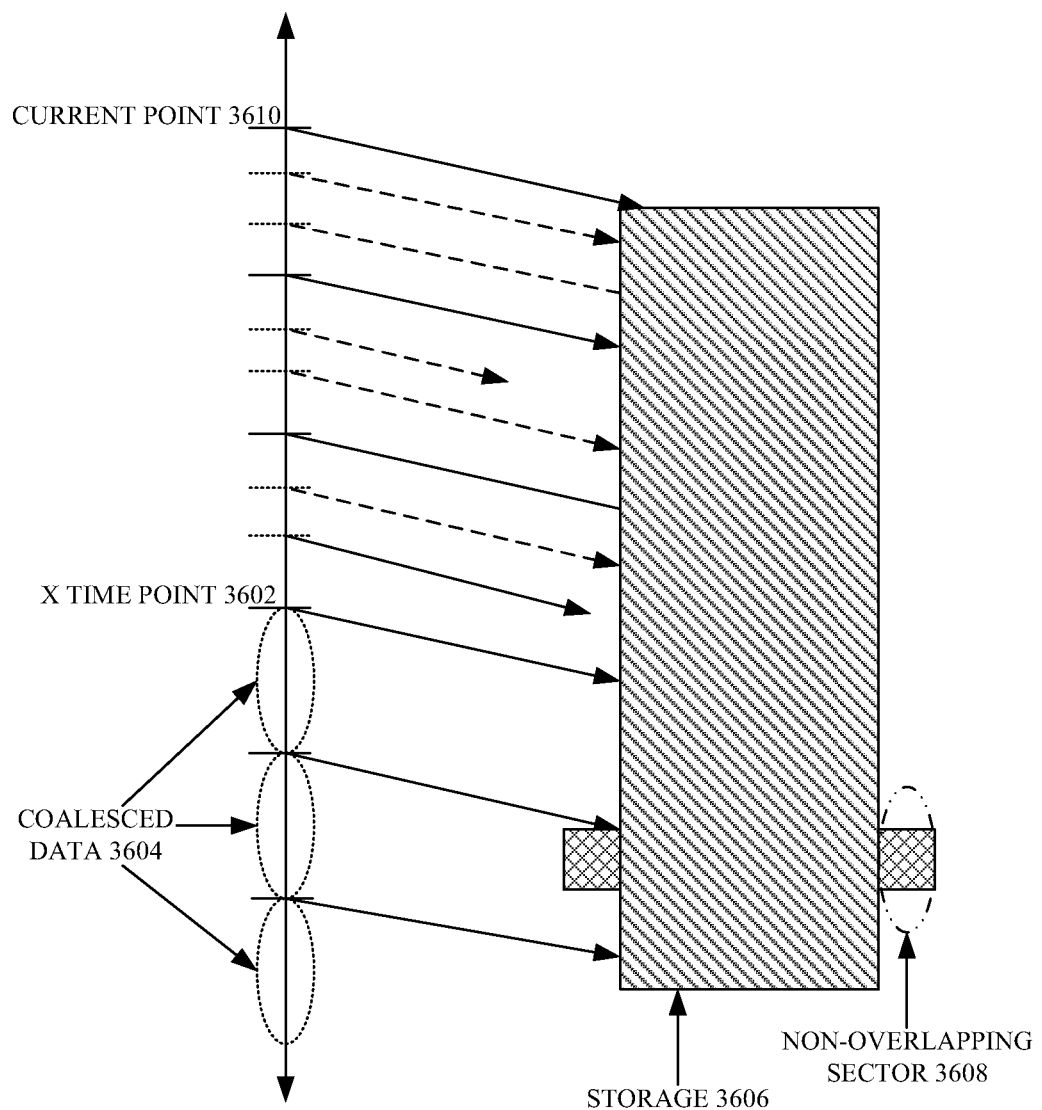
FIG. 36 is a graphical view of a coalesce process, according to one embodiment.

In a further embodiment, a method includes determining a temporal window based on at least one of a user data and an automatically generated data, coalescing data between events prior to the temporal window, and capturing data between events after the temporal window (e.g., as illustrated in FIG. 36). The coalescing data between events prior to the temporal window may be determined by a set of overlapping operations to a data set, wherein certain operations have non-overlapping sectors which are not coalesced.

Figure 29:
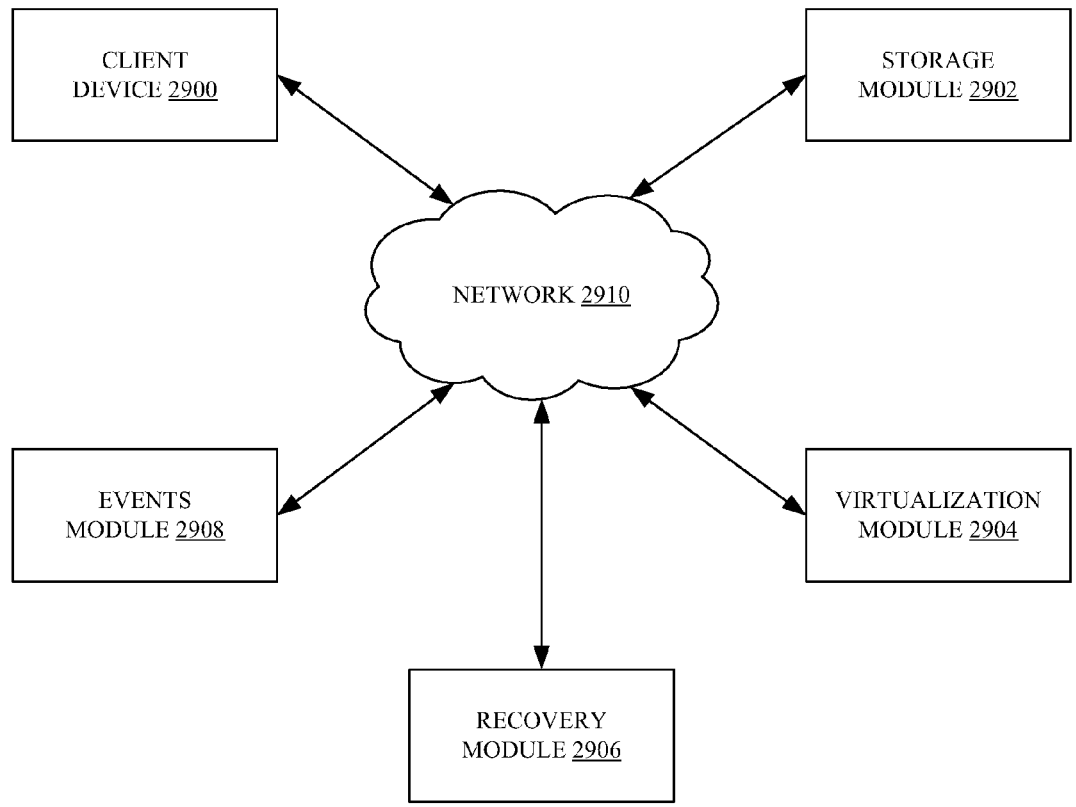
FIG. 29 is a system view of a virtualization module, a recovery module, that communicates with a client device, an events module, and/or a storage module through a network, according to one embodiment.

FIG. 29 is a system view of a virtualization module 2904, a recovery module 2906, that communicates with a client device 2900, an events module 2908, and/or a storage module 2902 through a network 2910, according to one embodiment.

A client device (e.g., the client device 2900) may be an end user device (e.g., a customer interface, a system administrator control device, and/or a technical support device, etc.). A storage module (e.g., the storage module 2902) may be a volatile storage (e.g., DRAM, RDRAM, and/or SRAM, etc.) and/or a non-volatile storage (e.g., hard disk drive, RAID array, SCSI drive, SATA drive, magnetic tape, CD, and/or DVD, etc.). A network (e.g., the network 2910) may be a LAN, WAN, and/or an Internet. A virtualization module (e.g., the virtualization module 2904) is best understood with reference to FIG. 30, as will later be described. The recovery module 2906 may also be best understood with reference to FIG. 31, and the events module 2908 may best be understood with reference to FIG. 32.

In another embodiment, the client device 2900 may generate a data operation (e.g., a data storage, a data backup, a data retrieval, a data modification, a data transfer, etc.) request through the network 2910 (e.g., LAN, WAN, and/or Internet, etc.). For example, the client device 2900 may define an event (e.g., midnight, every 5 minutes, system crash, configuration change, failed log-in, and/or as indicated by the events module 2908 of FIG. 29, etc.) through communicating with the events module 2908. The client device 2900 may also generate a request for backup via communication with the recovery module 2906. A data backed up by the recovery module 2906 may be stored in the storage module 2902.

The recovery module 2906 may also provide a mechanism to continuously backup data as well as a means to access data points relative to a reference data point.

The reference data point may be associated with an event (e.g., midnight, every 5 minutes, system crash, configuration change, failed log-in, and/or as indicated by the events module 2908 of FIG. 29, etc.) stored in the events module 2908. Before a data point associated with the event (e.g., midnight, every 5 minutes, system crash, configuration change, failed log-in, and/or as indicated by the events module 2908 of FIG. 29, etc.) is accessed, the virtualization module 2904 may generate a data view (e.g., a virtual view) such that the original data may not need to be modified.

An example embodiment provides methods and systems to form (e.g., formed by the virtualization module 2906) a data view (e.g., a virtual view, an original view, etc.) around a recovery point (e.g., midnight, every 5 minutes, system crash, configuration change, failed log-in, and/or as specified in the events module 2908 etc.) and shift the data view (e.g., a virtual view, an actual view, etc.) around the recovery point through a direction-agnostic roll algorithm that uses a roll-forward algorithm (e.g., to roll to a data state that occurred later in time than the reference data, etc.) to shift the data view (e.g., a virtual view, an actual view, etc.) to a time after the recovery point (e.g., midnight, every 5 minutes, system crash, configuration change, failed log-in, and/or as specified in the events module 2908 etc.) and/or a roll-backward algorithm (e.g., to roll to the data state that occurred earlier in time than the reference data, etc.) to shift the data view (e.g., a virtual view, an original view, etc.) to a time before the recover point (e.g., midnight, every 5 minutes, system crash, configuration change, failed log-in, and/or as specified in the events module 2908 etc.).

Another example embodiment provides methods and systems to generate a recovery snapshot (e.g., to generate a virtual snapshot with the virtualization module 2904, etc.) at a predetermined interval (e.g., midnight, every 5 minutes, system crash, configuration change, failed log-in, and/or as indicated by the events module 2908 of FIG. 29, etc.) to retain an ability to position forward (e.g., to roll to a data state that occurred later in time than the reference data, etc.) and/or backward (e.g., to roll to the data state that occurred earlier in time than the reference data, etc.) when a delayed roll back algorithm is applied, and create a virtual view (e.g., create a virtual view using the virtualization module 2904, etc.) of the recovery snapshot using an algorithm (e.g., a continuous recovery algorithm of the recovery module 2906) tied to an original data, a change log data, and a consistency data related to an event (e.g., midnight, every 5 minutes, system crash, configuration change, failed log-in, and/or as indicated by the events module 2908 of FIG. 29, etc.).

A further example embodiment includes a virtualization module 2904 to form a data view (e.g., a virtual view, an actual view, etc.) around a recovery point (e.g., midnight, every 5 minutes, system crash, configuration change, failed log-in, and/or as specified in the events module 2908, etc.), and/or an events module 2908 to generate a coalesce policy (e.g., to retain data every 5 minutes for data that is older than 10 years, to retain data every 2 minutes for data that is less than 10 years old, etc.) around the recovery point (e.g., midnight, every 5 minutes, system crash, configuration change, failed log-in, and/or as specified in the events module 2908, etc.) to reduce a storage requirement (e.g., to decrease a storage capacity requirement of the storage module 2902). The generated coalesce policy may be used (e.g., used by the recovery module 2906) to coalesce (e.g., combine, compile, etc.) backed up data to optimize storage requirements.

Figure 30:
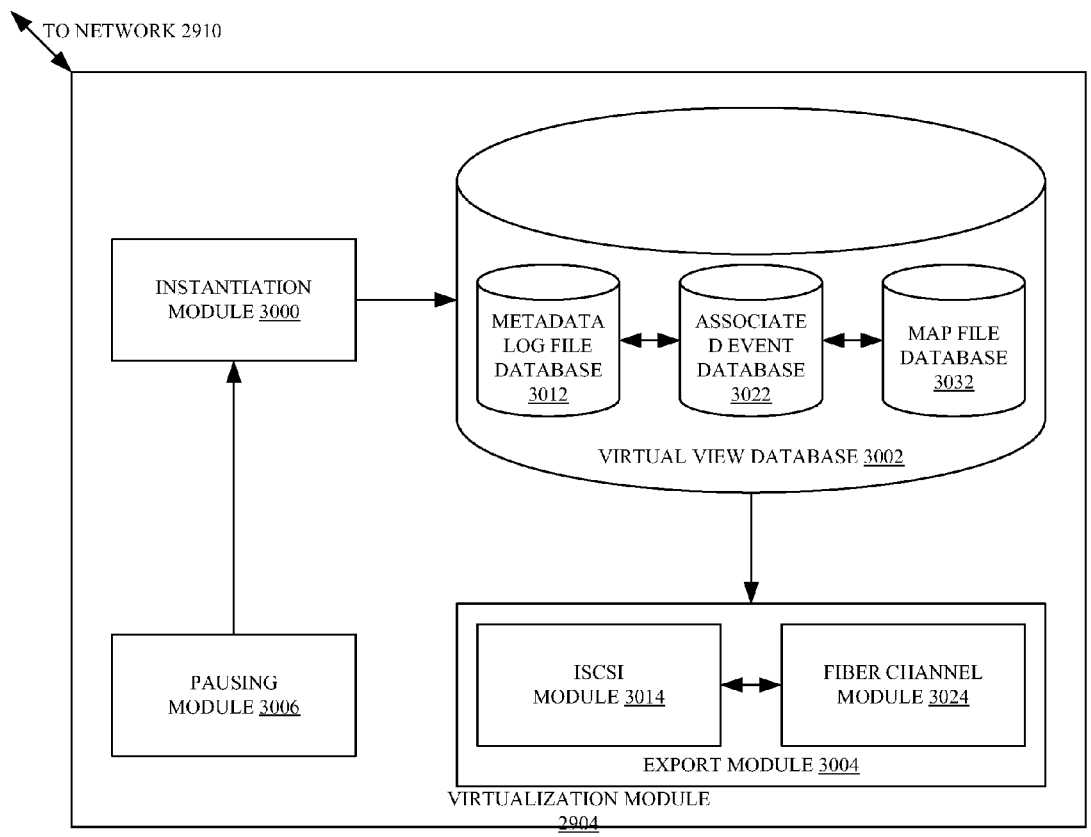
FIG. 30 is an exploded view of the virtualization view module of FIG. 29 having an instantiation module, a pausing module, a virtual view database having a metadata log file database, an associated event database, and/or a map file database, and/or an export module having an iSCSI module, and/or a fiber channel module, according to one embodiment.

FIG. 30 is an exploded view of the virtualization module 2904 of FIG. 29 having an instantiation module 3000, a pausing module 206, a virtual view database 3002 that may include a metadata log file database 3012, an associated event database 3022, and/or a map file database 3032, and/or an export module 3004 having an iSCSI module 3014, and/or a fiber channel module 3024, according to one embodiment.

The instantiation module 3000 may be a circuit and/or a piece of software code that generates a virtual view of a data state. The instantiation module 3000 may communicate with the pausing module 3006 to determine when the virtual view should be generated to ensure validity and/or accuracy. The instantiation module 3000 may also communicate the generated virtual view to the virtual view database 3002 to be stored.

According to one embodiment, the virtual view may be instantiated by an instantiation module (e.g., the instantiation module 3000) of the virtual view module 2904. The virtual view may be generated after a data operation and/or a client operation (e.g., a client operation of the client device 2900 of FIG. 29) has been suspended and/or paused (e.g., paused by the pausing module 3006) to ensure a validity and/or accuracy of the virtual view generated. After the virtual view has been generated by the instantiation module 3000, the virtual view may be stored in a database (e.g., the virtual view database 3002, etc.).

In one embodiment, a data view (e.g., a snapshot view) may be formed to prevent losing an ability to roll forward and/or backward when a delayed roll backward algorithm is applied. Any number of snapshot views may be taken. However to generate and/or to store a snapshot view may be time and/or capacity consuming. As such, a virtual view of the data may be generated (e.g., generated by the instantiation module 3000 of the virtual view module 2904 of FIG. 29) rather than making a full snapshot view of the data.

In a further embodiment, the database (e.g., the virtual view database 3002) may contain additional databases to store a meta data log file (e.g., the metadata log file database 3012), an associated event (e.g., the associated event database 3022), and/or a map file (e.g., the map file database 3032). A relevant information mapping information (e.g., a map file) of associating an original data to the data view (e.g., a virtual view, a real view, and/or a snapshot view, etc.) may be stored in the map file database 3032 of the virtual view database 3002. A log file (e.g., a meta data log file) documenting change (e.g., time stamp of changes, location of changes, time offset of changes, etc.) of the data view (e.g., a virtual view, a real view, and/or a snapshot view, etc.) may be stored in the metadata log file database 3012. The log file may also be stored as a normal file on a file system using a relational database (e.g., an SQL database).

In yet another embodiment, the virtual view database 3002 may communicate with the instantiation module 3000 to receive, store, and/or update a data (e.g., the metadata log file, an associated event, and/or a map file, etc.) of the virtual view to ensure that the virtual view remains updated and/or valid. The virtual view database 3002 may also transfer the virtual view to the export module 3004 having an iSCSI interface (e.g., an iSCSI interface of the iSCSI module 3014) and/or a fiber channel interface (e.g., a fiber channel interface of the fiber channel module 3024) to automatically transfer the virtual view to an external storage device (e.g., a storage device 2902 of FIG. 29).

For example, the data view (e.g., a virtual view, a real view, and/or a snapshot view, etc.) generated (e.g., generated by the instantiation module 3000 of the virtual view module 2904 of FIG. 29) may also be automatically and/or manually exported via an iSCSI interface (e.g., the iSCSI module 3014) and/or a fiber channel interface (e.g., the fiber channel module 3024) of an export interface (e.g., the export module 2904). As such, each virtual view may be backed up as necessary and/or used for rolling data backward and/or forward in the recovery module 2906 of FIG. 29.

In one embodiment, the virtualization module 2904 may form a data view (e.g., a virtual view, a real view, and/or a snapshot view, etc.) around a recovery point (e.g., midnight, every 5 minutes, system crash, configuration change, failed log-in, and/or as indicated by the events module 2908 of FIG. 29, etc.). The pausing module 3006 may temporarily suspend an activity of a client device (e.g., a client device 2900 of FIG. 29) before the instantiation module 3000 generates a data view (e.g., a virtual view, a real view, and/or a snapshot view, etc.). The pausing module 3006 may restart the operation of the client device (e.g., the client device of FIG. 29) after the data view (e.g., a virtual view, a real view, and/or a snapshot view, etc.) has been generated.

In another example embodiment, an event associated with a generation of the data view (e.g., a virtual view, a real view, and/or a snapshot view, etc.) may be stored in the associated event database 3022. Additionally, the data view (e.g., a virtual view, a real view, and/or a snapshot view, etc.) may be exported through the iSCSI module 3014 and/or the fiber channel module 3024 of the export module 3014.

In another embodiment, the virtualization module 2904 may form the data view (e.g., a virtual view, a real view, and/or a snapshot view, etc.) around a recovery point (e.g., midnight, every 5 minutes, system crash, configuration change, failed log-in, and/or as indicated in the events module 2908 of FIG. 29, etc.). The virtualization module 2904 may also determine that a data integrity (e.g., unaltered, unmodified, and/or not destroyed, etc.) is consistent at the recovery point by examining data and meta-data associated with the recovery point (e.g., midnight, every 5 minutes, system crash, configuration change, failed log-in, and/or as indicated in the events module 2908 of FIG. 29 etc.).

The virtualization module 2904 of FIG. 29 may maintain a data adjacent to the recovery point (e.g., midnight, every 5 minutes, system crash, configuration change, failed log-in, and/or as indicated in the events module 2908 of FIG. 29, etc.) in a log data structure.

In yet another embodiment, the creation of a virtual view may be specific to a kernel. A drive in the kernel (e.g., piece of software responsible for providing secure access to the machine's hardware to various computer programs) may create a volume object that appears to be a real volume and access requests (e.g., a read, and/or a write request, etc.) to the virtual view may be handled by a kernel space code. A retention log of the virtual view may then be referenced to complete the access requests (e.g., the read, and/or the write request, etc.). A data may be stored in a binary-tree based lookup table to optimize access speed due to a constant time lookup algorithm.

In another embodiment, the virtualization module 2904 of FIG. 29 may create a virtual view of a recovery snapshot using an algorithm tied to an original data, a change log data, and a consistency data related to an event (e.g., midnight, every 5 minutes, system crash, configuration change, failed log-in, and/or as indicated in the events module 2908 of FIG. 29, etc.). The virtualization module 2904 may also redirect the access request (e.g., the read, and/or the write request) to the original based on a meta-data information provided in the virtual view. The virtualization module 2904 may also substantially retain a timestamp data, a location of a change, and a time offset of the change as compared with the original data (e.g., originally saved data, an originally backed up data, etc.).

The virtualization module 2904 may utilize a relational database (e.g., SQL database) to process the change log data in a meta-data format (e.g., through the metadata log file database 3012), and to process other on-disk data using a binary-tree format. The virtual view may be specific to a volume object in a kernel (e.g., piece of software responsible for providing secure access to the machine's hardware to various computer programs) that imitates another volume having the original data. The virtual view may also be managed by a kernel space (e.g., piece of software responsible for providing secure access to the machine's hardware to various computer programs) that processes an access request through at least one table using a meta-data (e.g., the metadata file database 3012) created in a retention log. The virtual view may be exported as a virtual volume by the export module 3004 using the iSCSI module 3014 and/or the fiber channel module 3024 to transport to an external processing device (e.g., a computer, a PDA, and/or a storage module 2902, etc.).

Furthermore, the virtualization module 2904 may apply the change log data of the virtual view database 3002 when the virtual view is unfrozen (e.g., unfrozen by the pausing module 3006) after a user session reaches a level state. The virtual view may be unfrozen after a user session reaches a level state to be appropriated updated through modifications of the virtual view database 3002. Hence a metadata index of the metadata log file database 3012 may need to be updated continuously. A map file of the map file database 3032 may also need to be updated while the virtual view is being created (e.g., by the instantiation module 3000) and/or after it has been created. The updates and/or modifications of the map file (e.g., the map file of the map file database 3032) and/or the log file (e.g., the log file of the metadata log file database 3012) may be necessary to ensure that the virtual view maintains a relevant representation of the original data.

In a further embodiment, a series of indexes (e.g., using indexes to improve query performance) of the virtual view may be generated by the virtualization module 2904 to enable a linking to an event description (e.g., content-based description) of the virtual view rather than to an actual data in the original data. The event description of the virtual view may (e.g., stored in the associated events database 3022) may allow the series of indexes to locate the virtual views by a content located within the virtual view. The data view (e.g., a virtual view, a real view, and/or a snapshot view, etc.) may also be automatically communicated to the export module 3004 to transport the virtual view to a backup tape (e.g., magnetic tape, external hard disk drive, CD, DVD, etc.) to provide extended data retention using a lifecycle management policy. Therefore, older data may be retroactively transferred from the storage module 2902 for storage space maintenance.

FIG. 31 is an exploded view of the recovery module 2906 of FIG. 29 having a continuous data protection module 3100, a delayed roll forward module 3102, a delayed roll backward module 3104, and/or a coalescing module 3106, according to one embodiment.

The continuous protection module 3100 may provide continuous backup mechanism (e.g., recording every change made to a data) to a set of data. The continuous protection module 3100 may communicate with a storage module (e.g., a storage module 2902 of FIG. 29), a client device (e.g., the client device 2900 of FIG. 29), and/or an events module (e.g., the events module 2908 of FIG. 29) to automatically detect a data change and/or to automatically save the data change.

The delayed roll forward module 3102 may communicate with a storage module (e.g., the storage module 2902 of FIG. 29) to perform a roll forward operation on a stored data. The delay roll forward module 3102 may also communicate with an events module (e.g., the events module 2908 of FIG. 29) to associate a data state with a specified event (e.g., midnight, every 5 minutes, system crash, configuration change, failed log-in, and/or as indicated in the events module 2908 of FIG. 29 etc.).

The delayed roll backward module 3104 may communicate with a storage module (e.g., the storage module 2902 of FIG. 29) to perform a roll backward operation on a stored data. The delay roll backward module 3102 may also communicate with an events module (e.g., the events module 2908 of FIG. 29) to associate a data state with a specified event (e.g., midnight, every 5 minutes, system crash, configuration change, failed log-in, and/or as indicated in the events module 2908 of FIG. 29 etc.).

The delayed roll forward module 3102 may roll a data to a state corresponding to an event that happened later in time than an event (e.g., midnight, every 5 minutes, system crash, configuration change, failed log-in, and/or as indicated in the events module 2908 of FIG. 29, etc.) associated with a reference data. The delayed roll backward module 3104 may roll the data to a state corresponding to the event (e.g., midnight, every 5 minutes, system crash, configuration change, failed log-in, and/or as indicated in the events module 2908 of FIG. 29, etc.) that happened earlier in time than the event associated with the reference data.

The recovery module 2906 of FIG. 29 may also allow backed up data to be accessed before a recovery point (e.g., midnight, every 5 minutes, system crash, configuration change, failed log-in, and/or as indicated in the events module 2908 of FIG. 29, etc.) through the delayed roll backward module (e.g., the delayed roll backward module 3104) and/or after the certain recovery point through the delayed roll forward module (e.g., the delayed roll forward module 3102).

The recovery point may be tied to an event (e.g., midnight, every 5 minutes, system crash, configuration change, failed log-in, and/or as indicated by the events module 2908 of FIG. 29, etc.).

A coalescing module (e.g., the coalescing module 3106) may use a coalescing events and/or a coalescing policies as specified in the events module 2908 of FIG. 29 to coalesce (e.g., combine, compile, etc.) backed up data to optimize storage requirements. The coalescing module (e.g., the coalescing module 3106) may communicate with an events database (e.g., an events database of the events module 2908 of FIG. 29) to determine the event around which data should be collapsed (e.g., coalesced, combined, etc.).

In one embodiment, the delayed roll forward module 3102 and/or the delayed roll backward module 3104 may shift a data view (e.g., a virtual view, a real view, and/or a snapshot view, etc.) around the recovery point (e.g., midnight, every 5 minutes, system crash, configuration change, failed log-in, and/or as indicated by the events module 2908 of FIG. 29, etc.) through a direction-agnostic roll algorithm that uses a roll forward algorithm to shift the data view to a time after the recovery point (e.g., midnight, every 5 minutes, system crash, configuration change, failed log-in, and/or as indicated by the events module 2908 of FIG. 29, etc.) and/or a roll backward algorithm to shift the data view (e.g., a virtual view, a real view, and/or a snapshot view, etc.) to a time before the recovery point.

The recovery point (e.g., midnight, every 5 minutes, system crash, configuration change, failed log-in, and/or as indicated by the events module 2908 of FIG. 29, etc.) may be associated with an automatically generated event, a user definable event, and/or a prepackaged event. Additionally, the continuous protection module 3100 may generate a recovery snapshot at a predetermined interval (e.g., midnight, every 5 minutes, etc.) to retain an ability to position forward and/or backward when a delayed roll backward algorithm is applied.

In a next embodiment, the coalescing module 3106 may coalesce data around the recovery point (e.g., midnight, every 5 minutes, system crash, configuration change, failed log-in, and/or as indicated by the events module 2908 of FIG. 29, etc.) and other determinable recovery points at a threshold interval to reduce storage requirements. In addition, the coalescing module 3106 may retain different quantities of data around the recovery point (e.g., midnight, every 5 minutes, system crash, configuration change, failed log-in, and/or as indicated by the events module 2908 of FIG. 29, etc.) based on a programmatic methodology that considers space utilization and a data consistency associated with the time after the recover point and/or the time before the recovery point. For example, more data points may be retained for data accumulated 5 days ago whereas less data points may be retained for data accumulated 5 years ago.

FIG. 32 is an exploded view of the events module 2908 of FIG. 29 having a trigger database 3200 having a time based database 3210 and/or an event based database 3220, a coalescing events database 3202, a coalescing policies database 3204, a flag depository database 3206, and/or an event detector module 3208, according to one embodiment.

In one example embodiment, the trigger database 3200 may store any backup triggering event. The backup triggering event may be time based (e.g., stored in the time based database 3210) and/or event based (e.g., stored in the event based database 3220). The coalescing events database 3202 may communicate with a coalescing module (e.g., a coalescing module 3106 of FIG. 31) to determine an event corresponding to a data collapsing. The coalescing policies database 3204 may also communicate with the coalescing module 3106 of FIG. 31 to govern an age dependent data retaining mechanism. For example, older data may be retained with less data points. The flag depository database 3206 may communicate with the trigger database 3200, the storage database 2902 of FIG. 29, and/or the continuous data protection module 3100 of FIG. 31 to store a flag indicating a data state associated with an event as specified in the events module 2908 of FIG. 29 at which data was backed up. The event detector module 3208 may detect a user definable event and/or an automatically generated event by communicating with a client device 2900, the trigger database 3200, the coalescing events database 3202, and/or the coalescing policies database 3204. The user definable event may be communicated by a client device (e.g., the client device 2900 of FIG. 29). The events detected by the event detector module 3208 may then be stored in the trigger database 3200 and stored in the time based database 3210 if an event is time based (e.g., midnight, every 5 minutes, etc.), and stored in the event based database 3220 if the event is event based e.g., system crash, configuration change, failed log-in, and/or as indicated by the events module 2908 of FIG. 29, etc.).

In another example embodiment, the events module (e.g., the events module 2908 of FIG. 29) may also communicate with a recovery module (e.g., the recovery module 2906 of FIG. 29) to associate data points with events (e.g., midnight, every 5 minutes, system crash, configuration change, failed log-in, and/or as indicated by the events module 2908 of FIG. 29, etc.). As such the recovery module (e.g., the recovery module 2906 of FIG. 29) may perform relevant operations (e.g., a delayed roll forward of the delayed roll forward module 3102, a delayed roll backward of the delayed roll backward module 3104, and/or coalescing of the coalescing module 3106 of FIG. 31, etc.) based on an associated event.

The event detector module 3208 of the events module 2908 may also detect coalescing events defined by a user and/or automatically generated. The coalescing events may be stored in the coalescing events database 3202. In another embodiment, the events module 2908 may generate a coalescing policy (e.g., number of data points retained for different time periods, etc.) around the recovery point (e.g., midnight, every 5 minutes, system crash, configuration change, failed log-in, and/or as indicated by the events module 2908 of FIG. 29, etc.) to reduce a storage requirement. The coalescing policy may be stored in the coalescing policy database 3204.

In one embodiment, the event detector module 3208 may generate a marking data (e.g., a flag, a bookmark, etc.) at the recovery point (e.g., midnight, every 5 minutes, system crash, configuration change, failed log-in, and/or as indicated by the events module 2908 of FIG. 29, etc.) to enable the direction-agnostic roll algorithm (e.g., a roll-forward algorithm (e.g., to roll to a data state that occurred later in time than the reference data, etc.) and/or a roll-backward algorithm (e.g., to roll to the data state that occurred earlier in time than the reference data, etc.)) to operate and to reduce a recovery time objective (e.g., to minimize the time to recovery in case of system malfunction) when an algorithm is applied. The marking data (e.g., a flag, a bookmark, etc.) may be stored in the flag depository database 3206.

Figure 33:
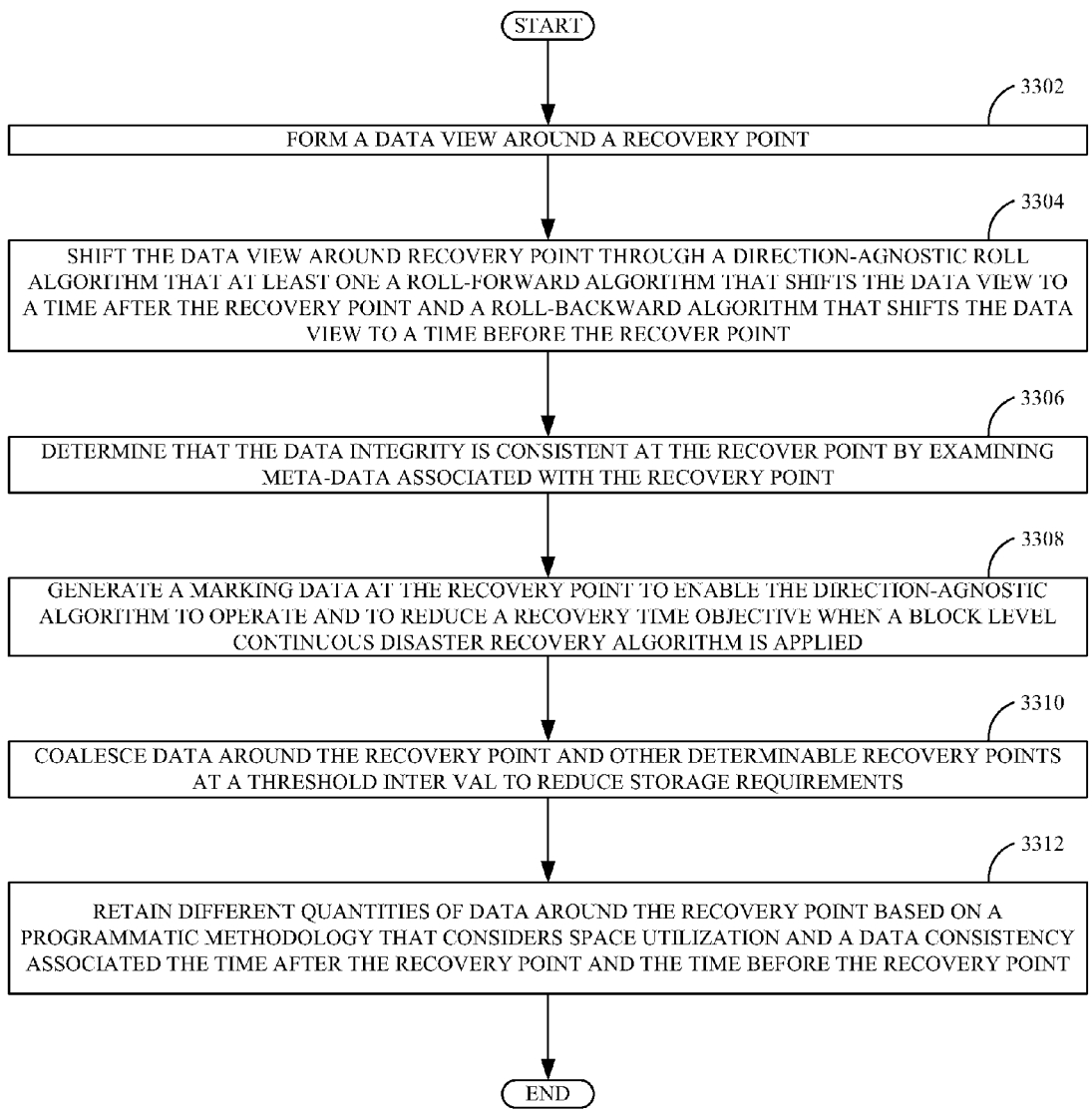
FIG. 33 is a process flow to form a data view around a recovery point, according to one embodiment.

FIG. 33 is a process flow to form a data view around a recovery point, according to one embodiment. In operation 3302, the data view (e.g., a virtual view, a real view, and/or a snapshot view, etc.) may be formed (e.g., by the virtual view module 104 of FIG. 30) around a recovery point (e.g., midnight, every 5 minutes, system crash, configuration change, failed log-in, and/or as indicated by the events module 2908 of FIG. 29, etc.). In operation 3304, the data view may be shifted (e.g., shifted by the delayed roll forward module 3102 and/or the delayed roll backward module 3104 of FIG. 31) around the recovery point (e.g., midnight, every 5 minutes, system crash, configuration change, failed log-in, and/or as indicated by the events module 2908 of FIG. 29, etc.) through a direction-agnostic roll algorithm that uses at least one of a roll-forward algorithm (e.g., to roll to a data state that occurred later in time than the reference data, etc.) to shift the data view (e.g., a virtual view, a real view, and/or a snapshot view, etc.) to a time after the recovery point (e.g., midnight, every 5 minutes, system crash, configuration change, failed log-in, and/or as indicated by the events module 2908 of FIG. 29, etc.) and a roll-backward algorithm (e.g., to roll to the data state that occurred earlier in time than the reference data, etc.) to shift the data view (e.g., a virtual view, a real view, and/or a snapshot view, etc.) to a time before the recover point (e.g., midnight, every 5 minutes, system crash, configuration change, failed log-in, and/or as indicated by the events module 2908 of FIG. 29, etc.).

In operation 3306, a data integrity may be determined to be consistent (e.g., complete, valid, etc.) at the recovery point e.g., midnight, every 5 minutes, system crash, configuration change, failed log-in, and/or as indicated by the events module 2908 of FIG. 29, etc.) by examining data and meta-data associated with the recovery point. In operation 3308, a marking data (e.g., a flag, a bookmark, etc.) may be generated (e.g., generated by the recovery module 2906 of FIG. 29) at the recovery point (e.g., midnight, every 5 minutes, system crash, configuration change, failed log-in, and/or as indicated by the events module 2908 of FIG. 29, etc.) to enable the direction-agnostic roll algorithm (e.g., a roll forward algorithm of the delayed roll forward module 3102 of FIG. 31, and/or a roll backward algorithm of the delayed roll backward module 3104 of FIG. 31, etc.) to operate and to reduce a recovery time objective (e.g., a time required to recover from a system failure, etc.) when an algorithm is applied.

In operation 3310, data may be coalesced (e.g., coalesced by the coalescing module 3106 of FIG. 31) around the recovery point (e.g., midnight, every 5 minutes, system crash, configuration change, failed log-in, and/or as indicated by the events module 2908 of FIG. 29, etc.) and other determinable recovery points at a threshold interval to reduce storage requirements. In operation 3312, differing quantities of data may be retained around the recovery point (e.g., midnight, every 5 minutes, system crash, configuration change, failed log-in, and/or as indicated by the events module 2908 of FIG. 29, etc.) based on a programmatic methodology that considers space utilization and a data consistency associated with the time after the recovery point (e.g., midnight, every 5 minutes, system crash, configuration change, failed log-in, and/or as indicated by the events module 2908 of FIG. 29, etc.) and the time before the recovery point.

Figure 34:
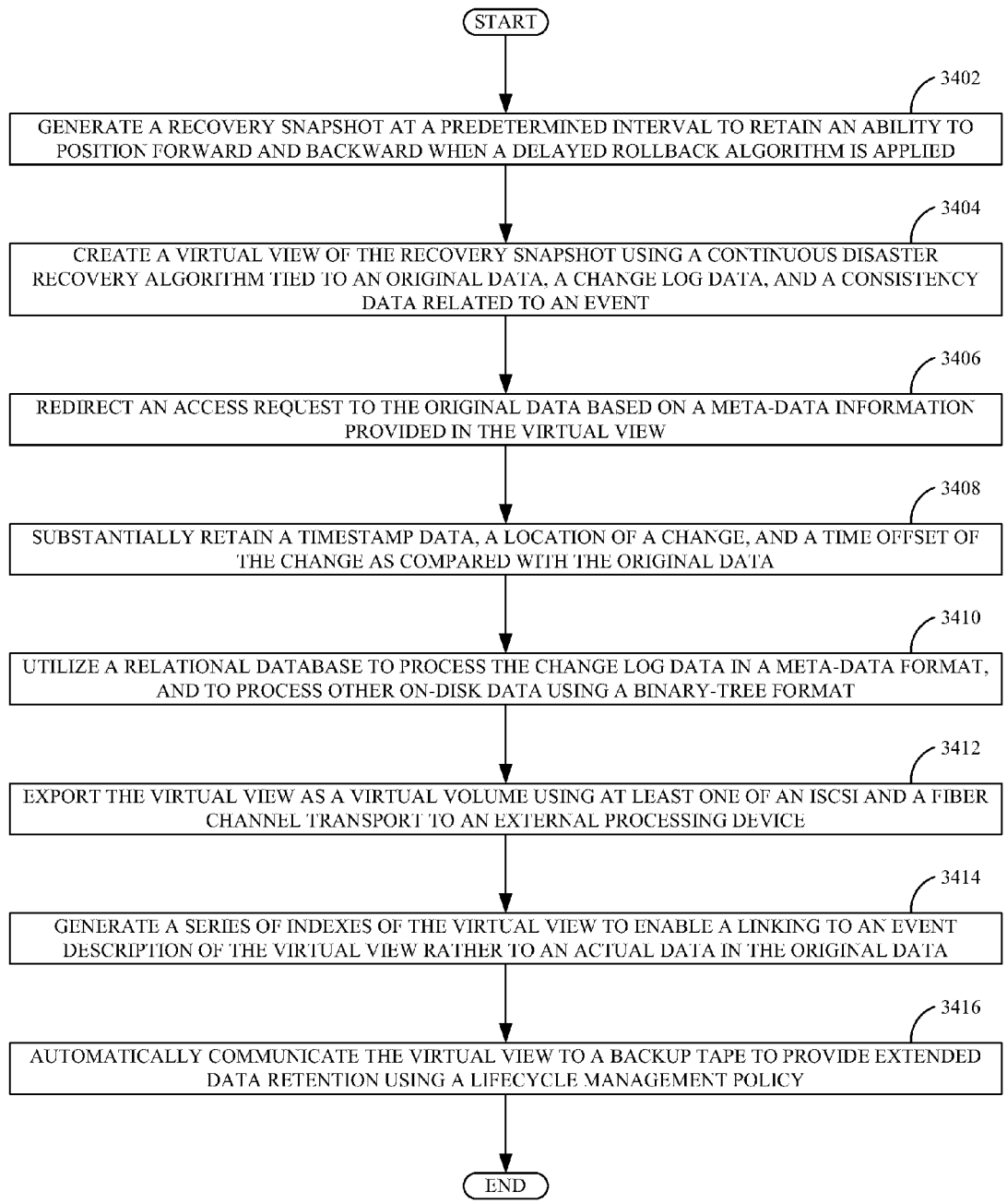
FIG. 34 is a process flow to generate a recovery snapshot at a predetermined interval to retain an ability to position forward and backward when a delayed roll back algorithm is applied, according to one embodiment.

FIG. 34 is a process flow to generate a recovery snapshot at a predetermined interval to retain an ability to position forward and backward when a delayed roll back algorithm (e.g., the delayed roll back algorithm of the delayed roll backward module 3104 of FIG. 31) is applied, according to one embodiment.

In operation 3402, a recovery snapshot may be generated at a predetermined interval (e.g., midnight, every 5 minutes, etc.) to retain an ability to position forward and backward when a delayed roll back algorithm is applied. In operation 3404, a virtual view of the recovery snapshot may be created using an algorithm (e.g., the continuous disaster recovery algorithm of the continuous data protection module 3100 of FIG. 31) tied to an original data, a change log data, and a consistency data related to an event (e.g., midnight, every 5 minutes, system crash, configuration change, failed log-in, and/or as indicated by the events module 2908 of FIG. 29, etc.). In operation 3406, an access request to the original data may be redirected based on a meta-data information provided in the virtual view. In operation 3408, a timestamp data, a location of a change, and a time offset of the change as compared with the original data may be substantially retained.

In operation 3410, a relational database (e.g., SQL database) may be utilized to process the change log data in a meta-data format (e.g., the change log data of a metadata log file database 3012 of FIG. 30), and to process other on-disk data using a binary-tree format. In operation 3412, the virtual view (e.g., the virtual view stored in the virtual view database 3002 of FIG. 30) may be exported as a virtual volume using at least one of an iSCSI (e.g., the iSCSI module 3014 of FIG. 30) and a fiber channel (e.g., the fiber channel module 3024 of FIG. 30) transport to an external processing device. In operation 3414, a series of indexes of the virtual view may be generated (e.g., the virtual view generated by the instantiation module 3000 of FIG. 30) to enable a linking to an event description (e.g., midnight, every 5 minutes, system crash, configuration change, failed log-in, and/or as indicated by the events module 2908 of FIG. 29, etc.) of the virtual view rather than to an actual data in the original data.

In operation 3416, the virtual view may be automatically communicated (e.g., communicated by the export module 3004 of FIG. 30) to a backup tape (e.g., through an iSCSI interface (e.g., the iSCSI module 3014) and/or a fiber channel interface (e.g., the fiber channel module 3024) of FIG. 30) to provide extended data retention using a lifecycle management policy.

Figure 35:
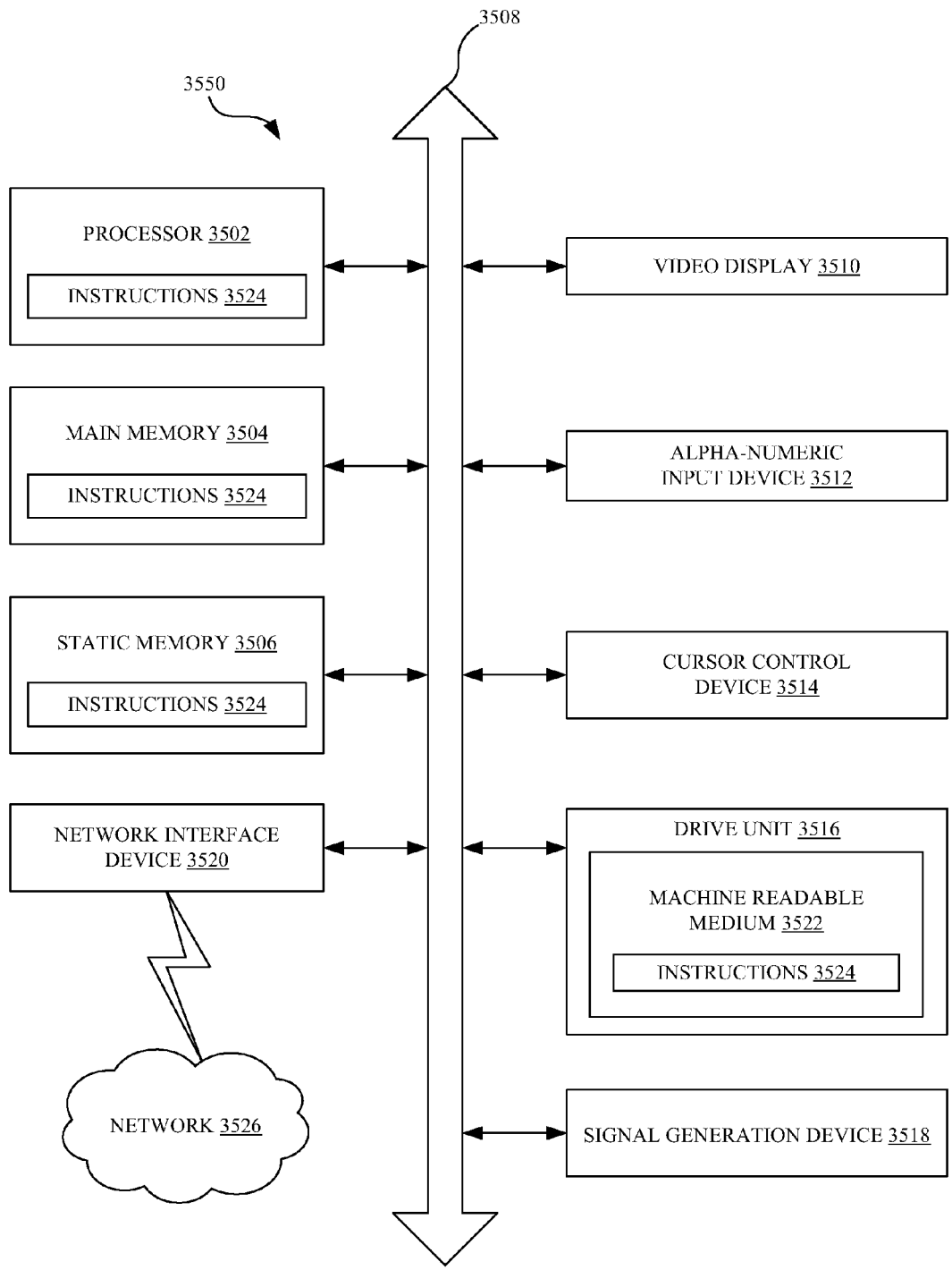
FIG. 35 is a diagrammatic representation of a machine in the form of a data processing system within which a set of instructions, for causing the machine to perform any one or more of the methodologies discussed herein, may be executed, according to one embodiment.

FIG. 35 shows a diagrammatic representation of a machine in the example form of a computer system 3550 within which a set of instructions, for causing the machine to perform any one or more of the methodologies discussed herein, may be executed. In various embodiments, the machine operates as a standalone device and/or may be connected (e.g., networked) to other machines. In a networked deployment, the machine may operate in the capacity of a server and/or a client machine in server-client network environment, and/or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch and/or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 3550 includes a processor 3502 (e.g., a central processing unit (CPU) a graphics processing unit (GPU) and/or both), a main memory 3504 and a static memory 3507, which communicate with each other via a bus 3508. The computer system 3550 may further include a video display unit 3510 (e.g., a liquid crystal display (LCD) and/or a cathode ray tube (CRT)). The computer system 3550 also includes an alphanumeric input device 3512 (e.g., a keyboard), a cursor control device 3514 (e.g., a mouse), a disk drive unit 3517, a signal generation device 3518 (e.g., a speaker) and a network interface device 3520.

The disk drive unit 3517 includes a machine-readable medium 3522 on which is stored one or more sets of instructions (e.g., software 3524) embodying any one or more of the methodologies and/or functions described herein. The software 3524 may also reside, completely and/or at least partially, within the main memory 3504 and/or within the processor 3502 during execution thereof by the computer system 3550, the main memory 3504 and the processor 3502 also constituting machine-readable media.

The software 3524 may further be transmitted and/or received over a network 3526 via the network interface device 3520. While the machine-readable medium 3522 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and carrier wave signals.

FIG. 36 is a graphical view of a coalesce process, according to one embodiment. Particularly, FIG. 36 illustrates a current point 3600 (e.g., a current time), a x-time point 3602, a coalesced data 3604, a storage 3606, and a non-overlapping sectors 3608. The current point 3600 may be the current day, time, and or window in the current temporal period. The x-time point 3602 may be a point in time in the past that is automatically determined and/or provided by a user.

The coalesced data 3604 may be a data that has been coalesced before the x-time point 3602. The storage 3606 may be a storage area of coalesced data. The non-overlapping sectors 3608 may be data that is outside the coalesce data blocks (e.g., data blocks that are not in a window of blocks that are repeatedly overwritten between events). The darker lines in FIG. 36 may represent a set of events at which data is backed up, and lighter lines (e.g., between the current point 3608 and the x-time point 3602) may be intermediate backup points that are coalesced after the x-time point.

For example, the period between the current point 3600 and the x-time point 3602 may be a temporal window based on at least one of a user data and an automatically generated data. Data between events prior to the temporal window (e.g., before the x-time point 3602 of FIG. 36) may be coalesced. In addition, data between events after the temporal window may be captured (e.g., as illustrated by the lighter lines after the x-point 3602 in FIG. 36). The coalescing data between events prior to the temporal window may be determined by a set of overlapping operations to a data set, wherein certain operations have non-overlapping sectors which are not coalesced (e.g., the non-overlapping sectors 3608 may not be coalesced).

Figure 37:
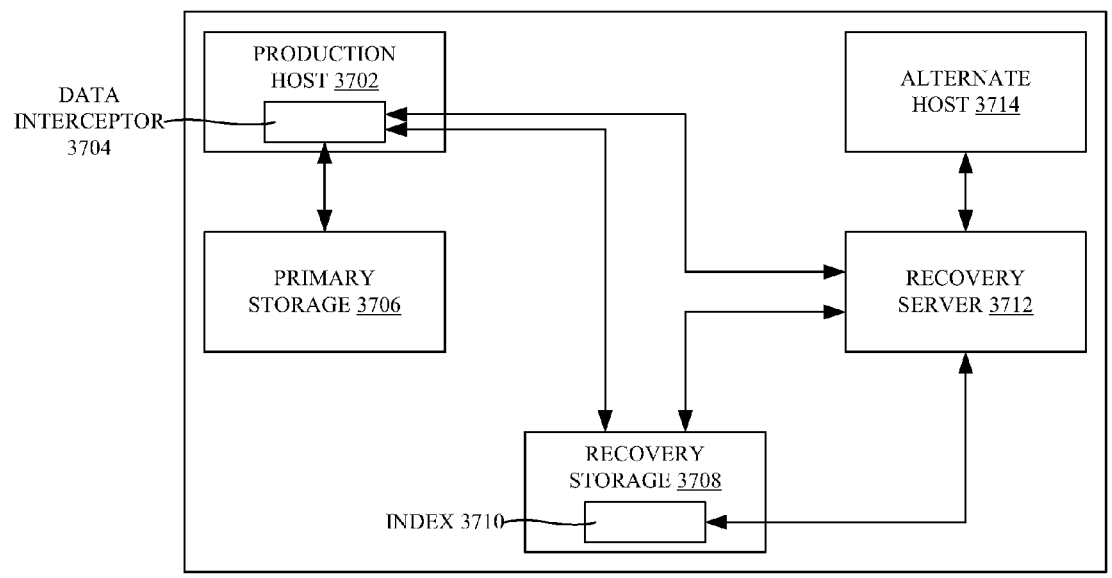
FIG. 37 shows an exemplary schematic diagram for an event driven recovery management environment in accordance with one embodiment.
Figure 38:
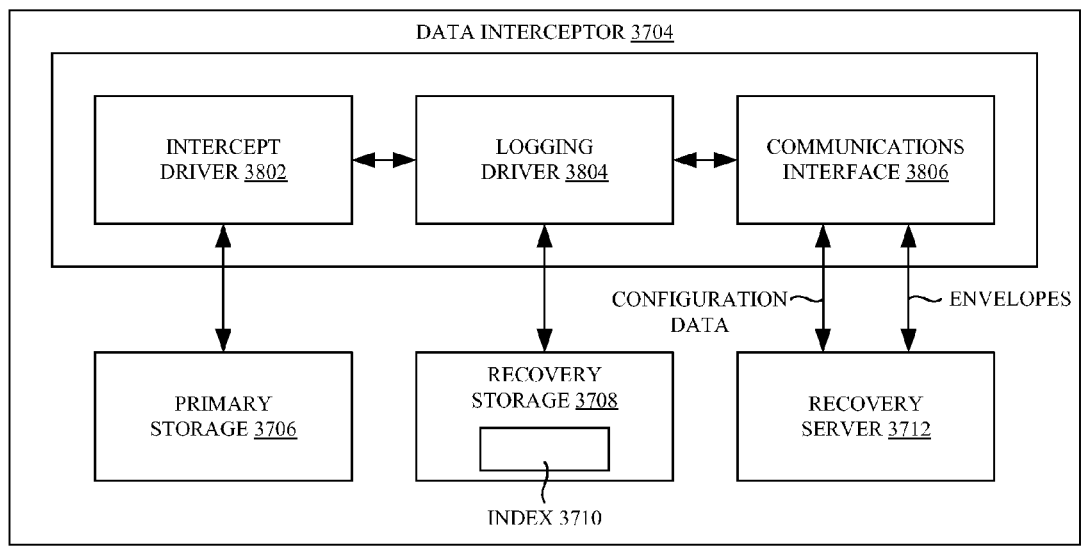
FIG. 38 shows an exemplary schematic diagram for data interceptor coordination of data.
Figure 39:
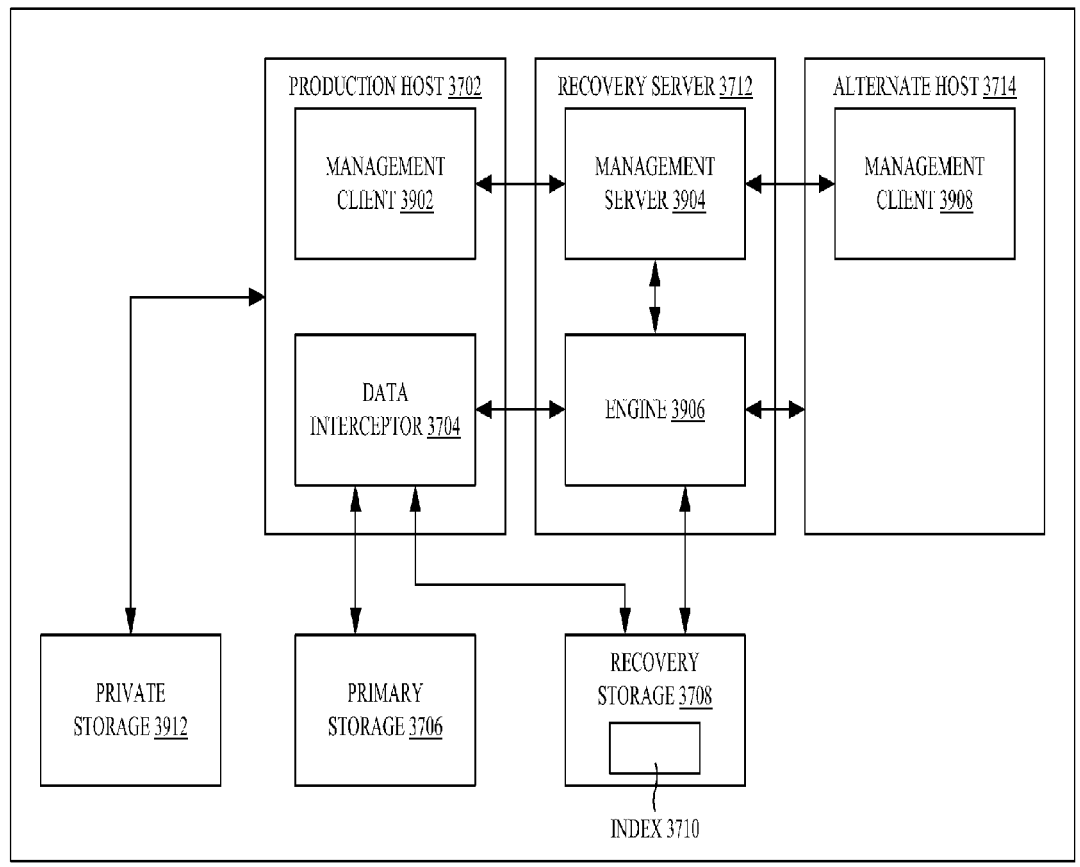
FIG. 39 illustrates an exemplary schematic diagram for management and storage communications in accordance with one embodiment.
Figure 40:
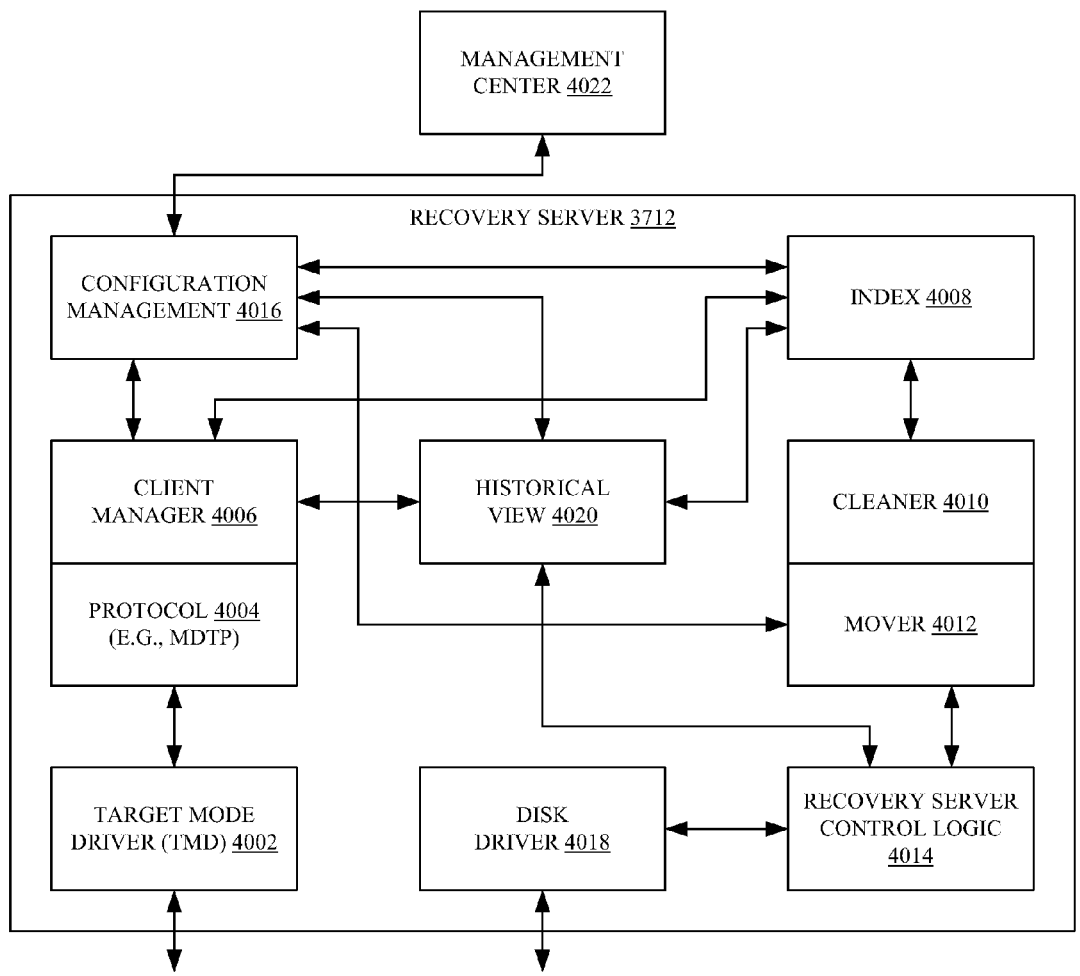
FIG. 40 shows an exemplary schematic diagram for recovery server activity in accordance with one embodiment.
Figure 41:
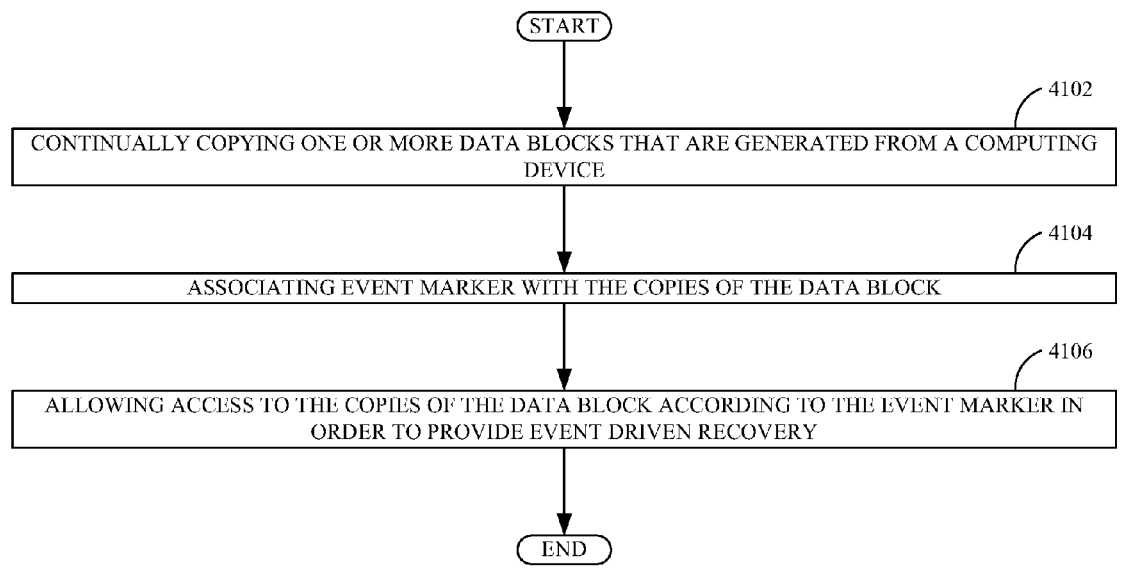
FIG. 41 shows an exemplary flow diagram for providing event driven recovery management in accordance with one embodiment.

FIGS. 37-41 illustrate additional example embodiments. In particular, FIG. 37 shows an exemplary schematic diagram for an event driven recovery management environment in accordance with one embodiment. FIG. 38 shows an exemplary schematic diagram for data interceptor coordination of data. FIG. 39 illustrates an exemplary schematic diagram for management and storage communications in accordance with one embodiment. FIG. 40 shows an exemplary schematic diagram for recovery server activity in accordance with one embodiment. FIG. 41 shows an exemplary flow diagram for providing event driven recovery management in accordance with one embodiment. Additional embodiments with respect to the figures are discussed below.

FIG. 2 is a schematic diagram of an environment for organizing and mapping data in accordance with exemplary embodiments. Fibre Channel (FC) may be utilized to transmit data between the components shown in FIG. 2. However, any type of system (e.g., optical system), in conjunction with FC or alone, may be utilized for transmitting the data between the components.

The exemplary environment 200 comprises a production host 204 (1-N) for creating various types of data. For example, a financial software program running on the production host 204 (1-N) can generate checkbook balancing data. Any type of data may be generated by the production host 204 (1-N). Further, the production host 204 (1-N) may include any type of computing device, such as a desktop computer, a laptop, a server, a personal digital assistant (PDA), and a cellular telephone. In a further embodiment, a plurality of production hosts 204 (1-N) may be provided.

The production host 204 (1-N) may include a data interceptor (e.g., 103, 207, 213). For example, a data tap that captures and duplicates data blocks or any other type of data may comprise the data interceptor (e.g., 103, 207, 213) according to some embodiments. The data interceptor (e.g., 103, 207, 213) may be any hardware, software, or firmware that resides on the production host 204 (1-N), or otherwise accesses the data generated by the production host 204 (1-N). For example, the data interceptor (e.g., 103, 207, 213) may be embedded in a SAN switch or a disk array controller. According to exemplary embodiments, the data interceptor (e.g., 103, 207, 213) may be coupled to, or reside on, one or more production hosts 204 (1-N). Conversely, in some embodiments, the production host 204 (1-N) may include or be coupled to more than one data interceptor (e.g., 103, 207, 213).

The data interceptor (e.g., 103, 207, 213) copies data created by the production host 204 (1-N) and stores the data ("data blocks") in a primary storage (D1-Dn) associated with the production host 204 (1-N). The copies of the data blocks ("data block copies") are stored to recovery storage 211. The recovery storage 211 may comprise any type of storage, such as time addressable block storage ("TABS"). Although "data blocks" and "data block copies" is utilized to describe the data created and the copies of the data generated, files, file segments, data strings and any other data may be created and copies generated according to various embodiments. Further, the data blocks and the data block copies may be a fixed size or varying sizes.

The primary storage (D1-Dn) and/or the recovery storage 211 may include random access memory (RAM), hard drive memory, a combination of static and dynamic memories, or any other memory resident on the production host 204 (1-N) or coupled to the production host 204 (1-N). The primary storage (D1-Dn) may include any storage medium coupled to the production host 204 (1-N) or residing on the production host 204 (1-N). In one embodiment, the data interceptor (e.g., 103, 207, 213) may store the data blocks to more than one of the primary storage (D1-Dn).

According to one embodiment, the data interceptor (e.g., 103, 207, 213) can create data block copies from the data blocks after the production host 204 (1-N) stores the data blocks to the primary storage (D1-Dn) or as the data blocks are generated by the production host 204 (1-N).

Data blocks are typically created from the production host 204 (1-N) each instant a change to existing data at the primary storage (D1-Dn) is made. Accordingly, a data block copy may be generated each time the data block is generated, according to exemplary embodiments. In another embodiment, the data block copy may comprise more than one data block. Each data block copy and/or data block may reflect a change in the overall data comprised of the various data blocks in the primary storage (D1-Dn).

In exemplary embodiments, the data interceptor (e.g., 103, 207, 213) intercepts each of the data blocks generated by the production host 204 (1-N) in order to create the data block copies. The data block is sent to the primary storage (D1-Dn) by the data interceptor (e.g., 103, 207, 213), while the data interceptor (e.g., 103, 207, 213) sends the data block copy to the recovery storage 211, as discussed herein. The data block copies may be combined to present a view of data at a recovery point (i.e., as the data existed at a point in time), called a "historical view (e.g., time, revision, application consistent)." In other words, the data block copies may be utilized to re-create the data (i.e., the data blocks stored in the primary storage (D1-Dn)) as it existed at a particular point in time. The "historical view (e.g., time, revision, application consistent)" of the data may be provided to a user requesting the data as a "snapshot" of the data. The snapshot may comprise an image of the data block copies utilized to create the historical view (e.g., time, revision, application consistent), according to one embodiment.

In an alternative embodiment, the data interceptor (e.g., 103, 207, 213), or any other device, may compare the data blocks being generated with the data blocks already stored in the primary storage (D1-Dn) to determine whether changes have occurred. The copies of the data blocks may then be generated when changes are detected.

The historical view (e.g., time, revision, application consistent) may also be used to present an image of all of the data in the primary storage (D1-Dn) utilizing some of the data block copies in the recovery storage 211 and some of the data blocks in the primary storage (D1-Dn). In other words, the historical view (e.g., time, revision, application consistent) at time x may be recreated utilizing some of the data blocks from the primary storage (D1-Dn) and some of the data block copies from the recovery storage 211, rather than only the data block copies from the recovery storage 211. Thus, the data block copies from the recovery storage 211 may be combined with the data blocks from the primary storage (D1-Dn) in order to create the historical view (e.g., time, revision, application consistent).

In one embodiment, the production host 204 (1-N) reserves private storage or temporary storage space for the data interceptor (e.g., 103, 207, 213). The private storage space may be utilized by the data interceptor (e.g., 103, 207, 213) for recording notes related to the data blocks, for temporarily storing the data block copies, or for any other purpose. For instance, if the recovery server 212 is not available to instruct the data interceptor (e.g., 103, 207, 213) where to store the data block copies in the recovery storage 211, the temporary storage may be utilized to store the data block copies until the recovery server 212 is available.

Similarly, the temporary storage may be utilized to store the data block copies if the recovery storage 211 is unavailable. Once the recovery server 212 and/or the recovery storage 211 is once again available, the data block copies may then be moved from the temporary storage to the recovery storage 211 or any other storage.

In another embodiment, the data interceptor (e.g., 103, 207, 213), using a bit map or any other method, tracks the data blocks from the production host 204 (1-N) that change. Accordingly, if the recovery server 212 and/or the recovery storage 211 is unavailable, the data interceptor (e.g., 103, 207, 213) records which data blocks on the primary storage (D1-Dn) change. The data interceptor (e.g., 103, 207, 213) can copy only the data blocks from the primary storage (D1-Dn)

to the recovery storage 211 that changed while the recovery server 212 and/or the recovery storage 211 were unavailable. Specifically, the data interceptor (e.g., 103, 207, 213) or any other device flags each data block generated by the production host 204 (1-N) that changes. The flags are referenced when the recovery server 212 and/or the recovery storage 211 are available to determine which data blocks were changed during the time the recovery server 212 and/or the recovery storage 211 were unavailable. Although each data block may change more than one time, each of the data blocks reflecting the most recent change to the data blocks when the recovery server 212 and/or the recovery storage 211 become available are the data blocks that are copied to the recovery storage 211 from the primary storage (D1-Dn).

In yet another embodiment, the data interceptor (e.g., 103, 207, 213) may continue to store the data block copies to an area of the recovery storage 211 allocated for data block copies from the data interceptor (e.g., 103, 207, 213) by the recovery server 212 prior to the recovery server 212 becoming unavailable. In other words, if the recovery server 212 is unavailable, but the recovery server 212 has previously instructed the data interceptor (e.g., 103, 207, 213) to store the data block copies to a specified area of the recovery storage 211, the data interceptor (e.g., 103, 207, 213) can continue to store the data block copies to the specified area until the specified area is full and/or the recovery server 212 becomes available.

In still a further embodiment, a backup recovery server may be provided to provide the recovery server 212 functions if the recovery server 212 is unavailable. As discussed herein, more than one recovery server 212 may be provided. Similarly, more than one production host 204 (1-N) may be provided, as a set of computing devices or other configuration, with other production hosts 204 (1-N) in the set capable of performing functions associated with the production host 204 (1-N) in the event the production host 204 (1-N) becomes unavailable.

The exemplary data interceptor (e.g., 103, 207, 213) also creates metadata in one or more "envelopes" to describe the data block copies and/or the data blocks. The envelopes may include any type of metadata. In exemplary embodiments, the envelopes include metadata describing the location of the data block in the primary storage (D1-Dn) (i.e., a logical block address "LBA"), the size of the data block and/or the data block copies, the location of the data block copy in the recovery storage 211, or any other information related to the data. In exemplary embodiments, the envelopes associated with the data block copies preserve the order in which the data blocks are created by including information about the order of data block creation by the production host 204 (1-N).

The data interceptor (e.g., 103, 207, 213) forwards the envelopes to a recovery server 212. The data interceptor (e.g., 103, 207, 213) may associate one or more unique identifiers, such as a snapshot identifier ("SSID"), with the data block copies to include with one or more of the envelopes. Alternatively, any device can associate the unique identifiers with the one or more envelopes, including the data interceptor (e.g., 103, 207, 213). The recovery server 212 may also designate areas of the recovery storage 211 for storing one or more of the data block copies in the recovery storage 211 associated with the one or more envelopes. When the data interceptor (e.g., 103, 207, 213) stores the data block copies to the recovery storage 211, the data interceptor (e.g., 103, 207, 213) can specify in the associated envelopes where the data block copy was stored in the recovery storage 211. Alternatively, any device can designate the physical address for storing the data block copies in the recovery storage 211.

The unique identifiers may be assigned to single data block copies or to a grouping of data block copies. For example, the recovery server 212 or other device can assign the identifier to each data block copy after the data block copy is created by the data interceptor (e.g., 103, 207, 213), or the unique identifier may be assigned to a group of the data block copies.

The recovery server 212 uses the envelopes to create a recovery index (discussed infra in association with FIGS. 2, 4 AND 5B). The recovery server 212 then copies the recovery index to the recovery storage 211 as an index (e.g., a subset of "stored metadata"). The index (e.g., a subset of "stored metadata") maps the envelopes to the data block copies in the recovery storage 211. Specifically, the index (e.g., a subset of "stored metadata") maps unique identifiers, such as addresses or sequence numbers, to the data block copies using the information included in the envelopes. In alternative embodiments, the index (e.g., a subset of "stored metadata") may be stored in other storage mediums or memory devices coupled to the recovery storage 211 or any other device.

In exemplary embodiments, the data interceptor (e.g., 103, 207, 213) forwards the data block copies and the envelope(s) to the recovery storage 211. The recovery storage 211 may include the index (e.g., a subset of "stored metadata"), or the index (e.g., a subset of "stored metadata") may otherwise be coupled to the recovery storage 211. More than one recovery storage 211 and/or indexes (e.g., subsets of "stored metadata") may be utilized to store the data block copies and the envelope(s) for one or more production hosts 204 (1-N) according to various embodiments. Further, the recovery storage 211 may comprise random access memory (RAM), hard drive memory, a combination of static and dynamic memories, direct access storage devices (DASD), or any other memory. The recovery storage 211 and/or the index (e.g., a subset of "stored metadata") may comprise storage area network (SAN)-attached storage, a network-attached storage (NAS) system, or any other system or network.

The unique identifiers, discussed herein, may be utilized to locate each of the data block copies in the recovery storage 211 from the index (e.g., a subset of "stored metadata"). As discussed herein, the index (e.g., a subset of "stored metadata") maps the envelopes to the data block copies according to the information included in the envelopes, such as the unique identifier, the physical address of the data block copies in the recovery storage 211, and/or the LBA of the data blocks in the primary storage (D1-Dn) that correspond to the data block copies in the recovery storage 211. Accordingly, the recovery server 212 can utilize a sort function in coordination with the unique identifier, such as a physical address sort function, an LBA sort function, or any other sort function to locate the data block copies in the recovery storage 211 from the map provided in the index (e.g., a subset of "stored metadata").

The recovery server 212 is also coupled to the recovery storage 211 and the index (e.g., a subset of "stored metadata"). In an alternative embodiment, the recovery server 212 may instruct the data interceptor (e.g., 103, 207, 213) on how to create the index (e.g., a subset of "stored metadata") utilizing the envelopes. The recovery server 212 may communicate any other instructions to the data interceptor (e.g., 103, 207, 213) related to the data blocks, the data block copies, the envelope(s), or any other matters. Further, the recovery server 212 may be coupled to more than one recovery storage 211 and/or indexes (e.g., subsets of "stored metadata").

As discussed herein, the index (e.g., a subset of "stored metadata") may be utilized to locate the data block copies in the recovery storage 211 and/or the data blocks in the primary storage (D1-Dn). Any type of information may be included in the envelope(s), such as a timestamp, a logical unit number (LUN), a logical block address (LBA), access and use of data being written for the data block, a storage media, an event marker associated with the data block, a sequence number associated with the data block, an identifier for a group of data block copies stemming from a historical view (e.g., time, revision, application consistent) of the data, and so on.

In one embodiment, the envelopes are indexed according to the metadata in the envelopes, which may be utilized as keys. For example, a logical address index may map logical addresses found on the primary storage (D1-Dn) to the data block copies in the recovery storage 211. A physical address index may map each physical data block copy address in the recovery storage 211 to the logical address of the data block on the primary storage (D1-Dn). Additional indexing based on other payload information in the envelopes, such as snapshot identifiers, sequence numbers, and so on are also within the scope of various embodiments. One or more indexes (e.g., subsets of "stored metadata") may be provided for mapping and organizing the data block copies.

One or more hosts 204(1-n) may access the recovery server 212. In exemplary embodiments, the hosts 204(1-n) may request data as it existed at a specific point in time or the recovery point (i.e. the historical view (e.g., time, revision, application consistent) of the data) on the primary storage (D1-Dn). In other words, the host 204(1-n) may request, from the recovery server 212, data block copies that reveal the state of the data as it existed at the recovery point (i.e., prior to changes or overwrites to the data by further data blocks and data block copies subsequent to the recovery point). The recovery server 212 can provide the historical view (e.g., time, revision, application consistent) of the data as one or more snapshots to the hosts 204(1-n), as discussed herein.

The hosts 204(1-n), or any other device requesting and receiving restored data, can utilize the historical view (e.g., time, revision, application consistent) to generate new data. The new data can be saved and stored to the recovery storage 211 and/or referenced in the index (e.g., a subset of "stored metadata"). The new data may be designated by users at the hosts 204(1-n) as data that should be saved to the recovery storage 211 for access by other users. The recovery server 212 may create envelopes to associate with the new data and store the envelopes in the index (e.g., a subset of "stored metadata") in order to organize and map the new data in relation to the other data block copies already referenced in the index (e.g., a subset of "stored metadata"). Accordingly, the hosts 204(1-n) or other device can create various new data utilizing the historical views (e.g., time, revision, application consistent) as the basis for the various new data.

Each of the hosts 204(1-n) may include one or more data interceptors (e.g., 103, 207, 213) according to alternate embodiments. In another embodiment, a single data interceptor (e.g., 103, 207, 213) may be coupled to one or more of the hosts 204(1-n). In yet a further embodiment, the data interceptor (e.g., 103, 207, 213) functions may be provided by the recovery server 212.

An interface may be provided for receiving requests from the host 204(1-n). For instance, a user at the host 204(1-n) may select a recovery point for the data from a drop down menu, a text box, and so forth. In one embodiment, the recovery server 212 recommends data at a point in time that the recovery server 212 determines is ideal given parameters entered by a user at the host 204(1-n). However, any server or other device may recommend recovery points to the host 204(1-n) or any other device. Predetermined parameters may also be utilized for requesting recovered data and/or suggesting optimized recovery points. Any type of variables may be considered by the recovery server 212 in providing a recommendation to the host 204(1-n) related to data recovery.

The production host 204 (1-N) may produce event marker to associate with the data blocks and/or the data block copies. For example, the data interceptor (e.g., 103, 207, 213) may associate an end of a third quarter with data block copies indicating that the data block copies occurred during or around the end of the third quarter. In one embodiment, a request for a historical view (e.g., time, revision, application consistent) constitutes an event and the event marker may be associated with the one or more data block copies comprising the historical view (e.g., time, revision, application consistent) for later reference. For example, the historical view (e.g., time, revision, application consistent) may be retrieved at a future time by referring to the event marker that indicates the last time the same historical view (e.g., time, revision, application consistent) was requested.

The event markers may be associated with a clock associated with the primary storage (D1-Dn), the recovery storage 211, or any other storage medium. Accordingly, the clock may assign a time to the storage medium as each copy of the data blocks are stored or in between storage of the data blocks.

Alternatively, the production host 204 (1-N), the data interceptor (e.g., 103, 207, 213), the recovery server 212, or any other device may assign one or more points in time to the copies of the data blocks themselves or the one or more points in time may comprise an event marker that identifies events that occur when the data block copies are not being stored to the storage medium. As discussed herein, event markers may comprise one or more points in time that do not coincide with the generation and/or storage of the one or more data block copies. In other words, the event markers may be associated with one or more points in time between the generation and/or storage of the one or more data block copies.

Thus, the event makers may simply indicate a state of the data in the primary storage (D1-Dn) at the time a particular event associated with the event marker occurred. In other words, no data blocks may have been written and/or stored to the primary storage (D1-Dn) when the particular event occurred.

In another embodiment, the events may be imported or provided by an entity or resource other than the production host 204 (1-N) to associate with the event markers. Any source may provide events to associate with the event markers for the data blocks and/or the data block copies. The association of the event markers with the data blocks and/or the data block copies may be implicit or indirect. In other words, the event marker may be associated with a state of the data at a point in time, as discussed herein. A branching data structure and searching may be utilized to establish an actual state of the data corresponding with the point in time. For instance, a major news event may be associated with the data block copies for simple reference back to a noteworthy date, time, and so forth. The event markers may be associated with the data block copies as the data block copies are created by the data interceptor (e.g., 103, 207, 213) or at any time after the data block copies have been created. Any type of event marker may be associated with the data.

A sequence number of each of the data block copies may be associated with the event marker. Accordingly, one or more data block copies associated with an event marker may be located according to the sequence number.

A text string may be provided for describing an event for the event marker. As discussed herein, any type of information may constitute an event. For example, a text string with an author's name may be included so that the data block copies may later be retrieved by searching for historical views (e.g., time, revision, application consistent) comprised of data block copies associated with the author's name. In one embodiment, the author's name, or other text string, may be associated with an event marker, which is then associated with the data block copies. Accordingly, the author's name may not be directly associated with the data block copies. Similarly, a sequence number or any other unique identifier, as discussed herein, may be associated with the data block copy having the particular event marker associated with the data block copy. The unique identifier may then be utilized to locate the data block copy in the recovery storage 211 via the index (e.g., a subset of "stored metadata"). The data block copies required to reconstruct a historical view (e.g., time, revision, application consistent) of data requested by a user may then be provided to the user, based on one or more events described by the user.

In exemplary embodiments, one or more event marker are utilized in combination with one or more timestamps in order to locate historical views (e.g., time, revision, application consistent) that correlate with the one or more event markers. For example, if corruption to data occurred approximately ten minutes preceding a particular event from an event marker, or at any other time related to the event, the data can be recovered using the event and the data as it existed 10 minutes prior to the event. Any type of integration, combination, cross-reference, relationship, and so forth between the event markers and the timestamps or any other information may be utilized to locate or recreate the data. In another embodiment, a user can request all the data that occurred between one or more event markers.

The user may select an event or enter an event associated with the historical view (e.g., time, revision, application consistent) desired in order to help the recovery server 212 locate the appropriate data block copies corresponding to the event marker in the recovery storage 211. The recovery server 212 can match the event information from the user with the event marker associated with the historical view (e.g., time, revision, application consistent). The event information from the user may directly match the event marker associated with the historical view (e.g., time, revision, application consistent) or the recovery server 212 may determine what event marker best matches the event information from the user.

In some embodiments, the event information from the user can be matched with data outside of the recovery server 212. For example, a computing device that coordinates the activities of more than one recovery server 212 may receive the event information from the user and provide instructions to the recovery servers 212 for locating the event markers indicating the historical views (e.g., time, revision, application consistent) that correlate with the event information or forward the request from the user to the recovery servers 212 or an appropriate recovery server 212.

Turning now to FIGS. 2, 5A, and 5B, an exemplary schematic diagram for data interceptor coordination of data block copies is shown. The data interceptor (e.g., 103, 207, 213) may interact, for example, with the primary storage (D1-Dn), the recovery storage 211, and/or the recovery server 212. The data interceptor (e.g., 103, 207, 213) includes an intercept driver 503 (e.g., a type of frame handler) in communication with a logging driver (e.g., 501-505 of FIG. 5A, 507-512 of FIG. 5B), which is in communication with a communications interface (e.g., 500, 501, HBA). A source initiating creation of the event markers may communicate with the data interceptor (e.g., 103, 207, 213) in order to note the event markers in the envelopes. In some embodiments, the event markers may be created without coordination with the data interceptor (e.g., 103, 207, 213).

The intercept driver 503 (e.g., a type of frame handler) intercepts the data being generated by the production host 204 (1-N). The intercept driver 503 (e.g., a type of frame handler) then creates a data block from the data generated and a copy of the data block. In other words, the intercept driver 503 (e.g., a type of frame handler) captures a data block copy each time a data block is created by the production host 204 (1-N). The intercept driver 503 (e.g., a type of frame handler) stores the data block to the primary storage (D1-Dn) and forwards the data block copy to the logging driver (e.g., 501-505 of FIG. 5A, 507-512 of FIG. 5B). The data block copies may be generated every time a change to the data already stored in the primary storage (D1-Dn) occurs.

The logging driver (e.g., 501-505 of FIG. 5A, 507-512 of FIG. 5B), which is coupled to, or otherwise in communication with, the intercept driver 503 (e.g., a type of frame handler), generates the one or more envelopes with the metadata discussed herein. As also discussed herein, the metadata may include any type of information associated with the data blocks, such as a time generated, the sequence number, the location of the data blocks in the primary storage (D1-Dn) and/or the data block copies in the recovery storage 211, the unique identifiers, the one or more event markers associated with the data block copies, and so on.

The logging driver (e.g., 501-505 of FIG. 5A, 507-512 of FIG. 5B) stores the data block copies to the recovery storage 211 along with the metadata. The logging driver (e.g., 501-505 of FIG. 5A, 507-512 of FIG. 5B) also sends the metadata to the recovery server 212 via the communications interface (e.g., 500, 501, HBA). The metadata sent to the recovery server 212 may be identical to the metadata stored to the recovery storage 211 or different. The recovery storage 211 is utilized for storage of the data block copies according to instructions from the recovery server 212 regarding where in the recovery storage 211 to store the data block copies, as discussed herein. Further, the envelopes are also stored in the recovery storage 211. As discussed herein, in an alternative embodiment, the data interceptor (e.g., 103, 207, 213) may copy the data blocks from the primary storage (D1-Dn) after the data interceptor (e.g., 103, 207, 213) or the production host 204 (1-N) stores the data blocks to the primary storage (D1-Dn).

In one embodiment, the primary storage (D1-Dn) and the recovery storage 211 may comprise one storage medium. For example, the recovery storage 211 may be utilized for storing the data blocks using a map of the data blocks, such as the branching data structure used by the recovery server 212. The map may be updated to reflect new data blocks being stored to the recovery storage 211 in such an embodiment.

In this embodiment, the production host 204 (1-N) may be coupled to the recovery server 212, which in turn is coupled to a storage medium, such as the recovery storage 211. The recovery server 212 may include rules for implementing the branching data structure and a structure for the index (e.g., a subset of "stored metadata"). The recovery server 212 may use the index (e.g., a subset of "stored metadata") and the LBA to determine the physical location of the data blocks in the recovery storage 211. The data block may then be provided to the production host 204 (1-N) in response to any request(s) from the production host 204 (1-N), such as a request for a historical view (e.g., time, revision, application consistent). When the production host 204 (1-N) generates a data block and specifies an LBA, the recovery server 212 can allocate a free physical block in the recovery storage 211 for the data block. The recovery server 212 then updates the index (e.g., a subset of "stored metadata") to map the LBA to the allocated free physical block and stores the data block generated into the allocated free physical block in the recovery storage 211.

Further, a data interceptor (e.g., 103, 207, 213) may not be provided in accordance with such an embodiment. Instead, the recovery server 212 may perform the data interceptor (e.g., 103, 207, 213) functions in this embodiment. The recovery server 212 may provide a historical view (e.g., time, revision, application consistent) and store data blocks generated from the production host 204 (1-N) utilizing the historical view (e.g., time, revision, application consistent), as discussed herein.

A communications interface (e.g., 500, 501, HBA) is coupled to, or is otherwise in communication with, the logging driver (e.g., 501-505 of FIG. 5A, 507-512 of FIG. 5B) and/or the recovery server 212. The communications interface (e.g., 500, 501, HBA) forwards the instructions from the recovery server 212, discussed herein, to the logging driver (e.g., 501-505 of FIG. 5A, 507-512 of FIG. 5B) indicating where the data block copies and/or the envelopes should be stored in the recovery storage 211. The recovery server 212 uses the envelopes to construct and maintain a recovery index within the recovery server 212 (discussed in association with FIG. 4, 5B, 6, 7). The recovery index is then copied as the index (e.g., a subset of "stored metadata") in the recovery storage 211.

Specifically, the recovery server 212 sends configuration data to the logging driver (e.g., 501-505 of FIG. 5A, 507-512 of FIG. 5B) via the communications interface (e.g., 500, 501, HBA). The configuration data may include information regarding the area of the recovery storage 211 where the logging driver (e.g., 501-505 of FIG. 5A, 507-512 of FIG. 5B) may store the data block copies, or any other type of information. Any type of configuration data may be communicated to the logging driver (e.g., 501-505 of FIG. 5A, 507-512 of FIG. 5B) for storing the data block copies and/or the envelopes in the recovery storage 211 and/or for organizing the information from the envelopes in the index (e.g., a subset of "stored metadata").

Although the data interceptor (e.g., 103, 207, 213) is described as including various components, the data interceptor (e.g., 103, 207, 213) may include more components or fewer components than those listed and still fall within the scope of various embodiments.

FIGS. 2, 4, and 5B illustrate an exemplary schematic diagram for management and storage communications in accordance with one embodiment. The exemplary production host 204 (1-N) includes a management client (e.g., client 213, client configure interface 500), as well as the data interceptor (e.g., 103, 207, 213) discussed herein. The exemplary recovery server 212 includes a management server 515 and an engine (e.g., address decoder engine 508). Further, the host 204(1-n) also includes a management client (e.g., client 213, client configure interface 500). As discussed herein, in some embodiments, the one or more hosts 204(1-n) may also include data interceptors (e.g., 103, 207, 213) for copying the data blocks generated while utilizing historical views (e.g., time, revision, application consistent) of the data.

The management server 515 may be remotely connected to the recovery server 212 according to various embodiments. For example, if a plurality of recovery servers 212 are provided, each of the recovery servers 212 may be coupled to each of a plurality of management servers 515, for a one to one relationship. Alternatively, two or more recovery servers 212 of a plurality of recovery servers 212 may share one management server 515 amongst a plurality of management servers 515. Any number of recovery servers 212 may be coupled to any number of management servers 515 according to exemplary embodiments.

In further embodiments, each recovery server 212 may include a management server 515 that further communicates with the management clients (e.g., client 213, client configure interface 500). The management clients (e.g., client 213, client configure interface 500) may be coupled to any device, such as protected servers, hosts 204(1-n), and so forth.

In one embodiment, the management server 515 is coupled to the recovery server 212, rather than residing in the recovery server 212. A management client residing on the recovery server 212 may then communicate with the management server 515 and other management clients in a system comprised of more than one recovery server 212, as discussed herein.

In one embodiment, a user may select an event marker corresponding with a historical view (e.g., time, revision, application consistent) or to which recovery should be performed. The management server 515 can process the event marker and determine which historical view (e.g., time, revision, application consistent)(s) corresponds with the event marker selected by the user. The historical view (e.g., time, revision, application consistent) may then be provided to the user based on the event marker. As discussed herein, the user may select the event marker, provide key words or text strings associated with an event marker, provide unique identifiers related to the event marker, and so on. The management server 515 may match the event information entered by the user with the event markers in order to determine which event marker best matches the event information.

The management client (e.g., client 213, client configure interface 500) of the production host 204 (1-N) is in communication with the management server 515 of the recovery server 212 for coordinating and managing activities within the SAN. The data interceptor (e.g., 103, 207, 213) stores the data blocks to the primary storage (D1-Dn). The data interceptor (e.g., 103, 207, 213) communicates with the recovery server 212 in order to store the data block copies to the recovery storage 211. If the production host 204 (1-N) is down, the engine (e.g., address decoder engine 508) at the recovery server 212 can recover data block copies from the recovery storage 211 in order to provide a historical view (e.g., time, revision, application consistent) to the host 204 (1-n) as requested by a user associated with the host 204(1-n). The historical view (e.g., time, revision, application consistent) may be requested by a system or a process according to some embodiments. For example, an automated process may request historical views (e.g., time, revision, application consistent) of the data for performing offline backup.

The engine (e.g., address decoder engine 508) coordinates activities of the data interceptor (e.g., 103, 207, 213) via communication with the data interceptor (e.g., 103, 207, 213). In one embodiment, the engine (e.g., address decoder engine 508) coordinates the activities of more than one data interceptor (e.g., 103, 207, 213). As discussed herein, the activities that may be coordinated by the engine (e.g., address decoder engine 508) include instructing the data interceptor (e.g., 103, 207, 213) where and/or how to store the data block copies and the envelopes in the recovery storage 211 and/or the envelopes in the index (e.g., a subset of "stored metadata"). However, any types of activities may be coordinated by the engine (e.g., address decoder engine 508).

As discussed herein, the data interceptor (e.g., 103, 207, 213) may use private storage (e.g., 408, 705), as shown in FIGS. 2, 4 and 5B for storage of metadata, envelopes, and/or data block copies. The private storage (e.g., 408, 705) is coupled to the production host 204 (1-N). However, in some embodiments, the private storage (e.g., 408, 705) may be coupled to the primary storage (D1-Dn) or may comprise a portion of the primary storage (D1-Dn). Accordingly, as discussed herein, if the recovery storage 211 is not accessible, the data interceptor (e.g., 103, 207, 213) can store the data block copies, a bit map, or other bookkeeping information to the private storage (e.g., 408, 705). The data block copies can then be provided to the recovery storage 211 when the recovery storage 211 becomes accessible. However, according to one embodiment, the private storage (e.g., 408, 705) may be utilized for storing any information, regardless of whether the recovery storage 211 is accessible.

Furthermore, the engine (e.g., address decoder engine 508) of the recovery server 212 can simultaneously access the recovery storage 211 while the data interceptor (e.g., 103, 207, 213) accesses the recovery storage 211. Accordingly, the engine (e.g., address decoder engine 508) at the recovery server 212 can retrieve the data block copies from the recovery storage 211 as other data block copies are being stored to the recovery storage 211 by the data interceptor (e.g., 103, 207, 213). For example, the engine (e.g., address decoder engine 508) can process requests for historical views (e.g., time, revision, application consistent) from the host 204(1-*n*) performing recovery operations while the engine (e.g., address decoder engine 508) continues to process and/or provide instructions for incoming data block copies and envelopes from the production host 204 (1-N).

The host 204(1-*n*) may also include a management client (e.g., client 213, client configure interface 500). The management server 515 of the recovery server 212 may communicate directly with the management client (e.g., client 213, client configure interface 500) at the host 204(1-*n*) to deliver historical views (e.g., time, revision, application consistent) of the data requested by a user at the host 204(1-*n*) back to the host 204(1-*n*).

The engine (e.g., address decoder engine 508) at the recovery server 212 can also communicate with the host 204(1-*n*). The engine (e.g., address decoder engine 508) may deliver the data requested by the host 204(1-*n*) directly to the host 204 (1-*n*). For example, a user may select an event marker representing a historical view (e.g., time, revision, application consistent) and the engine (e.g., address decoder engine 508) can locate the data block copies to create the historical view (e.g., time, revision, application consistent) requested and return the historical view (e.g., time, revision, application consistent) to the user at the host 204(1-*n*).

FIG. 4 shows an exemplary schematic diagram for recovery server 212 coordination of historical views (e.g., time, revision, application consistent). One or more envelopes arrive at the recovery server 212 via a target mode driver 401(1-*n*). The target mode driver 401(1-*n*) responds to commands for forwarding the envelopes. Alternatively, any type of driver may be utilized for communicating the envelopes to the recovery server 212.

The envelopes may be forwarded by the data interceptor (e.g., 103, 207, 213) utilizing a LAN/Server Interface 501 or a line card 401(1-*n*). A client manager (e.g., interface manager 511 and/or user interface 515) may be provided for coordinating the activities of the recovery server 212. The envelopes are utilized by the recovery server 212 to construct a recovery index (e.g., address decode database 512). The recovery index (e.g., address decode database 512) is then copied to the index (e.g., a subset of "stored metadata") (FIG. 2) associated with the recovery storage 211 (FIG. 2). In order to update the index (e.g., a subset of "stored metadata"), the recovery index (e.g., address decode database 512) may be updated and copied each time new envelopes arrive at the recovery server 212 or the recovery server 212 may update the index (e.g., a subset of "stored metadata") with the new envelope information at any other time.

Optionally, a cleaner (e.g., Host/LUN Metadata Manager 507) defragments the data block copies and any other data that is stored in the recovery storage 211. As another option, a mover (e.g., Interface Manager 511) moves the data block copies (i.e. the snapshots) in the recovery storage 211 and can participate in moving the data block copies between the recovery storage 211, the production host 204 (1-N), the hosts 204(1-*n*) (FIG. 2), and/or any other devices.

A recovery server control logic (e.g., Host/LUN Metadata Manager 507 and/or Interface Manager 511) manages storage of the envelopes and the data block copies in the recovery storage 211 using configuration information generated by a configuration management component (e.g., User Interface 515). A disk driver (e.g., Secondary Disk Interface 405) then stores (e.g., writes) the envelopes and the data block copies to the recovery storage 211.

When a user requests a historical view (e.g., time, revision, application consistent) of the data, as discussed herein, a historical view (e.g., time, revision, application consistent) component (e.g., Host/LUN Metadata Manager 507, Address Decoder Engine 508, Interface Manager 511) retrieves the data block copies needed to provide the historical view (e.g., time, revision, application consistent) requested by a user. The user may request the historical view (e.g., time, revision, application consistent) based on an event marker or any other criteria. Specifically, the historical view (e.g., time, revision, application consistent) component (e.g., Host/LUN Metadata Manager 507, Address Decoder Engine 508, Interface Manager 511) references the recovery index (e.g., address decode database 512) or the index (e.g., a subset of "stored metadata") pointing to the data block copies in the recovery storage 211. The historical view (e.g., time, revision, application consistent) component (e.g., Host/LUN Metadata Manager 507, Address Decoder Engine 508, Interface Manager 511) then requests the data block copies, corresponding to the envelopes in the index (e.g., a subset of "stored metadata"), from the recovery storage control logic (e.g., Host/LUN Metadata Manager 507 and/or Interface Manager 511). The disk driver (e.g., Secondary Disk Interface 405) reads the data block copies from the recovery storage 211 and provides the data block copies to the historical view (e.g., time, revision, application consistent) component (e.g., Host/LUN Metadata Manager 507, Address Decoder Engine 508, Interface Manager 511). The data block copies are then provided to the user at the host 204(1-*n*) that requested the data.

As discussed herein, according to one embodiment, the historical view (e.g., time, revision, application consistent) may be constructed utilizing the data block copies from the recovery storage 211 and the data blocks from the primary storage (D1-Dn). Thus, the data block copies may be utilized to construct a portion of the historical view (e.g., time, revision, application consistent) while the data blocks may be utilized to construct a remaining portion of the historical view (e.g., time, revision, application consistent).

The user of the historical view (e.g., time, revision, application consistent) may utilize the historical view (e.g., time, revision, application consistent) to generate additional data blocks, as discussed herein. Copies of the data blocks may then be stored in the recovery storage 211 along with corresponding envelopes. The recovery server 212 then updates the index (e.g., a subset of "stored metadata") and/or the branching data structure to include references to the new data block copies. Accordingly, the new data block copies are tracked via the index (e.g., a subset of "stored metadata") in relation to other data block copies already stored in the recovery storage 211. One or more event markers may be associated with the new data block copies, as the copies are generated or at any other time. As discussed herein, the event markers may be directly associated with the new data block copies, or they event markers may be indirectly associated with the new data block copies. According to some embodiments, generating the new data block copies constitutes an event to associate with an event marker, itself.

By creating the branching data structure to reference the index (e.g., a subset of "stored metadata"), modifications to the data are stored along with the original data upon which those modifications are based. Modifications can continue to be stored as the modifications relate to the data upon which the modifications are based, so that a hierarchical relationship is organized and mapped. By using the branching data structure, the various data block copies relationship to one another can be organized at a higher level than the index (e.g., a subset of "stored metadata"). The branching data structure and the index (e.g., a subset of "stored metadata") may comprise a single structure according to some embodiments. According to further embodiments, the branching data structure, the index (e.g., a subset of "stored metadata"), and/or the data block copies may comprise a single structure.

The branches in the branching data structure may be created when the historical views (e.g., time, revision, application consistent) are modified, or when data blocks from the primary storage (D1-Dn) are removed or rolled back to a point in time (i.e. historical view (e.g., time, revision, application consistent)). The event markers may be inserted on the branches after the branches are generated. The data interceptor (e.g., 103, 207, 213) functionality, as discussed herein, may be provided by any components or devices.

In some embodiments, a historical view component, such as the historical view component (e.g., Host/LUN Metadata Manager 507, Address Decoder Engine 508, Interface Manager 511) discussed herein, residing at the recovery server 212 may provide historical views (e.g., time, revision, application consistent) to a server, such as host 204(1-*n*) discussed herein or any other device. The host 204(1-*n*) may then utilize the historical view (e.g., time, revision, application consistent) to generate additional data blocks. For example, the host 204(1-*n*) may write data on top of the historical view (e.g., time, revision, application consistent). The additional data blocks may be generated by the host 204(1-*n*) using the historical view component at the recovery server 212. The historical view component (e.g., Host/LUN Metadata Manager 507, Address Decoder Engine 508, Interface Manager 511) may then generate envelopes and store the envelopes and the data blocks in the recovery server 212, as well as update the index (e.g., a subset of "stored metadata") accordingly. Thus, the historical view component (e.g., Host/LUN Metadata Manager 507, Address Decoder Engine 508, Interface Manager 511) in some embodiments provides functions similar to the functions that may be provided by the data interceptor (e.g., 103, 207, 213). In other embodiments, the historical view component (e.g., Host/LUN Metadata Manager 507, Address Decoder Engine 508, Interface Manager 511) resides outside of the recovery server 212, but is coupled to the recovery server 212 and the recovery storage 211 in order to provide functionalities similar to the data interceptor (e.g., 103, 207, 213). Further, the production hosts 204 (1-*n*) may comprise a single device according to some embodiments. As discussed herein, the primary storage (D1-Dn) and the recovery storage 211 may comprise one storage medium according to some embodiments In other embodiments, the production host 204 (1-N) includes a historical view component (e.g., Host/LUN Metadata Manager 507, Address Decoder Engine 508, Interface Manager 511) and a data interceptor (e.g., 103, 207, 213), both residing on the production host 204 (1-*n*). However, the historical view component (e.g., Host/LUN Metadata Manager 507, Address Decoder Engine 508, Interface Manager 511) and/or the data interceptor (e.g., 103, 207, 213) may reside outside of, but be coupled to, the production host 204 (1-*n*) in other embodiments. Further, the historical view component (e.g., Host/LUN Metadata Manager 507, Address Decoder Engine 508, Interface Manager 511) and the data interceptor (e.g., 103, 207, 213) may comprise one component in some embodiments. The generation of envelopes, data blocks, data block copies, indexes, and so forth may be performed by the historical view component (e.g., Host/LUN Metadata Manager 507, Address Decoder Engine 508, Interface Manager 511) and/or the data interceptor (e.g., 103, 207, 213) at the production host 204 (1-N) in such an embodiment.

As discussed herein, the historical view component (e.g., Host/LUN Metadata Manager 507, Address Decoder Engine 508, Interface Manager 511) may request data blocks from the primary storage (D1-Dn) and/or data block copies from the recovery storage 211 in order to generate the historical view (e.g., time, revision, application consistent). Further, the additional data blocks generated utilizing the historical view (e.g., time, revision, application consistent) (i.e. on top of the historical view (e.g., time, revision, application consistent)) may be stored to either the primary storage (D1-Dn), the recovery storage 211, or to both the primary storage (D1-Dn) and the recovery storage 211. The primary storage and the recovery storage may be combined into one unified storage in some embodiments.

A management center (User Interface 515) may also be provided for coordinating the activities of one or more recovery servers 212, according to one embodiment.

Although FIG. 4 shows the recovery server 212 having various components, the recovery server 212 may include more components or fewer components than those listed and still fall within the scope of various embodiments.

An exemplary flow diagram for providing event driven recovery management in accordance with an exemplary embodiment is described. At steps 601-611, one or more data blocks that are generated from a computing device are continually copied. As discussed herein, the production host 204 (1-N) or any other device may create one or more data blocks, which are then continually copied by the data interceptor (e.g., 103, 207, 213) to the primary storage (D1-Dn) and to the recovery storage 211 as a data block copy. As discussed herein, the primary storage (D1-Dn) and the recovery storage 211 may comprise one storage medium according to some embodiments.

The data blocks may be copied continually after or as they are generated or intermittently according to some embodiments. In exemplary embodiments, the data blocks may be copied continually, followed by periods of intermittent copying, and so on. Any combination of continuous copying and intermittent copying may occur. In some embodiments, the data blocks are copied after a certain number of data blocks are generated. Any type of time intervals, continuous, consecutive, intermittent, or any combination thereof related to copying the data blocks may be provided according to various embodiments.

As discussed herein, the one or more data blocks may be created by modifying existing data block copies. Further, the existing data block copies comprising a historical view (e.g., time, revision, application consistent) may be provided by a historical view component (e.g., Host/LUN Metadata Manager 507, Address Decoder Engine 508, Interface Manager 511), which may also perform functions similar to the data interceptor (e.g., 103, 207, 213) according to some embodiments. Accordingly, the data blocks generated may be copied by another device or component according to some embodiments.

As discussed herein, the hosts 204(1-n) or any other devices can utilize the copies of the one or more data blocks comprising various historical views (e.g., time, revision, application consistent) to create new data blocks. The new data blocks created utilizing the copies of the one or more data blocks may also be copied. Accordingly, users can continue to use historical views (e.g., time, revision, application consistent) of data based on the copies of the one or more data blocks and the copies of the one or more new data blocks to generate more new data.

At steps 613-615, at least one event marker (tag) is associated with the copies of the one or more data blocks. The data interceptor (e.g., 103, 207, 213) discussed in FIG. 2, or any other device or component, may associate the at least one event marker with the data block copies. The event marker(s) may comprise any type of information. As discussed herein, the event(s) for the event markers may be provided by any source. The event markers may be associated with the data block copies when the data block copies are generated or at any other time.

Further, one or more points in time may be associated with the data block copies directly or indirectly. In other words, the one or more points in time may correspond to the generation and/or storage of the data block copies and/or the one or more points in time may correspond with at least one time in between the generation and/or storage of the data block copies, or distinct from the generation and/or storage of the data block copies. For example, the one or more points in time may correspond to a state of data at a point in time or a state of a storage medium, such as the recovery storage 211 (FIG. 2), at a point in time.

Any point in time, such as a point in time marked by a timestamp, may be associated with the event markers. Further, any other information, related to time or unrelated to time, may be associated with the event markers, which may be associated with the data block copies, the storage medium, a state of data, a clock associated with the storage medium, and so forth. In exemplary embodiments, sequence numbers may be associated with the event markers. In some embodiments, a timestamp and a sequence number may both be associated with the data block copies.

In an embodiment, using a combination of Host/LUN Metadata Manager 507, Address Decoder Engine 508, and/or Interface Manager 511, access to the copies of the one or more data blocks according to the at least one event marker is allowed in order to provide event driven recovery. The index (e.g., a subset of "stored metadata") may be utilized for searching for the one or more data block copies in the recovery storage 211, or any other storage. Accordingly, the data block copies may later be accessed from the storage medium by a user that enters information about the event. As discussed herein, the event markers may be generated by the production host 204 (1-N) or any other source, such as a source unaffiliated with the event driven recovery management environment. The event markers may be associated with a timestamp, a sequence number, or any other data. The timestamp, the sequence number, or any other information may be referenced in the index (e.g., a subset of "stored metadata") to locate the historical view (e.g., time, revision, application consistent) that corresponds to the event marker. In other words, the event marker is associated with a timestamp and/or a sequence number according to exemplary embodiments.

The data blocks may also be accessed from the primary storage (D1-Dn). As discussed herein, the recovery storage 211 and/or the index (e.g., a subset of "stored metadata") may include information related to the location of the data blocks in the primary storage (D1-Dn).

The data interceptor (e.g., 103, 207, 213), or any other device, may associate a time and/or a sequence number with the data. Accordingly, the envelopes associated with the data block copies may include an event, a time, a sequence number, and so on. Any information may be included in the envelopes, as discussed herein.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium).

For example, the client device 2900, the storage module 2902, the virtualization module 2904, the recovery module 2906, the events module 2908, the network module 2900, the instantiation module 3000, the export module 3004, the pausing module 3006, the iSCSI module 3014, the fiber channel module 3024, the continuous data protection module 3100, the delayed roll forward module 3102, the delayed roll backward module 3104, the coalescing module 3106, and/or the event detector module 3208 may be enabled using transistors, logic gates, and electrical circuits (e.g., application specific integrated ASIC circuitry) using a client device circuit, a storage module circuit, a virtualization circuit, a recovery circuit, an events circuit, a network circuit, an instantiation circuit, an export circuit, a pausing circuit, an iSCSI circuit, a fiber channel circuit, a continuous data protection circuit, a delayed roll forward circuit, a delayed roll backward circuit, a coalescing circuit, and/or an event detector circuit.

In addition, it will be appreciated that the various operations, processes, and methods disclosed herein may be embodied in a machine-readable medium and/or a machine accessible medium compatible with a processing system (e.g., a computer system), and may be performed in any order. Accordingly, the specification and drawings are to be regarded in an illustrative rather than a restrictive sense.

What is claimed is:

1. A computing system comprising:
    at least one processor; and
    one or more storage device having stored computer-executable instructions which, when executed by the at least one processor, implement a method that includes:
        the computing system storing recovery data in a storage base, the recovery data including data for a plurality of different data points occurring within a predetermined period of time around each of a plurality of different recovery points;
        the computing system accessing a coalescing policy that identifies coalescing trigger events and policies for storing different quantities of the recovery data for the different recovery points, the coalescing policy specifying at least an amount of recovery data to retain for different recovery points based on corresponding ages of the different recovery points;

the computing system detecting a coalescing trigger event that triggers a collapsing of the recovery data; and the computing system, for each of the different recovery points, coalescing the corresponding stored recovery data based on the coalescing policy, wherein said coalescing includes collapsing a first set of recovery data associated with a first recovery point into a reduced set of data points that is less than a quantity of data points in a second set of recovery data that is associated with second recovery point upon determining that the first recovery point is older than the second recovery point.

2. The computing system of claim 1, wherein the reduced set of data points includes a data point for no less than every 5 minutes and a second set of recovery data points in the second set of recovery data includes a data point for no more than every 2 minutes.

3. The computing system of claim 1, wherein an amount of the recovery data stored for different recovery points is dependent upon a type of each of the different recovery points, wherein types of the different recovery points include at least one of a particular time of day, a system crash, a failed log-in or a configuration change.

4. The computing system of claim 1, wherein the method further includes storing recovery data for a greater quantity of data points that fall within a predetermined amount of time of a particular recovery point than of data points that fall outside of the predetermined amount of time for the particularly recovery point.

5. The computing system of claim 1, wherein the recovery point comprises at least a particular time of day.

6. The computing system of claim 1, wherein the recovery point comprises at least one of a system crash, a failed log-in or a configuration change.

7. A method performed by a computer that includes at least one processor and one or more storage device having stored computer-executable instructions which, when executed by the at least one processor, implement the method, the method comprising:

the computing system storing recovery data in a storage base, the recovery data including data for a plurality of different data points occurring within a predetermined period of time around each of a plurality of different recovery points;

the computing system accessing a coalescing policy that identifies coalescing trigger events and policies for storing different quantities of the recovery data for the different recovery points, the coalescing policy specifying at least an amount of recovery data to retain for different recovery points based on corresponding ages of the different recovery points;

the computing system detecting a coalescing trigger event that triggers a collapsing of the recovery data; and the computing system, for each of the different recovery points, coalescing the corresponding stored recovery data based on the coalescing policy, wherein said coalescing includes collapsing a first set of recovery data associated with a first recovery point into a reduced set of data points that is less than a quantity of data points in a second set of recovery data that is associated with second recovery point upon determining that the first recovery point is older than the second recovery point.

8. The method of claim 7, wherein the reduced set of data points includes a data point for no less than every 5 minutes and a second set of recovery data points in the second set of recovery data includes a data point for no more than every 2 minutes.

9. The method of claim 7, wherein an amount of the recovery data stored for different recovery points is dependent upon a type of each of the different recovery points, wherein types of the different recovery points include at least one of a particular time of day, a system crash, a failed log-in or a configuration change.

10. The method of claim 7, wherein the method further includes storing recovery data for a greater quantity of data points that fall within a predetermined amount of time of a particular recovery point than of data points that fall outside of the predetermined amount of time for the particularly recovery point.

11. The method of claim 7, wherein the recovery point comprises at least a particular time of day.

12. The method of claim 7, wherein the recovery point comprises at least one of a system crash, a failed log-in or a configuration change.

13. A computer storage device storing computer-executable instructions which, when executed by at least one processor of a computing system, implement a method that includes:

the computing system storing recovery data in a storage base, the recovery data including data for a plurality of different data points occurring within a predetermined period of time around each of a plurality of different recovery points;

the computing system accessing a coalescing policy that identifies coalescing trigger events and policies for storing different quantities of the recovery data for the different recovery points, the coalescing policy specifying at least an amount of recovery data to retain for different recovery points based on corresponding ages of the different recovery points;

the computing system detecting a coalescing trigger event that triggers a collapsing of the recovery data; and the computing system, for each of the different recovery points, coalescing the corresponding stored recovery data based on the coalescing policy, wherein said coalescing includes collapsing a first set of recovery data associated with a first recovery point into a reduced set of data points that is less than a quantity of data points in a second set of recovery data that is associated with second recovery point upon determining that the first recovery point is older than the second recovery point.

14. The computer storage device of claim 13, wherein the reduced set of data points includes a data point for no less than every 5 minutes and a second set of recovery data points in the second set of recovery data includes a data point for no more than every 2 minutes.

15. The computer storage device of claim 13, wherein an amount of the recovery data stored for different recovery points is dependent upon a type of each of the different recovery points, wherein types of the different recovery points include at least one of a particular time of day, a system crash, a failed log-in or a configuration change.

16. The computer storage device of claim 13, wherein the method further includes storing recovery data for a greater quantity of data points that fall within a predetermined amount of time of a particular recovery point than of data points that fall outside of the predetermined amount of time for the particularly recovery point.

17. The computer storage device of claim 13, wherein the recovery point comprises at least a particular time of day.

18. The computer storage device of claim 13, wherein the recovery point comprises at least one of a system crash, a failed log-in or a configuration change.

\* \* \* \* \*